(12) United States Patent
Rakib et al.

(10) Patent No.: US 10,693,581 B2
(45) Date of Patent: Jun. 23, 2020

(54) ORTHOGONAL TIME FREQUENCY SPACE MODULATION OVER A PLURALITY OF NARROW BAND SUBCARRIERS

(71) Applicant: Cohere Technologies, Inc., Santa Clara, CA (US)

(72) Inventors: Shlomo Selim Rakib, Santa Clara, CA (US); Ronny Hadani, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 172 days.

(21) Appl. No.: 15/743,646

(22) PCT Filed: Jul. 12, 2016

(86) PCT No.: PCT/US2016/041894
§ 371 (c)(1),
(2) Date: Jan. 10, 2018

(87) PCT Pub. No.: WO2017/011455
PCT Pub. Date: Jan. 19, 2017

(65) Prior Publication Data
US 2018/0205481 A1  Jul. 19, 2018

Related U.S. Application Data

(60) Provisional application No. 62/191,468, filed on Jul. 12, 2015, provisional application No. 62/215,126, filed on Sep. 7, 2015.

(51) Int. Cl.
*H04J 11/00* (2006.01)
*H04L 27/26* (2006.01)
(Continued)

(52) U.S. Cl.
CPC ......... *H04J 11/0026* (2013.01); *H04J 11/00* (2013.01); *H04L 23/02* (2013.01);
(Continued)

(58) Field of Classification Search
CPC .. H04J 11/0026; H04L 27/2639; H04L 23/02; H04L 27/2697
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

International Search Report and Written Opinion for International Application No. PCT/US2017/025797, dated Jun. 21, 2017, 6 pages.

(Continued)

*Primary Examiner* — Andrew Lai
*Assistant Examiner* — Sumitra Ganguly
(74) *Attorney, Agent, or Firm* — Perkins Coie LLP

(57) ABSTRACT

An Orthogonal Time Frequency Space Modulation (OTFS) modulation scheme that maps data symbols, along with optional pilot symbols, using a symplectic-like transformation such as a 2D Fourier transform and optional scrambling operation, into a complex wave aggregate and be backward compatible with legacy OFDM systems, is described. This wave aggregate may be processed for transmission by selecting portions of the aggregate according to various time and frequency intervals. The output from this process can be (Continued)

used to modulate transmitted waveforms according to various time intervals over a plurality of narrow-band subcarriers, often by using mutually orthogonal subcarrier "tones" or carrier frequencies. The entire wave aggregate may be transmitted over various time intervals. At the receiver, an inverse of this process can be used to both characterize the data channel and to correct the received signals for channel distortions, thus receiving a clear form of the original data symbols.

20 Claims, 25 Drawing Sheets

(51) Int. Cl.
*H04L 23/02* (2006.01)
*H04L 5/00* (2006.01)

(52) U.S. Cl.
CPC ...... *H04L 27/2639* (2013.01); *H04L 27/2697* (2013.01); *H04J 2011/0003* (2013.01); *H04L 5/0016* (2013.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2004/0228272 A1* | 11/2004 | Hasegawa ........... H04L 25/0204 370/210 |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Plan et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0129495 A1 | 5/2009 | Jin et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0150036 A1 | 6/2012 | Buckton et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |

(56) References Cited

U.S. PATENT DOCUMENTS

| | | |
|---|---|---|
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169409 A1 | 6/2014 | Ma et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0348271 A1* | 11/2014 | Ma .................. H04L 25/0226 375/340 |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2018/0109284 A1 | 4/2018 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
International Search Report and Written Opinion for PCT Application No. PCT/US2016/062590, dated Feb. 6, 2017, 11 pages.
International Search Report and Written Opinion for PCT Application No. PCT/US2016/031909, dated Aug. 11, 2016, 13 pages.
Office Action for U.S. Appl. No. 15/573,793, dated Apr. 6, 2018, 7 pages.
International Search Report and Written Opinion for PCT Application No. PCT/US2016/041894, dated Sep. 27, 2016, 10 pages.
Office Action for U.S. Appl. No. 13/117,119, dated Aug. 5, 2013, 5 pages.
Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.

(56) References Cited

OTHER PUBLICATIONS

International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

\* cited by examiner $H(t,f) = \sum R_q \exp(i2\pi v_q t) \exp(i2\pi f \tau_q)$   $h(\tau, \vartheta) = FFT_{2D}(H(kT, l\Delta F)) =$ $h(\tau, \vartheta) = FFT_{2D}(H(kT, l\Delta F)) = FFT_{2D}(\sum R_q \exp(i2\pi f \frac{\dot{r}_q}{\lambda}) \exp(i2\pi f_0 \frac{\ddot{r}_q}{c} at))$ $FFT_{2D}(\sum_q R_q e^{i2\pi l\Delta F \frac{r_q(t_0)}{\lambda}} e^{i2\pi f_0 \frac{(\dot{r}_q(t_0)}{c}(kT-t_0)+\frac{\ddot{r}_q(t_0)}{2c}(kT-t_0)^2)})$

ORTHOGONAL TIME FREQUENCY SPACE MODULATION OVER A PLURALITY OF NARROW BAND SUBCARRIERS

CROSS-REFERENCE TO RELATED APPLICATION(S)

This patent document claims the benefit of priority from U.S. Provisional Patent Application 62/191,468, entitled "METHODS OF ORTHOGONAL TIME FREQUENCY SPACE MODULATION OVER A PLURALITY OF NARROW BAND SUBCARRIERS," filed on Jul. 12, 2015. This application also claims the benefit of priority from U.S. Provisional Patent Application 62/215,126, entitled "METHODS OF ORTHOGONAL TIME FREQUENCY SPACE MODULATION OVER A PLURALITY OF NARROW BAND SUBCARRIERS, filed on Sep. 7, 2015. All of the aforementioned patent applications are incorporated by reference herein in their entirety.

TECHNICAL FIELD

This document relates to the field of telecommunications, in particular, estimation and compensation of impairments in telecommunications data channels.

DESCRIPTION OF THE RELATED ART

Ever since the advent of the first transatlantic cable back in back in 1858, which to the disappointment of its backers, was only capable of transmitting data at a rate of about 100 words every 16 hours, the impact of imperfect data channels on communications speed and reliability has been apparent to the telecommunications industry.

Making a quick transition to modern times, even modern day electronic wires (e.g. CATV cable), optical fibers, and wireless (radio) methods of data transmission suffer from the effects of imperfect data channels. The data channels are often imperfect because they often contain various signal reflectors that are positioned at various physical locations in the media (e.g. various junctions in a 1D electrical conductor such as wires, or 1D junctions in optical conductors such as optical fiber. For wireless communications, where the media is 3D space, these reflectors can be radio reflectors that are positioned at various locations in space). Regardless of media type and reflector type, reflectors typically distort signal waveforms by creating various echo reflections, frequency shifts, and the like. The net result is that what was originally a clear and easy to interpret signal waveform, sent by a data channel transmitter will, by the time it reaches the receiver, can be degraded by the presence of various echoes and frequency shifted versions of an original signal waveform.

Traditionally, the telecommunications industry has tended to cope with to such problems by using statistical models of these various data channel reflectors and other impairments to create a statistical profile of how the state of a given data channel (channel state) may fluctuate on a statistical basis. Such prior art includes the work of Clarke and Jakes (R. H. Clarke, A statistical theory of mobile-radio reception, Bell Syst. Tech. J., 47, 957-1000 (1968); and W. C. Jakes (ed.), Microwave Mobile Communications, Wiley, New York, 1974)) and indeed such methods are often referred to in the industry as Clarke-Jakes models.

These prior art models were useful; because it helped communications engineers conservatively design equipment that would generally be robust enough for various commercial applications. For example, if the statistical model predicted that waveforms too close together in frequency would tend to be smeared onto each other by channel state with some statistical probability, then the communications specifications could be designed with enough frequency separation between channels to function to some level of statistical probability. Similarly if the statistical model showed that certain statistical fluctuations in channel states would produce corresponding fluctuations in signal intensity, then the power of the transmitted waveforms, or the maximum rate of data transmission, or both could be designed to cope with these statistical fluctuations.

A good review of these various issues is provided by Pahlavan and Levesque, "Wireless Information Networks, Second Edition", 2005, John Wiley & Sons, Inc., Hoboken N.J. This book provides a good review discussing how wireless radio signals are subject to various effects including multi-path fading, signal-drop off with distance, Doppler shifts, and scattering off of various reflectors.

As a specific example, consider the challenge of designing equipment for mobile cellular phones (cell phones). When a moving cell phone receives a transmission from non-moving cell phone tower (base station), although some wireless energy from the cell phone tower may travel directly to the cell phone, much of the wireless energy from the cell phone tower transmission will typically reflect off of various reflectors (e.g. the flat side of buildings), and these "replicas" of the original cell phone tower transmission will also be received by the cell phone, subject to various time delays and power loss due to the distance between the cell phone tower, the reflector, and the cell phone.

If the cell phone is moving, the reflected "replica" of the original signal will also be Doppler shifted to a varying extent. These Doppler shifts will vary according to the relative velocity and angle between the cell phone tower, the cell phone, and the location of the various buildings (reflectors) that are reflecting the signal.

According to prior art such as the Clarke-Jakes models, statistical assumptions can be made regarding average distributions of the transmitters, receivers, and various reflectors. This statistical model can then, for example be used to help set system parameters and safety margins so that, to a certain level of reliability, the system still function in spite of these effects. Thus prior art allowed reasonably robust and commercially useful systems to be produced.

Review of OTFS Methods

Wireless communications operate by modulating signals and sending these wireless (e.g. radio) signals over their respective wireless medium or "data channel" (e.g. empty space containing various reflectors). This wireless data channel thus consists of the physical medium of space (and any objects in this space) comprising three dimensions of space and one dimension of time. In the most commonly used commercial setting of ground based wireless applications, often the third spatial dimension of height can be less important, and thus ground based wireless applications can often be adequately approximated as a two dimensional medium of space (with objects) with one dimension of time.

As wireless signals travel through their space "data channel", the various signals (e.g. waveforms), which travel at the speed of light, are generally subject to various types of degradation or channel impairments. These echo signals can also potentially be generated when wireless signals bounce off of wireless reflecting surfaces, such as the sides of buildings, and other structures. For wireless signals, signals transmitted to or from a moving reflector, or to or from a moving vehicle are subject to Doppler shifts that also result in frequency shifts.

These echo effects and frequency shifts are unwanted, and if such shifts become too large, can result in lower rates of signal transmission, as well as higher error rates. Thus methods to reduce such echo effects and frequency shifts are of high utility in the communications field.

In some presently known OTFS modulation embodiments, each data symbol or element that is transmitted was also spread out to a much greater extent in time, frequency, and spectral shape space than was the case for prior art methods. As a result, at the receiver end, it often took longer to start to resolve the value of any given data symbol because this symbol had to be gradually built-up or accumulated as the full frame of N2 symbols (for example) is received.

Other wireless communication methods a combination of time, frequency and spectral shaping to transmit data in convolution unit matrices (data frames) of N·N (N2) (e.g. N×N, N times N) symbols. In some embodiments, either all N2 data symbols are received over N spreading time intervals (e.g. N wireless waveform bursts), or none were (e.g. receiving N bursts was required in order to reconstruct the original data bits). In other embodiments this requirement was relaxed.

In these embodiments, to determine the times, waveforms, and data symbol distribution for the transmission process, the N2 sized data frame matrix could, for example, be multiplied by a first N·N time-frequency shifting matrix, permuted, and then multiplied by a second N·N spectral shaping matrix, thereby mixing each data symbol across the entire resulting N·N matrix. This resulting data matrix was then selected, modulated, and transmitted, on a one element per time slice basis, as a series of N OTFS symbol waveform bursts. At the receiver, the replica matrix was reconstructed and deconvoluted, revealing a copy of the originally transmitted data.

In some embodiments taught by U.S. patent application Ser. No. 13/117,119, the OTFS waveforms could be transmitted and received on one frame of data ([D]) at a time basis over a communications link, typically using processor and software driven wireless transmitters and receivers. Thus, for example, all of the following steps were usually done automatically using at least one processor.

This first approach used frames of data that would typically comprise a matrix of up to N2 data elements, N being greater than 1. This method was based on creating an orthonormal matrix set comprising a first N×N matrix ([U1]) and a second N×N matrix ([U2]). The communications link and orthonormal matrix set were typically chosen to be capable of transmitting at least N elements from a matrix product of the first N×N matrix ([U1]), a frame of data ([D]), and the second N×N matrix ([U2]) over one time spreading interval (e.g. one burst). Here each time spreading interval could consist of at least N time slices. The method typically operated by forming a first matrix product of the first N×N matrix ([U1]), and the frame of data ([D]), and then permuting the first matrix product by an invertible permutation operation P, resulting in a permuted first matrix product P([U1][D]). The method then formed a second matrix product of this permuted first matrix product P([U1][D]) and the second N×N matrix ([U2]) forming a convoluted data matrix, according to the method, this convoluted data matrix could be transmitted and received over the wireless communications link.

On the transmitter side, for each single time-spreading interval (e.g. burst time), the method operated by selecting N different elements of the convoluted data matrix, and over different time slices in this time spreading interval, the method used a processor and typically software controlled radio transmitters to select one element from the N different elements of the convoluted data matrix, modulate this element, and wirelessly transmit this element so that each element occupied its own time slice.

On the receiver side, the receiver (typically a processor controlled software receiver) would receive these N different elements of the convoluted data matrix over different time slices in the various time spreading intervals (burst times), and demodulate the N different elements of this convoluted data matrix. These steps would be repeated up to a total of N times, thereby reassembling a replica of the convoluted data matrix at the receiver.

The receiver would then use the first N×N matrix ([U1]) and the second N×N matrix ([U2]) to reconstruct the original frame of data ([D]) from the convoluted data matrix. In some embodiments of this method, an arbitrary data element of an arbitrary frame of data ([D]) could not be guaranteed to be reconstructed with full accuracy until the convoluted data matrix had been completely recovered. In practice, the system could also be configured with some redundancy so that it could cope with the loss of at least a few elements from the convoluted data matrix.

U.S. patent application Ser. No. 13/117,119 and its provisional application 61/359,619 also taught an alternative approach of transmitting and receiving at least one frame of data ([D]) over a wireless communications link, where again this frame of data generally comprised a matrix of up to N2 data elements (N being greater than 1). This alternative method worked by convoluting the data elements of the frame of data ([D]) so that the value of each data element, when transmitted, would be spread over a plurality of wireless waveforms, where each individual waveform in this plurality of wireless waveforms would have a characteristic frequency, and each individual waveform in this plurality of wireless waveforms would carry the convoluted results from a plurality of these data elements from the data frame. According to the method, the transmitter automatically transmitted the convoluted results by cyclically shifting the frequency of this plurality of wireless waveforms over a plurality of time intervals so that the value of each data element would be transmitted as a plurality of cyclically frequency shifted wireless waveforms sent over a plurality of time intervals, again as a series of waveform bursts. At the receiver side, a receiver would receive and use a processor to deconvolute this plurality of cyclically frequency shifted wireless waveforms bursts sent over a plurality of times, and thus reconstruct a replica of at least one originally transmitted frame of data ([D]). Here again, in some embodiments, the convolution and deconvolution schemes could be selected so such that an arbitrary data element of an arbitrary frame of data ([D]) could not be guaranteed to be reconstructed with full accuracy until substantially all of the plurality of cyclically frequency shifted wireless waveforms had been transmitted and received as a plurality of waveform bursts. In practice, as before, system could also be configured with some redundancy so that it could cope with the loss of at least a few cyclically frequency shifted wireless waveforms.

U.S. patent application Ser. No. 13/430,690 taught OFTS methods of transferring a plurality of data symbols using a signal modulated to allow automatic compensation for the signal impairment effects of echo reflections and frequency offsets. This method comprised distributing the plurality of data symbols into one or more N×N symbol matrices, and then using these one or more N×N symbol matrices to control the signal modulation of a transmitter. Here the scheme was that for each N×N symbol matrix, the transmitter would use each data symbol to weight N waveforms, where these waveforms were selected from a N2 sized set of all permutations of N cyclically time shifted and N cyclically frequency shifted waveforms determined according to an encoding matrix U. This process thus produced N symbol-weighted cyclically time shifted and cyclically frequency shifted waveforms for each data symbol. The encoding matrix U was chosen to be an N×N unitary matrix that has a corresponding inverse decoding matrix UH. Thus for each data symbol in the N×N symbol matrix, the OTFS system and method operated by summing the N symbol-weighted cyclically time shifted and cyclically frequency shifted waveforms, producing N2 summation-symbol-weighted cyclically time shifted and cyclically frequency shifted waveforms. The OTFS transmitter then transmitted these N2 summation-symbol-weighted cyclically time shifted and cyclically frequency shifted waveforms, structured as N composite waveforms, over any combination of N time blocks or frequency blocks.

U.S. patent application Ser. No. 13/927,088 taught OTFS methods that provided a modulated signal useable in a signal transmission system. This version of the OTFS method comprised establishing an original data frame having a first dimension of at least N elements and a second dimension of at least N elements, wherein N is greater than one. This original data frame is then transformed in accordance with a time-frequency transformation so as to provide a transformed data matrix. Here the time-frequency transformation is performed using a time-frequency shifting matrix wherein the time-frequency shifting matrix is of a first dimension having N elements and of a second dimension having N elements, where N is greater than one. The OTFS transmitter then generates the modulated signal in accordance with elements of the transformed data matrix.

U.S. patent application Ser. No. 13/927,086 taught OTFS methods that provided a method of data modulation, comprising arranging a set of data elements into an original data frame having a first dimension of N elements and a second dimension of N elements, where N is greater than one, and then transforming the original data frame in accordance with a time-frequency shifting matrix so as to form an intermediate data matrix having at least N2 elements. The method also operates by providing a transformed data matrix by permuting at least a portion of the elements of the intermediate data matrix; and generating a modulated signal based upon elements of the transformed data matrix. Here this generation process includes selecting the elements of the transformed data matrix on a column by column basis at different times, wherein the transformed data matrix includes at least N columns and at least N rows.

U.S. application Ser. No. 13/927,086 also taught OTFS methods that provided a method of receiving data comprising: receiving data signals corresponding to a transmitted data frame comprised of a set of data elements, and then constructing, based upon the data signals, a received data frame having a first dimension of at least N elements and a second dimension of at least N elements, where N is greater than one. This method then operated by inverse permuting at least a portion of the elements of the received data frame so as to form a non-permuted data frame. This in turn was then inverse transformed in accordance with a first inverse-transformation matrix so as to form a recovered data frame corresponding to a reconstructed version of the transmitted data frame. This receiving method thus determined an existence of signal distortion within the received data signals, where the signal distortion was indicative of a channel distortion relating to at least one of a frequency shift and a time shift.

SUMMARY

In one example aspect, a method of transmitting, on a per-frame basis, a plurality of data symbols over an impaired wireless channel comprising a plurality of narrow-band subcarriers is disclosed. The method includes, for each frame, using at least one processor to distribute the plurality of data symbols over a 2D OTFS delay-Doppler frame by assigning each data symbol to its own unique 2D OTFS delay-Doppler frame location, OTFS transforming the data symbols on the 2D OTFS delay-Doppler frame by using each data symbol and frame location to modulate a unique, location specific, 2D basis wave function selected from a set of mutually orthogonal 2D basis wave functions operating over a 2D OTFS time-frequency frame, the transformation also spreading each data symbol, in a lossless and invertible manner, throughout substantially all of the 2D OTFS time-frequency frame, the transformation thereby creating a 2D OTFS time-frequency frame based wave aggregate, further scrambling the 2D OTFS time-frequency frame based wave aggregate with a scrambling operation, and using a wireless transmitter to modulate and transmit portions of the scrambled 2D OTFS time-frequency frame based wave aggregate, over the plurality of narrow-band subcarriers, over a plurality of time intervals. The granularity and extent of the portions, the plurality of narrow-band subcarriers, and the time intervals are chosen so that the sum of the transmitted portions accurately characterize the scrambled 2D OTFS time-frequency frame based wave aggregate. The impaired wireless channel distorts the transmitted portions into channel distorted portions.

In another aspect, a method of receiving, on a per-frame basis, a plurality of data symbols over an impaired wireless channel comprising a plurality of narrow-band subcarriers, wherein the impaired wireless channel distorts the transmitted portions into channel distorted portions is disclosed. The method includes using a wireless receiver to receive and demodulate the channel distorted portions over the plurality of narrow-band subcarriers, over a plurality of time intervals, thereby recovering a channel distorted replica of the scrambled 2D OTFS time-frequency frame based wave aggregate, using an inverse of the scrambling operation to descramble the channel distorted replica of the scrambled 2D OTFS time-frequency frame based wave aggregate, thereby creating a descrambled channel distorted replica of the 2D OTFS time-frequency based wave aggregate, using at least one processor and an inverse of the OTFS transform to inverse transform the channel distorted replica of the 2D OTFS time-frequency frame based wave aggregate, thereby producing, once substantially all of the portions have been received, a channel distorted replica of the 2D OTFS delay-Doppler frame, using a delay-Doppler 2D equalizer to correct the channel distorted replica of the 2D OTFS delay-Doppler frame, thereby producing a channel deconvoluted 2D OTFS delay-Doppler frame, and extracting a plurality of replica data symbols from the channel deconvoluted 2D OTFS delay-Doppler frame.

In yet another aspect, apparatus that implements the above-described methods are disclosed.

The technology disclosed herein is based, in part, on the insight that in some embodiments, alternative modulation schemes may be used to map a first "information" frame comprising a plurality of data symbols into a 2 dimensional time-frequency frame (alternative words for "frame", often used here as synonyms, are "domain", "plane", or "grid") comprising a plurality of different time shifted and frequency shifted transmitted waveforms. Note that because the structure of the "information" frame is often set up based considerations of the anticipated 2D time delay and Doppler frequency shifts of the wireless data channel, the "information" frame is often referred to in the alternative as the "Delay-Doppler frame".

These alternative modulation schemes are subject to certain important OTFS constraints, such as that these different waveforms should generally distribute any given data symbol over all (neglecting certain reserved pilot locations) combinations of time and frequency shifted waveforms. The OTFS constraints also require that the waveforms be sent in a manner that both probes the underling time-delay Doppler frequency shift (delay Doppler) structure of the channel, and also allows the receiver to both correct for the channel distortions, and then reconstruct the original data. However as will be seen, the details by which these various operations can be accomplished can often be substantially different than the earlier teaching discussed in the previous section.

In contrast to the earlier OTFS methods taught by applicant, the present disclosure teaches an alternative modulation scheme that can, for example, use Fourier-like variants of the 2D Fourier transform, such as symplectic discrete Fourier transforms (and inverses thereof) to map data symbols (e.g. the payload data symbols that the user wants to send and receive) used for data transmission to and from the 2 dimensional time-frequency frames used by the transmitter and the receiver.

The present disclosure also teaches at least some embodiments that focus on the advantages of OTFS systems and methods that maintain at least some degree of compatibility with prior art OFDM systems, such as 4G/LTE OFDM systems, at least in respect to often using a plurality of OFDM subcarriers to carry the various OTFS wireless signals. In some embodiments, prior art OFDM timing schemes may also be adopted, but in other embodiments, these OFDM timing schemes may not be used. Typically the OTFS systems and methods described herein substantially depart from prior art OFDM data symbol manipulation methods, and often depart significantly from prior art OFDM modulation schemes (at least within the subcarriers) as well.

The methods and systems taught herein are typically implemented using software defined radio equipment, typically requiring at least one transmitter processor, at least one receiver processor, transmitter memory, and receiver memory, as well as RF (radiofrequency) circuitry to transform processor commands to and from various wireless waveforms. In the case where the system is implemented using a transceiver, then of course some of the processors, memory, and RF circuitry may be shared between the transmitter and receiver portions of the transceiver.

Because the methods and systems described herein typically use software defined radio methods, and because the methods and systems described herein can often use prior art OFDM subcarriers, then in many embodiments, when configured according to the proper software parameters, the transmitters, receivers, and transceivers described herein can be set to either operate using the OTFS methods described herein, or alternatively operate in a mode that is backward compatible with OFDM methods. However the reverse is not true, and typically a prior art OFDM system will not be able to receive OTFS signals transmitted according to the methods described herein. However under certain operational parameters, legacy or prior art OFDM systems and the OTFS systems described herein may co-exist and even may coordinate sharing schemes that allow the two to coordinate mutually acceptable times and subcarriers, frames, or portions of frames in which either one or the other may operate without mutual interference.

Some embodiments may be a system or method of transmitting and receiving (as well as a system or method for transmitting, and a system and method of receiving), on a per-frame basis, a plurality of data symbols over an impaired wireless channel comprising a plurality of narrow-band subcarriers.

On the transmitting side, the method will typically comprise, for each frame, using at least one (transmitter) processor to distribute a plurality of data symbols over a 2D OTFS delay-Doppler frame (e.g. the information frame) by assigning each data symbol to its own unique 2D OTFS delay-Doppler frame location (typically the frames are 2D grids, so the location here will be a specific 2D grid coordinate).

The OTFS transformation process can be done by various ways. In some embodiments, previously described OTFS methods may be used. However a preferred embodiment disclosed herein, the transmitter will OTFS transforming these data symbols on their 2D OTFS delay-Doppler frame (information frame) by, on a per data frame location, using each data symbol at that particular frame location, and the frame location coordinates, to modulate a unique, location specific, 2D basis wave function. This 2D basis function will typically be selected from a set of mutually orthogonal 2D basis wave functions operating over a 2D OTFS time-frequency frame. Often this will be done using various Fourier-like transformations, such as symplectic or discrete symplectic Fourier like transformations, as will be discussed.

The net effect of this OTFS transformation is to spread each data symbol, in a lossless and invertible manner, throughout substantially the entire 2D OTFS time-frequency frame. Here we will term the results of this transformation to be a 2D OTFS time-frequency frame based wave aggregate, and specific examples will be discussed in more detail shortly.

Often to help the system and method keep the transmitted power within certain limits, and additionally to also help distinguish between different transmitters and receivers, the transmitter will often further scramble this 2D OTFS time-frequency frame based wave aggregate with an [optional] scrambling operation.

The transmitter will then modulate and transmit portions of this scrambled 2D OTFS time-frequency frame based wave aggregate, over the plurality of narrow-band subcarriers, and over a plurality of time intervals. Note that neglecting pilot symbols or signals, and neglecting guard bands or intervals, and optional control symbols, each original data symbol has in effect been spread out over all of the plurality of narrow band subcarriers and all of the plurality of time intervals.

Various methods may be used to carve up the scrambled 2D OTFS time-frequency frame based wave aggregates for this transmission process. An important constraint, however is that the granularity and extent of these portions, the plurality of narrow-band subcarriers, and the time intervals should be chosen so that the sum of the transmitted portions accurately characterize the scrambled 2D OTFS time-frequency frame based wave aggregate. Here "accurate" means that at a minimum, any ultimate loss of data symbols once the process is completed should be either zero (lossless) or at least extremely low (e.g. less than 1 in a million or better—effectively lossless). These portions can then be used to modulate underlying OFDM subcarrier tones.

As will be discussed, another important consideration is that the number and bandwidths of the plurality of narrow band subcarriers, and the number and time durations of the time intervals should ideally also be chosen to help characterize the underlying time-delay and Doppler shift aspects (or impairments) of the data channel, and to help the receiver to correct for these impairments later on.

The wireless transmitter then transmits the various wireless waveforms, and during transit through the various channel pathways, the impaired wireless channel will typically distort these transmitted portions, creating channel distorted portions (impaired wireless waveforms that as a result carry channel distorted portions).

At the receiver side of the method and system, the wireless receiver, usually also using software defined radio methods, will receive and demodulate these channel distorted portions over the plurality of narrow-band subcarriers, and over the plurality of time intervals, thereby recovering (and usually storing in the receiver's memory) a channel distorted replica of the scrambled 2D OTFS time-frequency frame based wave aggregate. The receiver then essentially undoes many of the transmitter operations.

The receiver can then use an inverse of the transmitter's scrambling operation to descramble this channel distorted replica of the scrambled 2D OTFS time-frequency frame based wave aggregate, thereby creating a descrambled channel distorted replica of the 2D OTFS time-frequency based wave aggregate. The receiver can also use at least one processor and an inverse of the transmitter's OTFS transform to inverse transform the channel distorted replica of the 2D OTFS time-frequency frame based wave aggregate, thereby producing (once substantially all of the transmitted portions have been received) a channel distorted replica of the 2D OTFS delay-Doppler frame on the receiver side.

The receiver can then optionally use one or more 2D equalizers, such as a delay-Doppler 2D equalizer to correct this channel distorted replica of the 2D OTFS delay-Doppler frame. The net result is to produce, at the receiver end, a channel deconvoluted 2D OTFS delay-Doppler frame (receiver side information plane). The receiver processor can then extract a plurality of replica data symbols from this channel deconvoluted 2D OTFS delay-Doppler frame. The net result is that the payload data symbols have been transmitted from the transmitter, and have been received at the receiver as replica data symbols. As will be discussed, other types of 2D equalizers, such as time-frequency 2D equalizers that operate more on the "raw data" level at the receiver's time-frequency frame, may also be used.

As will be discussed, an important aspect of these methods is that due to the OTFS methods employed herein, a detailed map of the delay-Doppler aspects of the data channel is also produced (typically as part of the process), often called the channel delay-Doppler impulse response h(r, v). This information allows the system to in effect configure and apply a high quality 2D equalizer, such as a delay-Doppler 2D equalizer, and use information obtained by probing the channel using intelligently selected waveforms to do a very good job of removing the various channel impairments from the received signals.

Returning to the OFDM compatibility aspects—as previously discussed, this disclosure is also based, in part, on the insight that some of these alternate modulation and data distribution schemes may be configured in a manner that is compatible with transmission over wireless data channels comprising a plurality of narrow-band subcarriers. Indeed, in some embodiments, the number, frequencies, and bandwidths of these narrow-band subcarriers, as well even the underlying carrier tones (e.g. orthogonal waveforms) may be made compatible with legacy OFDM methods, including even legacy 4G/LTE methods.

As a result, an OTFS method of transmitting data may be obtained that, while bringing the benefits of transmitting more data more reliably and efficiently than prior art methods (such as OFDM based 4G/LTE methods) may nonetheless, as desired also have a significant amount of backward compatibility with legacy OFDM methods such as 4G/LTE.

Due to the huge worldwide capital investment in legacy 4G/LTE methods (again in the hundreds of billions or even trillions of dollars), such methods can have substantial economic benefit.

That is, according to the methods described herein, in some embodiments, greatly improved, next-generation wireless communication methods, possibly meeting desired "5G" proposals, may be produced in a manner that leverages off of the huge existing investment in 4G LTE infrastructure.

DETAILED DESCRIPTION

Figure 1:
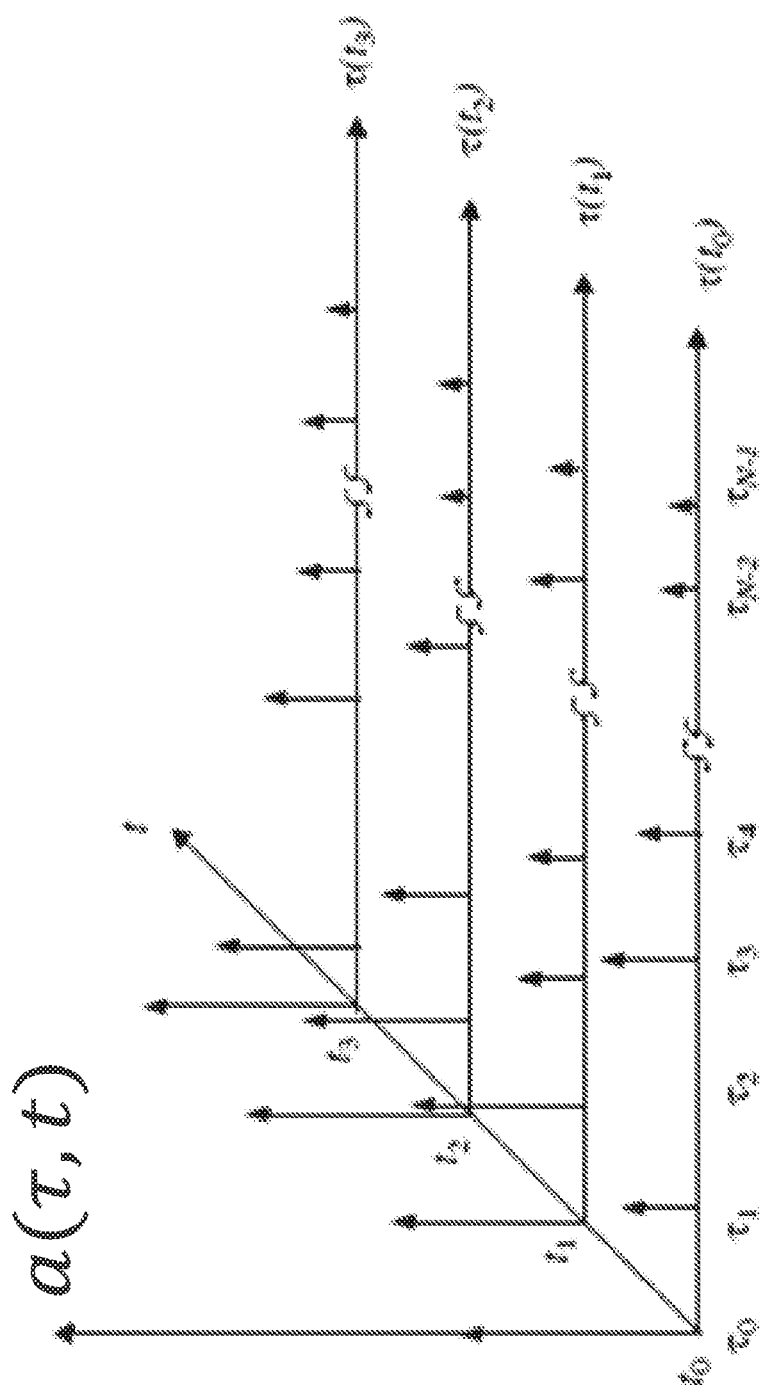
FIG. 1 is a graphical representation of an example of a time-varying impulse response.

Section headings are used in this document to help improve readability and do not limit scope of the technology discussed in each section only to that section. Furthermore, for ease of explanation, a number of simplifying assumptions have been made. Although these simplifying assumptions are intended to help convey ideas, they are not intended to be limiting. Some of these simplifying assumptions are:

1: Generally we will be measuring and analyzing the channel delay-Doppler impulse response at the same level of time and frequency resolution that we will be using to send OTFS waveforms (which both probe the time delay and Doppler frequency shift of the channel, and which also convey information from the transmitter to the receiver). This simplifying assumption helps make the math calculations easier to understand.

In this simplified scheme, occasionally the same variable names such as $\tau$ and $v$ may be used to describe both the channel delay-Doppler impulse response $h(r, v)$, the indexes used on the delay-Doppler (also called the information) frame, as well as the characteristics of the various OTFS waveforms that are transmitted.

In other embodiments where, for example, it is desired to probe the channel impulse response at a higher level of time and frequency resolution than the OTFS waveforms used to probe the channel, alternative schemes may be implemented. For example, the receiver may operate at higher time and/or frequency resolution than the transmitter, and thus while the transmitter will operate according to a $\tau$ and $v$ level of resolution, the receiver may operate at a higher level of resolution, at least at certain intermediate stages. Thus embodiments where the receiver estimates the channel delay-Doppler response is at a level of resolution that is higher than $h(r, v)$ are not disclaimed. Further, there may exist situations where the user may wish to operate the transmitter at less than full capacity, and transmit fewer than $\tau$ times $v$ data symbols over a combination of $\tau$ and $v$ different times and narrow band subcarriers, and these embodiments are also not disclaimed.

2: In general, use of $\tau$ and $v$ nomenclature in this discussion tends to refer back to the mathematical underpinnings of the OTFS approach, while use of alternative nomenclature such as "m" and "n", or "k" and "l" tends to refer to an electrical engineering level implementation of OTFS methods. In the event of confusion, again please refer to Table 2 and Table 3.

3: "Burst" definition: In this disclosure, a waveform used to transmit over a period of time T (exemplified by the square wave $g(t)$ or the filter multicarrier times in FIG. 21), and over one subcarrier, is occasionally referred to as a "burst". Thus as used herein "burst" is essentially the minimum information carrying waveform transmitted by the transmitter.

Similarly in this disclosure, the term "OTFS symbol" is occasionally used to refer to the information carried by this burst over one subcarrier. This corresponds well to the term 8a(k,l) defined later in this specification. Note that in this disclosure the OTFS symbols are thus discussed on a per subcarrier basis. This terminology is in contrast to 4G/LTE terminology, where often a 4G/LTE OFDM symbol may refer to all information carried over all subcarriers over a particular period of time T.

4: Although most of the discussion herein neglects the effect of various guard times (e.g. any cyclic prefixes, time periods of no signal transmission, or time periods with just underlying waveform tone without other modulation) or guard frequencies (e.g. extra frequency spacing between at least some adjacent subcarriers), it should be apparent that in at least some embodiments, such guard times or guard frequencies may also be employed as desired. Thus use of such guard times and guard frequencies is not disclaimed.

5: Although QAM symbols are used throughout as a specific example of data symbols, this use is not intended to be limiting. In other embodiments, other digital modulation symbols and modulation schemes, such as other digital modulation symbols and modulation schemes, may also be used.

Quantizing the Time Delay and Doppler Frequency Shift Aspects of a Given Data Channel:

In real life, a given data channel will typically have various wireless reflectors, as well as at least one wireless transmitter and at least wireless one receiver. These will typically be distributed at arbitrary locations, and the various transmitters, receivers, and reflectors may be moving at arbitrary velocities with respect to each other. Because the speed of light is finite, there will be time delays as the wireless waveforms traverse various paths between the transmitter and receiver. Due to Doppler frequency shift effects, the frequency of the various waveforms will also be shifted depending on the relative velocity of the various transmitters, receivers, and reflectors.

These factors will thus impart various time delays and Doppler frequency shifts on the wireless signals as they move through the channel to the receiver, and the net effect of these various time delay and Doppler frequency shifts (Doppler frequency shifts are often referred to herein as simply "Doppler) are often referred to as "channel impairments". These channel impairments distort the wireless signals, and thus can often impose limits on how much data can be moved over the channel. OTFS methods can be viewed, at least in some embodiments, as modeling the channel impairments as a channel Delay-Doppler impulse response, and using this channel Delay-Doppler model to help improve various aspects of the wireless communication process.

On an engineering level, however, it is unrealistic to expect that these channel impairments will be modeled to an infinite accuracy. Instead the time-delay and Doppler frequency shift characteristics of a data channel will often be represented at a lower resolution by, in effect, digitizing the various time delays and Doppler frequency shift into a 2D array of bins.

In the following discussion, due to the wave nature of wireless waveforms, and Fourier analysis considerations, it may be useful to remember as a rule of thumb that often a given short wireless waveform burst has a characteristic minimum time-bandwidth product. Thus for a given burst=time*bandwidth, then the minimum burst time is proportional to 1/bandwidth, and the minimum burst bandwidth is proportional to 1/burst time. Here efficiency considerations tend to drive us towards using minimum burst times and minimum bandwidths, because otherwise we are not using scarce spectrum and transmitting times in an optimum manner. At the same time, we are also using these short waveform bursts to characterize the channel as well. So this duality or relationship between minimum waveform bursts, time, and bandwidth is an important consideration going forward.

Thus, in the methods described herein, particularly in the more mathematical oriented sections, $\tau$ and $v$ will often be used to describe this 2D digitization of the channel's time delay and Doppler frequency characteristics according to a finite resolution such that $\tau$ is digitizing the time delay aspects of the channel into 2D bins, each 2D bin with a first and second bin dimension. Often the first bin dimension will be described by $\tau=1/BW$, and $v$ is described as digitizing the frequency shift aspects of the channel according to a second bin dimension of $1/Tf$, where BW=the total bandwidth of a given OTFS frame, and Tf=the time to transmit a given OTFS frame. (Here we are simplifying and ignoring any conversion coefficients that may be needed).

Thus for example, OTFS frames with greater bandwidths BW will be able to distinguish time delays more accurately, while OTFS frames with longer time durations will be able to distinguish Doppler frequency shifts with higher accuracy. Thus the channel impairments are often said to be represented by a channel impulse response $h(\tau,v)$ which can be viewed as being a $\tau$, $v$ level resolution digitized representation of the time delay and Doppler frequency shift aspects of the data channel. Thus in a 3D graph representing the channel Delay-Doppler impulse response $h(\tau,v)$, such as FIG. 3, the height of a given bar above a given bin can be viewed as showing the presence (and reflection coefficients) of a reflector (or a closely spaced cluster of reflectors) reflecting a certain amount of incoming waveforms according to a certain time delay and frequency shift.

Put alternatively, in some embodiments, for a total bandwidth BW and M subcarriers, the frequency resolution can be $\Delta f=BW/M$. For a total frame duration Tf and N symbols or bursts, the time resolution can be $T=Tf/N$. These sort of resolutions typically occur when a Symplectic Finite Fourier Transform (SFFT) transform has been used to translate the time varying channel in the time-frequency domain (frame, plane, grid) to a time-invariant axis in the delay-Doppler plane (frame, plane grid, domain). This, for example can produce a Doppler frequency resolution is $1/Tf$ and a time delay resolution of $1/BW$. However other resolutions are also possible.

As previously discussed, the present document makes use of modern software defined radio methods and modern electronic components, such as processors (e.g. microprocessors, which can even be commonly used processors such as the popular Intel x86 series of processors), and digital signal processors; and often will employ modern software configured wireless transmitter and receivers which can, for example, be implemented by various field programmable gate arrays (FPGA), digital signal processors, and other high performance modern computer processors. Here the methods of Harris, "Digital Receivers and Transmitters Using Polyphase Filter Banks for Wireless Communications", IEEE transactions volume 51 (4), April 2003, pages 1395-1412 may be used. Various types of application specific integrated circuits (ASICs) and other modern software defined radio devices and methods may also be used.

Figure 22:
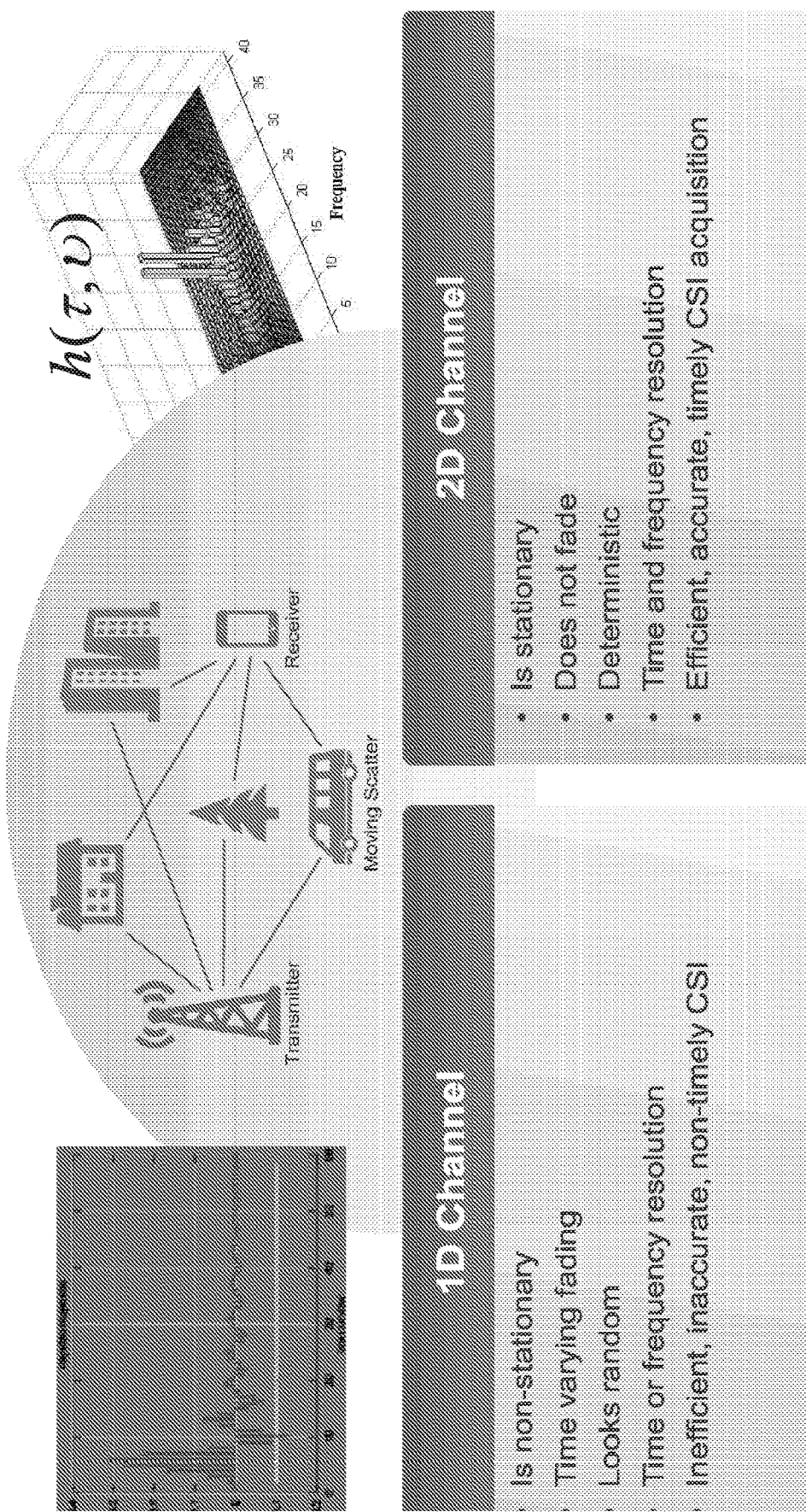
FIG. 22 shows examples of 1D and 2D transmission channels.

FIG. 22 shows an overview comparison between 2D channel OTFS methods, which characterize channel impairments (channel state) over the dimensions of both time delays and Doppler shifts, and that also spread every transmitted over all permutations of time delays and Doppler shifts (thereby rendering all bits of data equivalent as far as channel state effects are concerned), versus prior art 1D channel methods, such as the previously discussed Clarke-Jakes models.

In some embodiments, implementations may be a method, device or system of transmitting and receiving, on a per-frame basis, a plurality of data symbols over an impaired wireless channel comprising a plurality of narrow-band subcarriers (which may be narrow band OFDM subcarriers in some embodiments)

The method may be used to transmit only a single frame of data, or indeed only one data symbol or pilot symbol, but typically will be used to transmit multiple frames of data. Thus the following description is on a per data frame basis.

On a per data frame basis (e.g. for each frame), the method will typically use at least one processor (e.g. a transmitter or transceiver processor) to distribute this plurality of data symbols, here often termed either $xr,v$ or $x(m,n)$ over a 2D OTFS delay-Doppler frame (also called an information frame, see FIGS. 8 and 9) by assigning each data symbol to its own unique 2D OTFS delay-Doppler frame location, typically in transmitter memory. Note that these data symbols are the "payload" data symbols. That is, the entire reason for existence of this system is to convey data symbols $xr,v$ or $x(m,n)$ between the transmitter and receiver.

FIG. 1 shows some details of the time-varying impulse response $a(\tau, t)$ that represents various communication channel impairments or distortions that a channel imposes on a transmitted signal $S(t)$ by the time that signal reaches a receiver as $R(t)$.

The term $a(\tau, t)$ is the time-varying impulse response representing the channel. In general, accurate channel estimation is crucial to achieving throughput approaching capacity and scaling with MIMO order. The Problem is that $a(\tau, t)$ is not localized in the time dimension, typically represented as a stochastic process and lends itself to a difficult channel estimation & prediction problem. Finding an effective solution often requires continuous/high overhead channel estimation for accurate channel state information. Performance of channel estimation is degraded in the presence of Doppler and is difficult to scale with MIMO order.

Figure 2:
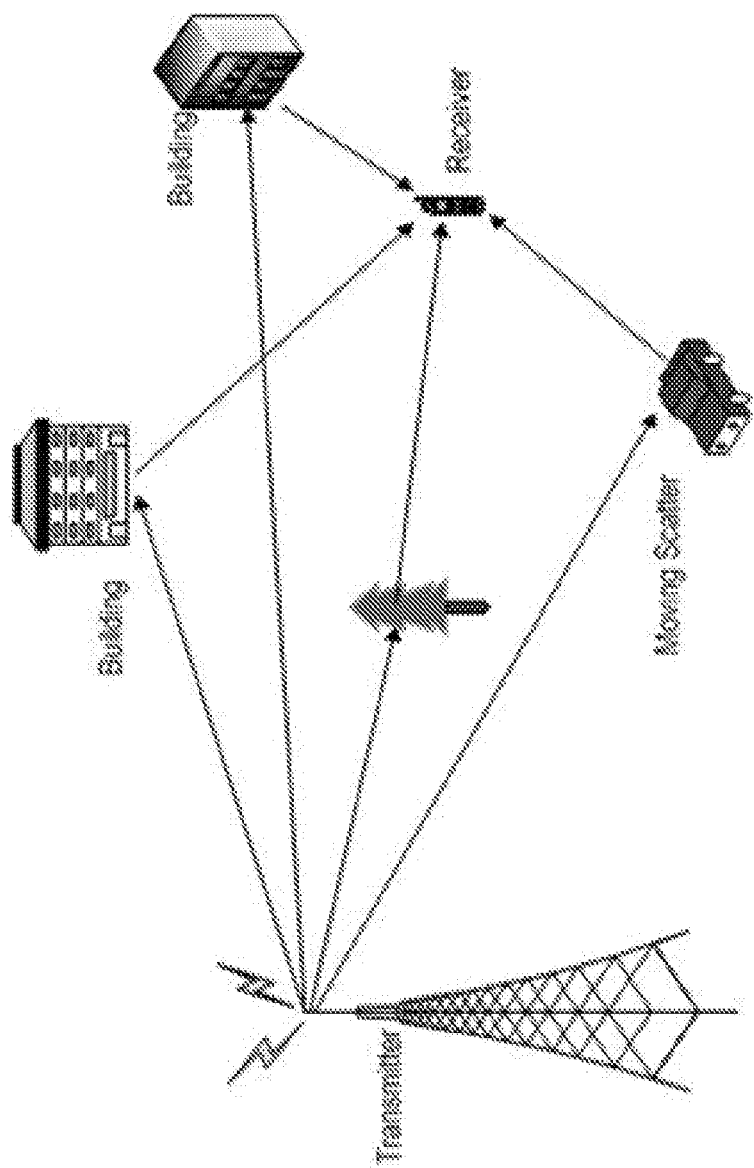
FIG. 2 is a block diagram representation of an example wireless communications system.

FIG. 2 shows more detail of an embodiment in which the time-varying impulse response $a(\tau,t)$ can be represented as a Delay-Doppler response $h(\tau, v)$ that allows for the channel impairments or distortions to be more readily corrected by a 2D equalizer. Generally $h(\tau,v)$ can be understood as being influenced by the geometry and velocity of various reflectors, receivers, and transmitters in the communications channel. This is symbolized by the relative locations of the transmitter, buildings, car (moving scatterer), tree (direct path with attenuation) and receiver in FIG. 2.

$$R(t) = \int a(\tau, t)S(t-\tau)d\tau \quad (1)$$

$$= \int \int h(\tau, v)e^{j2\pi vt}S(t-\tau)d\tau dv \quad (2)$$

Time-varying delay impulse response, a(τ, t), can be represented as a Delay-Doppler impulse response, h(τ, v)

Fourier Transform of a(τ, t) along the time dimension h(τ, v) directly represents the geometry of the reflectors.

Figure 3:
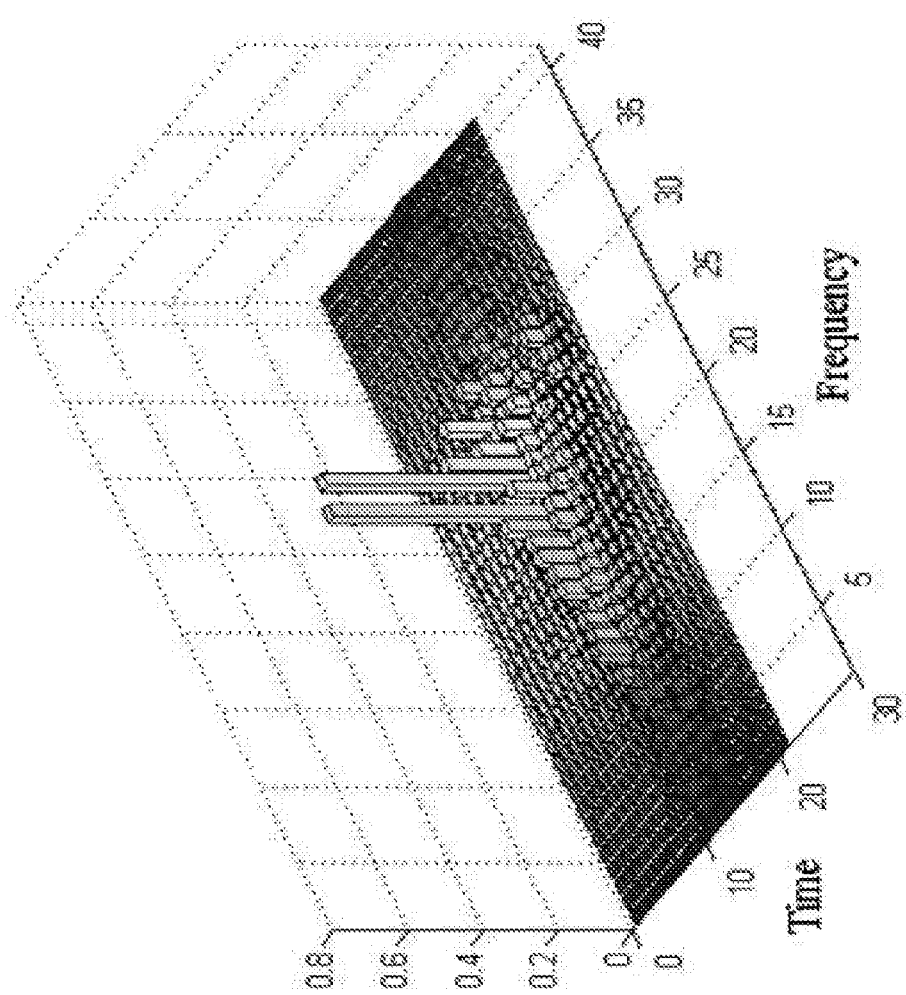
FIG. 3 shows an example of a time-frequency plot of a channel impulse response.

FIG. 3 shows how the Delay-Doppler response h(τ,v) lends itself to 2D equalizer applications for correcting various channel impairments or distortions, because in contrast to a(τ, t), which tends to vary in an apparent random manner, h(τ,v) tends to be relatively time-invariant (or at least semi-stationary), and allows the nature of the various channel impairments or distortions to be represented in a "compact" manner that lends itself to automated 2D equalization methods that correct for such channel distortions.

$$R(t) = \iint h(\tau,v) e^{j2\pi vt} S(t-\tau) d\tau dv \quad (3)$$

Figure 4:
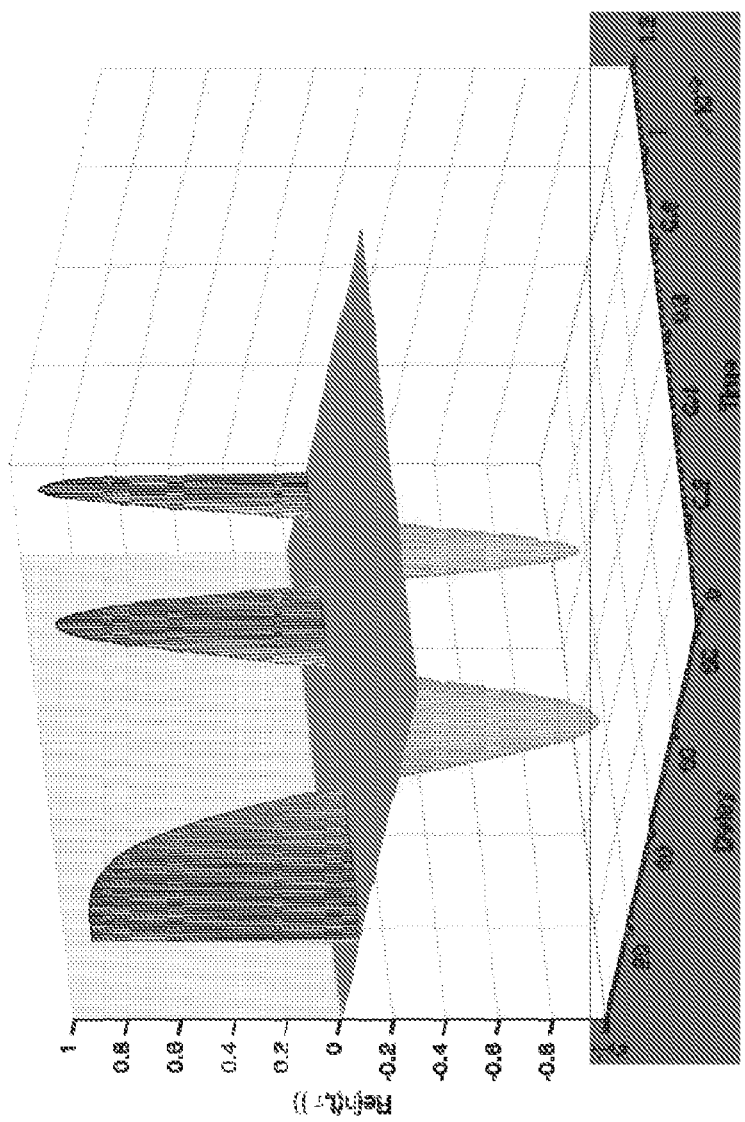
FIG. 4 shows another example of a time-varying impulse response.

FIG. 4 shows some of the difficulties of trying to work directly with the time-varying impulse response a(r, t) in a 2D equalizer to correct for various channel impairments. Here a(r, t) is shown in the case where waveforms travel directly from the transmitter to the receiver, and also bounce off of an accelerating reflector (producing a chirp like echo). Here a(r, t) is difficult to work with because the representation both is non-compact (i.e. infinitely long to represent accurately) and also it is rapidly time varying (not stationary or even quasi-stationary).

Figure 5:
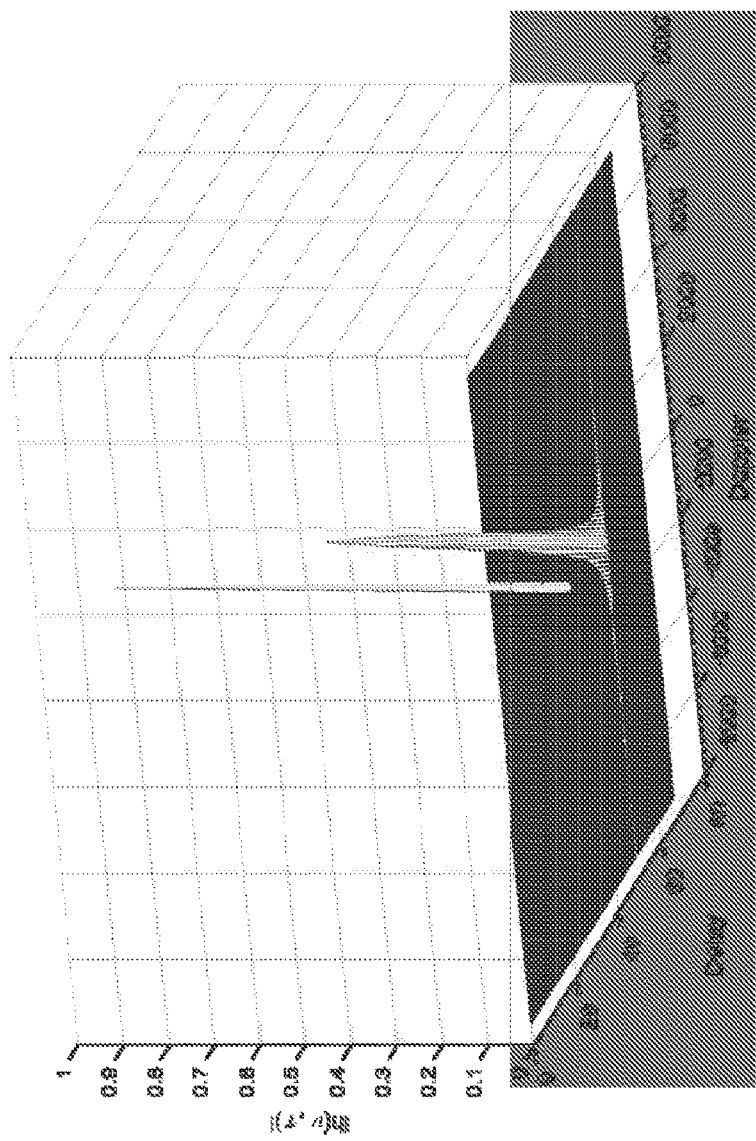
FIG. 5 shows an example graph of channel response of a primary path and a reflector in the delay Doppler domain.

FIG. 5 shows how by transforming the a(τ,t) time-varying impulse response into an alternative channel delay-Doppler response h(r, v), the problem of FIG. 4 above (waveforms travel directly from the transmitter to the receiver, and also bounce off of an accelerating reflector producing a Chirp like echo) can be greatly simplified.

Note that in this disclosure, "stationary" does not imply that the Delay-Doppler impulse never changes. The channel delay-Doppler impulse response h(τ,v) will, of course, change if the distribution of reflectors changes, or if the relative position of the transmitter or receivers changes, but in the case where there are no changes in the distribution of reflectors, transmitters, or receivers, then the Delay-Doppler impulse will in fact be stationary. In real life ground based applications, the distribution of at least major reflectors, transmitters, and receivers changes relatively slowly relative to OTFS time-frequency frame transmission times, so that typically the channel Delay-Doppler impulse response will be effectively stationary at least over the duration of a single OTFS time-frequency frame, and indeed often between adjacent OTFS time-frequency frames as well.

In some embodiments, the system can be set to transmit signals "S" (or "S(t)") in a manner that simplifies the time-variant impact of the channel estimation process. Such methods can potentially help simplify the receiver's problem of correcting for the various channel distortions and impairments (i.e. simplify channel estimation and demodulation).

In some embodiments, transmit signals "S" (or "S(t)") can utilize orthogonal basis functions where the time delay or Doppler shift of the basis function produces another basis function associated with that time shifted delay or Doppler shift parameter. Here, a set of suitable orthogonal basis functions satisfy a "Delay-Doppler covariance condition" are shown.

$$\phi_{\tau,v}(t-\tau_0) = \phi_{\tau+\tau_0,v}(t) \quad (4)$$

$$e^{j2\pi v_0 t}\phi_{\tau,v}(t) = \phi_{\tau,v-v_0}(t) \quad (5)$$

In some embodiments, the transmitted signal S(t) can be constructed by using QAM data symbols, distributed on the Delay-Doppler (information) frame (or grid, plane, domain, etc.) according to Delay-Doppler plane coordinates τ and v (the engineering nomenclature versions of these are "m" and "n").

Transmitted signal is a superposition of QAM symbols, $x_{\tau,v}$ with their component basis functions Received signal These QAM data symbols can be used to modulate suitable basis functions (here basis functions such as the orthogonal and Delay-Doppler covariant orthogonal basis functions over the entire Delay-Doppler frame, plane, or grid (again alternatively called the information frame, plane or grid), producing the previously discussed 2D OTFS time-frequency frame based wave aggregate. Note that here, the optional scrambling operation W has not yet been applied.

These simplifying assumptions allow for a deterministic, time-independent (or at least slowly time varying), and compact (i.e. no infinite series needed) representation of the communications channel that can represent, in a direct and simple manner, all of the diversity branches (e.g. all of the different communications pathways between the transmitter and the receiver) that exist in the communications channel.

Note that nonetheless, the potentially OFDM backward compatible OTFS receivers taught herein are not disclaiming the use of any and all other methods for correcting for various channel distortions and impairments.

For example, in some embodiments, an improved, higher resolution, single OTFS receiver may be used. Such a higher resolution OTFS receiver may be viewed as comprising a plurality of processor controlled OTFS receivers (here called receiver sub-sections), each receiver sub-section analyzing the received data frame according to slightly different (e.g. fractionally different, such as differing by a fraction of burst time "T" or subcarrier frequency Δf) time and frequency parameters, and then sharing the information to the receiver's processor.

The receiver's processor can then combine the information from the various receiver sub-sections to produce at least a higher resolution version of the time-frequency frame. That is, the receiver's time-frequency frame may be of a higher resolution than the transmitter's corresponding time-frequency frame. The receiver can also use the information from various receiver subsections to correct the raw incoming signal for various time delays and Doppler frequency shifts as well, this in effect implementing a different type of time-frequency 2D equalizer that works more at the level of the raw incoming waveforms.

The receiver processor may optional also use the higher resolution version of the receiver's time-frequency frame (or for that matter, also a standard resolution version of the receiver's time-frequency frame as well) and various signal cancellation techniques to do additional clean up, such as additional blind equalization steps as desired. Additionally, the receiver may utilize optional time-frequency pilot signals, encoded at the level of the transmitter time-frequency frame, rather than at the level of the transmitter delay-Doppler (or information) frame, to again help perform preliminary signal clean-up before later steps in the process. This scheme can help further improve the time and frequency resolution of the OTFS receiver, and help the improve reliability and data transmission rates as well.

Thus in some optional embodiments, any given OTFS receiver might be viewed as comprising a series of overlapping grids of several different OTFS receiver sub-sections. One of the OTFS receiver sub-sections might be tuned to operate according to the exact (i.e. expected) subcarrier range of frequencies and timing. There may additionally be a high frequency and a low frequency set of OTFS receiver sub-sections, each receiver sub-section tuned at a fraction of a subcarrier frequency higher or lower in frequency, designed to help that receiver sub-section detect and compensate for Doppler frequency shifts. For example, using 4G OFDM subcarrier bandwidths as an example, if each OTFS subcarriers has a bandwidth of 15 KHz, and the expected Doppler shifts might be on the order of 300 Hz, then one receiver subsection may be tuned 300 Hz higher in frequency, while the other receiver subsection may be tuned 300 Hz lower in frequency. Similarly assuming that time delay resolution on the order of a time slice, T(burst time length)/M(number of subcarriers) is desired, then while some receiver sub-sections would be tuned for exact burst timing, other receiver sub-sections would be tuned for slightly delayed burst timing, such as one time slice later, two time slices later, and so on.

The OTFS receiver processor can then pool data from the various frequency shifted and time shifted receiver sub-sections, and perform a raw OTFS signal level equalization or correction process as well. This can enable 2D equalization at the time-frequency plane or array level, or alternatively the results from the receiver subsections can be carried over to the delay-Doppler frame, and 2D equalization can alternatively or additionally be done at the delay-Doppler frame or plane as well. Other signal correction methods may also be used.

Put alternatively, in this embodiment, one receiver can comprise a plurality of receiver sub-sections, each receiver subsection configured with a different time and frequency offset. Here, the receiver's processor can be configured to use these receiver subsections to sample the OTFS signals (e.g. the 2D OTFS time-frequency frame based wave aggregate) with a time-frequency resolution that is higher than the subcarrier bandwidths and burst times used by the OTFS transmitter in this case. This higher granularity or higher resolution is useful for the 2D equalization process.

Figure 6:
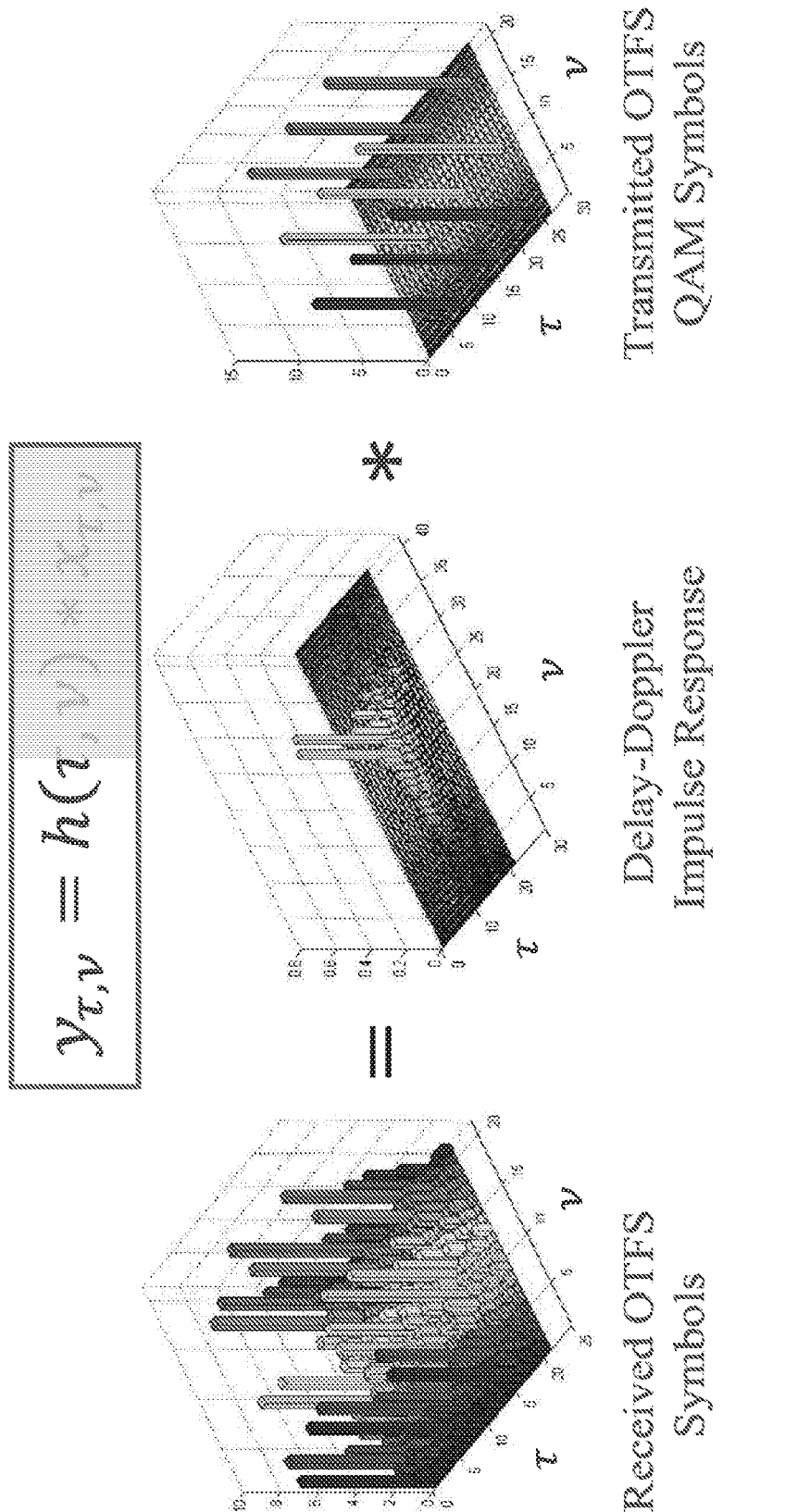
FIG. 6 shows a graphical representation of an example of distortion experienced by received symbols.

FIG. 6 shows one of the key assumptions of the OTFS approach (represented in the alternative $\tau$, v nomenclature) which is that the received OTFS symbols, here represented as $y_{r,v}$ are equivalent to the transmitted OTFS symbols, here represented as $x_{r,v}$, after convolution by the channel Delay-Doppler impulse response, here represented as $h(r, v)$. Here again, another simplifying assumption is to represent the channel Delay-Doppler impulse response $h(r, v)$ at the same level of resolution (e.g. same number of quantization or digitization steps) as the resolution (number of quantization or digitization steps) of the different burst times and different frequency subcarriers used to transmit the OTFS waveforms. This assumption is generally fairly accurate so long as the different burst times T and different frequency subcarriers $\Delta f$ are set according to the teaching discussed herein. However other levels of resolution may also be used as desired.

Figure 7:
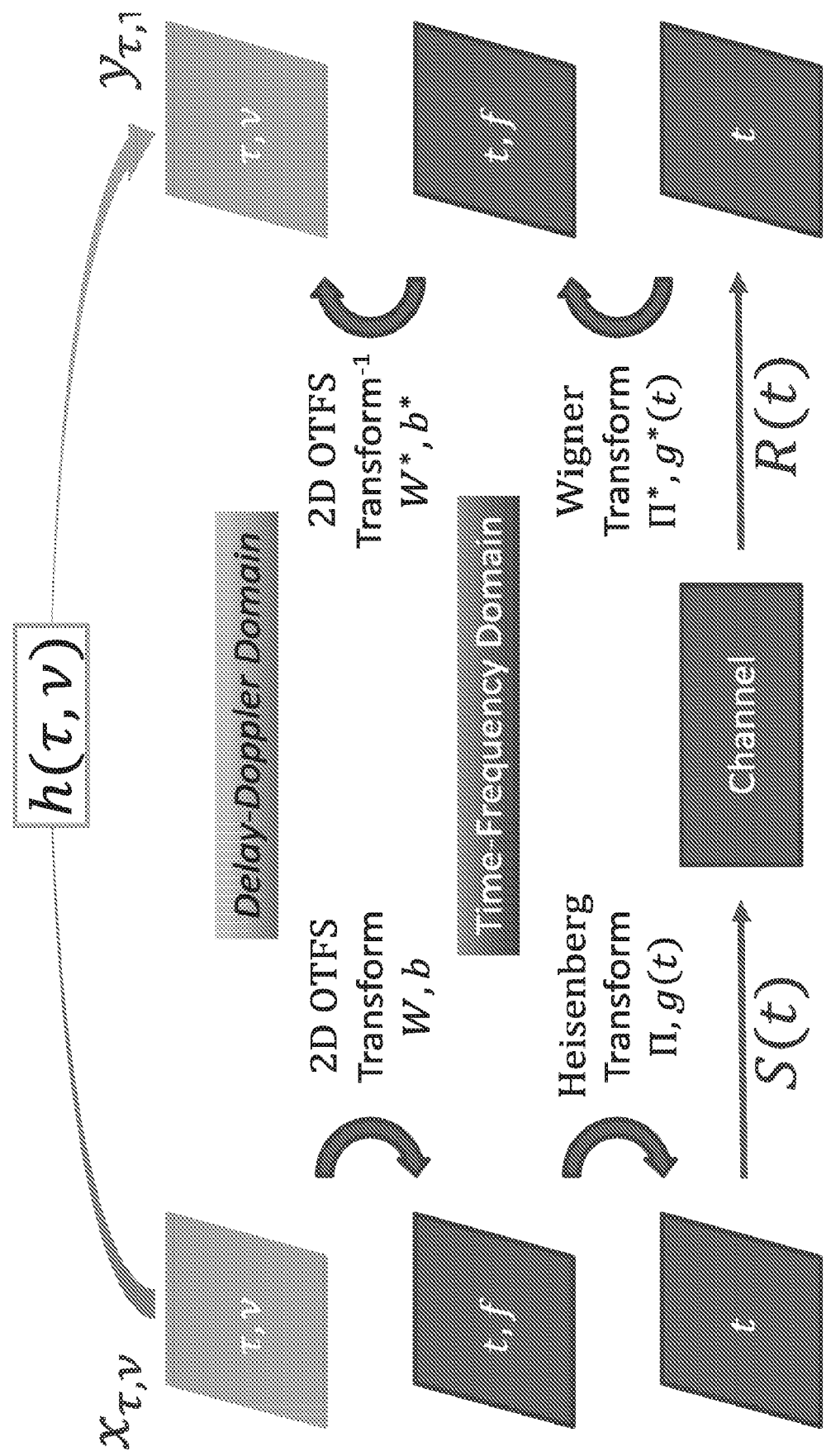
FIG. 7 shows an example of information frame transmission through an OTFS system.

FIG. 7 shows a high level diagram showing how many of the various OTFS methods described herein work together to transmit an information payload of symbols $x_{r,v}$ from the transmitter, through the data channel where the channel will degrade the various transmitted waveforms according to that channel's Delay-Doppler impulse response $h(r, v)$, and ultimately end up at the receiver reconstructed as replica channel distorted payload symbols $y_{r,v}$. These can then be cleaned up after the hard journey, and (generally) corrected for the various channel impairments by a 2D equalizer that applies an inverse of the channel's Delay-Doppler impulse response $h(r, v)$ (here called $h^*(r, v)$).

As an example, the Heisenberg transformation is given by a weighted superposition of time and frequency shifted basis function g. See, e.g., FIG. 7.

Here again the "Delay-Doppler Domain" refers to the Delay-Doppler frame, plane, frame or grid, also referred to as the Information plane, frame or grid discussed elsewhere. Note that both the transmitter and the receiver have their own versions of the delay-Doppler frame or information frame (not shown).

Similarly the "Time-Frequency Domain" can be viewed as referring to the Time-Frequency frame (plane, frame, or grid), or the signal (plane frame or grid) discussed elsewhere. Here again, both the transmitter and the receiver have their own versions of the time-frequency frame (not shown).

In this diagram shows, in a high level mathematical form, some of the operations of the OTFS receiver on the left, and the some of the operations of the OTFS transmitter on the right. The wireless channel is in the middle.

Here again, the assumption is that we will be characterizing the channel impairments using the same number of digitized steps as the number of different time and frequency steps used to transmit the signals. In this simplified case, the same variables $\tau$ and v may be used, depending on context, according to more than one underlying meaning. See Tables 2 and 3 for further definitions.

Figure 8:
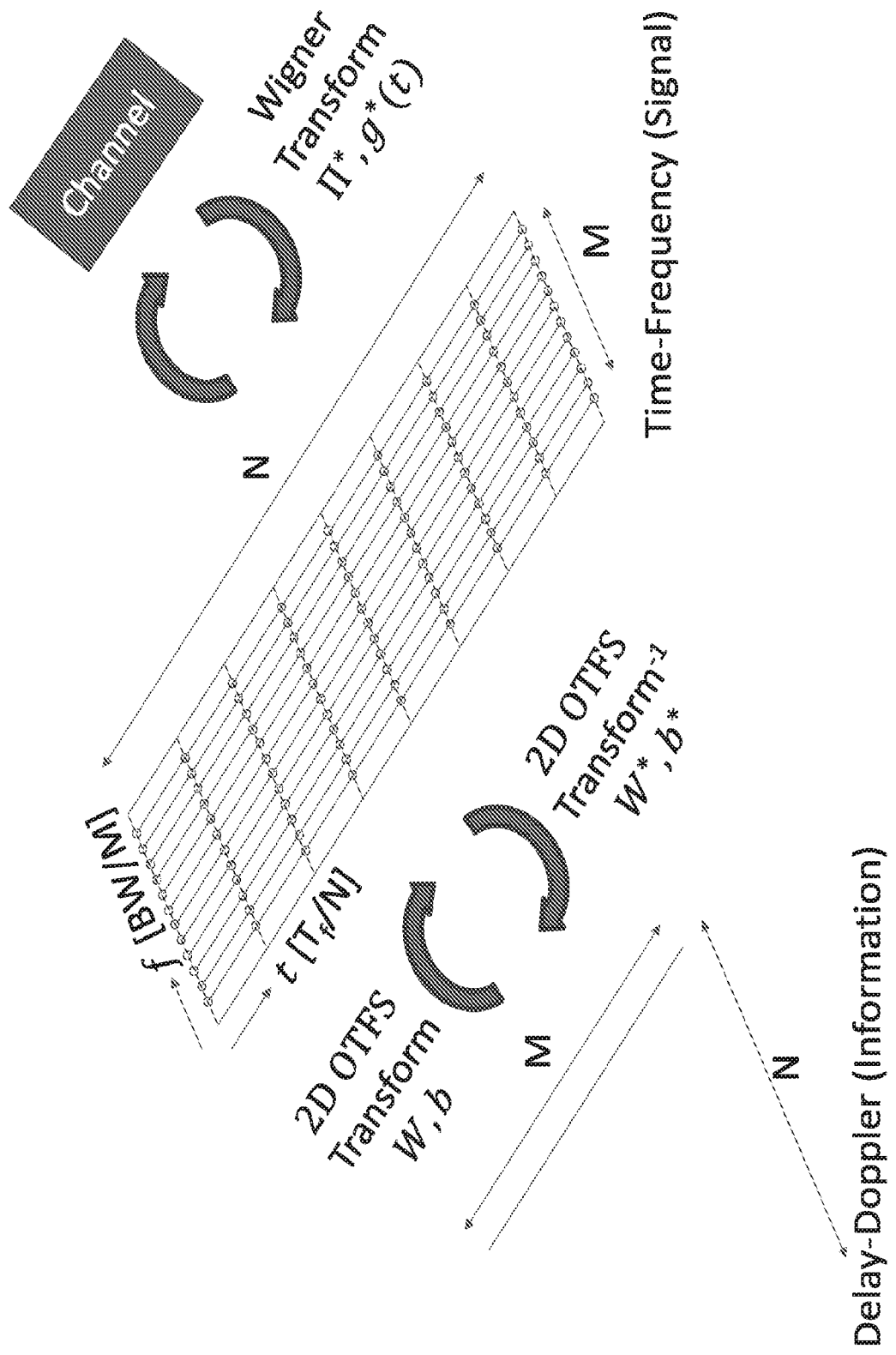
FIG. 8 shows another example of information frame transmission through an OTFS system.

FIG. 8 shows a relationship between the various coordinates and frames that will often be used in the following discussion of certain embodiments. This figure also puts various terms such as W, b, $\Pi$, g(t) and their inverses into context. Here the original data symbols, distributed on the Delay-Doppler (or information) frame (or plane), are converted to an alternative Time-Frequency or signal frame (or plane) according to the 2D OTFS transformation described herein.

In some embodiments described herein, information symbols are indexed by points on a lattice in the Delay-Doppler domain. Through the OTFS-Transform each QAM symbol weights a 2D basis function defined in the Time-Frequency domain. The transformed time-frequency samples are modulated using a filter bank. OTFS transmit and receive symbols are simply and compactly related through a 2D convolution with the Delay-Doppler impulse response.

As FIG. 8 shows, data symbols distributed over an M×N sized 2D delay-Doppler frame will often end up as a waveform aggregate over a corresponding 2D OTFS time-frequency frame.

Portions of this 2D OTFS time-frequency frame will (according to a scanning process in which eventually all portions are transmitted) end up being transmitted over M narrow-band subcarriers and over N time intervals.

However in some embodiments, other schemes may also be used. The main constraint is that in a preferred embodiment, the granularity and extent of the frequency filtered portions, number (plurality) of narrow-band subcarriers, and the number of the time intervals should be chosen to accurately characterize the 2D OTFS time-frequency frame based wave aggregate. If not, of course there can be a risk of data loss. As previously discussed, very high fidelity "lossy" methods with error rates of less than 1 in a million or one in a billion will be considered to be effectively lossless for purposes of this discussion.

Figure 11:
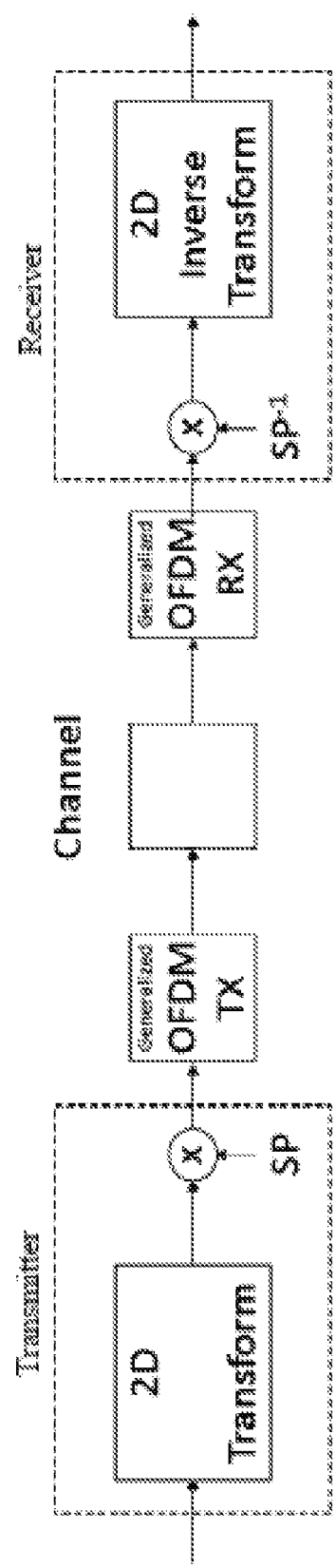
FIG. 11 is an example of a back-to-back arrangement of a transmitter and a receiver coupled through a communications channel.

Using both FIGS. 8 and 11 as a reference, the various modulated "OTFS data symbol" time interval based packets or bursts then traverse the wireless channel, where they encounter various distortions such as various time delays and Doppler frequency shifts, before they are then received by the wireless receiver. This wireless receiver receives, over this channel, these channel distorted portions of the OTFS time-frequency frame based wave aggregate, over the plurality of narrow-band subcarriers (e.g. M subcarriers), over the plurality of time intervals (e.g. N time intervals), until the wireless transmitter has transmitted all portions of the 2D OTFS time-frequency frame based wave aggregate. Over time, the receiver thus receives a channel distorted replica of the 2D OTFS time-frequency frame based wave aggregate.

The receiver (or transceiver) will then typically use it's at least one processor(s) and an inverse of the original transform to demodulate this channel distorted replica of the 2D OTFS time-frequency frame based wave aggregate. This will produce, once substantially all of the various portions have been received, a channel distorted replica of the 2D OTFS delay-Doppler frame. The receiver will usually be a digital receiver and this replica of the 2D OTFS delay-Doppler may often be stored in memory.

Here, however, the original OTFS symbols and underlying data symbols have been smeared or distorted by the various channel distortions. To correct for this effect, typically the method will use at least one receiver (or transceiver) processor to implement and use at least one 2D equalizer, such as a delay-Doppler 2D equalizer, to correct this channel distorted replica of the 2D OTFS delay-Doppler frame, thereby producing a channel deconvoluted 2D OTFS delay-Doppler frame. Once this is done, the receiver or transceiver processor(s) can then automatically extract this plurality of (now cleaned up or deconvoluted) replica data symbols from the channel deconvoluted 2D OTFS delay-Doppler frame.

Note that although this example explores the complete process of sending and receiving data, of course this patent document also covers the transmitter and receiver method/ process, system, and device(s). Thus some embodiments may include a method of receiving data symbols as above, or transmitting data symbols as described above. Some embodiments may be a transmitter system or device configured to transmit data symbols as above, or a receiver system or device configured to receive data symbols as above.

Put alternatively, FIG. 8 shows a relationship between the various coordinates and frames that will often be used in the following discussion of certain embodiments. As will be discussed, data symbols (often a represented by a complex number such as a QAM symbol) are distributed over the 2D OTFS delay-Doppler frame. In some embodiments, this frame will be an N×M grid or lattice, where N and M are integers greater than one, and may in some embodiments correspond to the number of subcarriers "m" and number of signal bursts "n" per transmitted and received frame of data.

As previously discussed, the 2D OTFS delay-Doppler frame and also the 2D OTFS time-frequency frames can be viewed somewhat as virtual constructs intended to make it easier to visualize the disclosed technology. Both types of frames can be implemented according to processor instructions and memory, as exemplified by the various math examples provided here.

Nonetheless, it can be very useful to view the 2D OTFS delay-Doppler frame to have dimensions according to more physical parameters, $\tau$ and $v$, that are determined by the characteristics of the transmitters and receivers, as well as the times and range of frequencies used to transmit data frames. Here, for example, the value $\tau$, when used as an index ("m" can also be used), can report on the number of subcarriers used to transmit data. The value $v$, when used as an index (n can also be used), can report on the number of bursts used to transmit data per subcarrier.

As previously discussed, physically, the 2D OTFS time-frequency frame can be viewed as having a total bandwidth BW. Thus for example, if the plurality of bandwidths of the narrow-band subcarriers is M, then each subcarrier will have its own bandwidth of BW/M. This can alternatively be viewed as being the f (frequency-like) axis, due to the relationship between frequency and bandwidth. Here the "l" index can alternatively be used as an index to denote a given subcarrier in question.

In this scheme, assume further that the 2D OTFS time-frequency frame will be transmitted over N time intervals and that the minimum time (assuming no interleaving) to transmit this frame is Tf. Then each time interval would be Tf/N. This can alternatively be viewed as being the t (time-like) axis. Here the "k" index can alternatively be used as an index to denote the position in time of a given subcarrier burst. If OFDM methods are used in which all subcarriers carry bursts at the same time, then the "k" index effectively reports on the position in time of an OFDM symbol burst in all subcarriers. If OFDM backward compatibility is relaxed somewhat, however, then the timing of a given burst in a subcarrier may also be influenced by the subcarrier index "l", which can denote, for example, a time slice shift such as l T for any given subcarrier burst, M where again T is the time per burst, and M is the number of subcarriers As will be discussed, the data symbols from the 2D OTFS delay-Doppler frame are losslessly and invertably transformed into a wave aggregate over the 2D OTFS time-frequency frame. In some schemes, portions of this wave aggregate (often columns consisting of M narrow band subcarriers) are narrow band filtered and transmitted by the transmitter over various time intervals, such as over N time intervals. However other portions and time intervals may also be used. The main criteria are that whatever sampling, portion, and time interval period used should accurately characterize the wave aggregate. Here "accurate" can range from "lossless" to "effectively lossless or nearly lossless" (e.g. the net result should result in data symbols being transmitted at an acceptable error rate).

On the receiver side, these channel distorted portions will be received by the receiver, and eventually a channel distorted replica of this 2D OTFS time-frequency frame will be received (and often stored in receiver memory). The inverse of the original lossless and invertible transformation can then be used to produce a channel distorted replica of the original 2D OTFS delay-Doppler frame. Here the resolution of this channel distorted 2D OTFS delay-Doppler frame is shown to be the same M×N resolution of the original 2D OTFS delay-Doppler frame, but in reality, due to channel distortions, the received data symbols will be smeared over this frame. Thus it may, in some embodiments, be useful to view at least the resolution of the channel distorted 2D OTFS delay-Doppler frame as needing to have a higher than M×N resolution in order to optimally account for this smearing. Such higher resolution may be achieved by, for example, using a receiver comprised of a plurality of different receivers, each with somewhat different frequency and time settings, as described previously.

In either event, as will be discussed, at least one 2D equalizer can then be used to correct for these channel distortions, thus eventually creating a channel deconvoluted 2D OTFS delay-Doppler frame (not shown). The replica 2D data symbols can then be extracted from this channel deconvoluted 2D OTFS delay-Doppler frame.

Although not intended to be limiting, as previously discussed, a good example of a useful set of mutually orthogonal 2D basis wave functions are the 2D Fourier basis functions. In this case, the previously described transformation and inverse transformation can comprise Fourier like transforms, such as various discrete or symplectic or digital approximations of Fourier like transforms. These can be considered to be Inverse Fast Fourier-like transforms and a Fast Fourier-like transforms. As previously discussed, it may also be useful to consider use of delay-Doppler covariant basis functions, as these functions may, to some extent, help mitigate the effect of time delays and Doppler frequency shifts on the received signals as the signals traverse the channel.

In some embodiments, it may also be useful to have the transformation further comprise yet another type of scrambling operation, here termed Wa (k,l). Here the inverse of this transformation will generally further comprise an additional inverse scrambling operation. One example of such a scrambling operation is a 2D chirp function. Another example of such a scrambling operation can include Hadamard products (Hadamard transform—also known as Schur products or entrywise products). These are binary operations that can take two matrices of the same dimensions (e.g. either a first 2D OTFS delay-Doppler frame or first 2D OTFS time-frequency frame and a scrambling operation matrix), and produces another matrix (the scrambled version of these frames) where each element (l, j) is the product of elements (l, j) of the original two matrices. Other scrambling methods may also be used.

Figure 9:
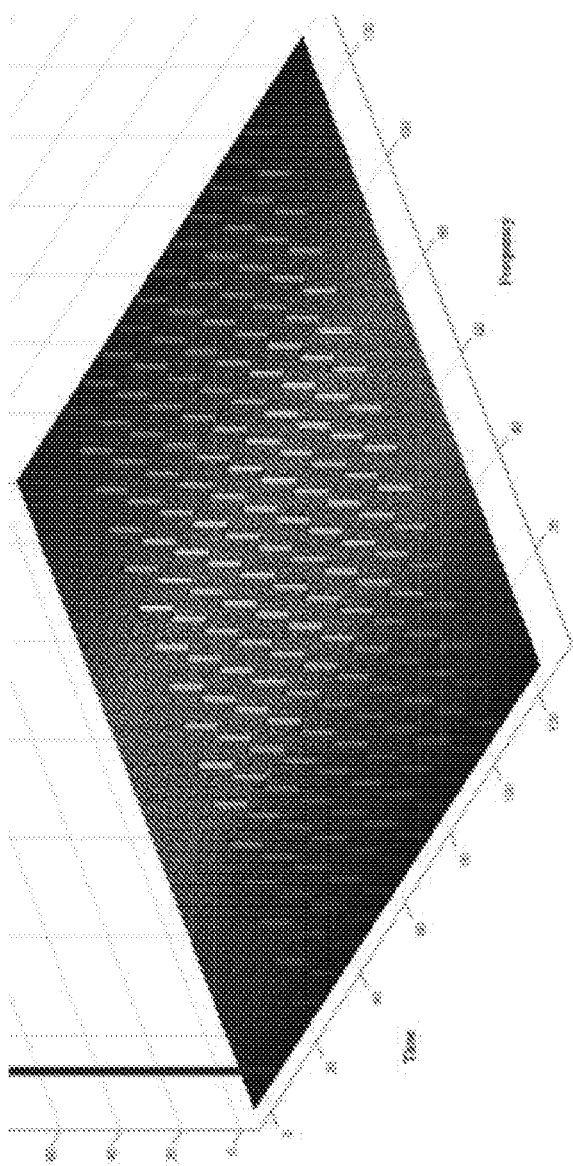
FIG. 9 is a graphical representation of an example of a pilot signal.

FIG. 9 shows how the information payload (e.g. information QAM symbols) can be distributed at various locations on the Delay-Doppler frame (plane, grid, domain), alternatively called the information frame, plane, grid or domain. In some cases, instead of information payload symbols, one or more pilot symbols may be used instead. In this example, in addition to a Delay-Doppler pilot symbol at location 0, 0, the $\tau=0$ and $v=0$ locations have also been cleared (this can be viewed as being a type of negative or no energy Delay-Doppler pilot symbols). Typical values used for M×N may include 1024×256 or 512×16. In some embodiments, one pilot may substitute on of the information QAM symbol for channel sounding and acquisition.

Figure 10:
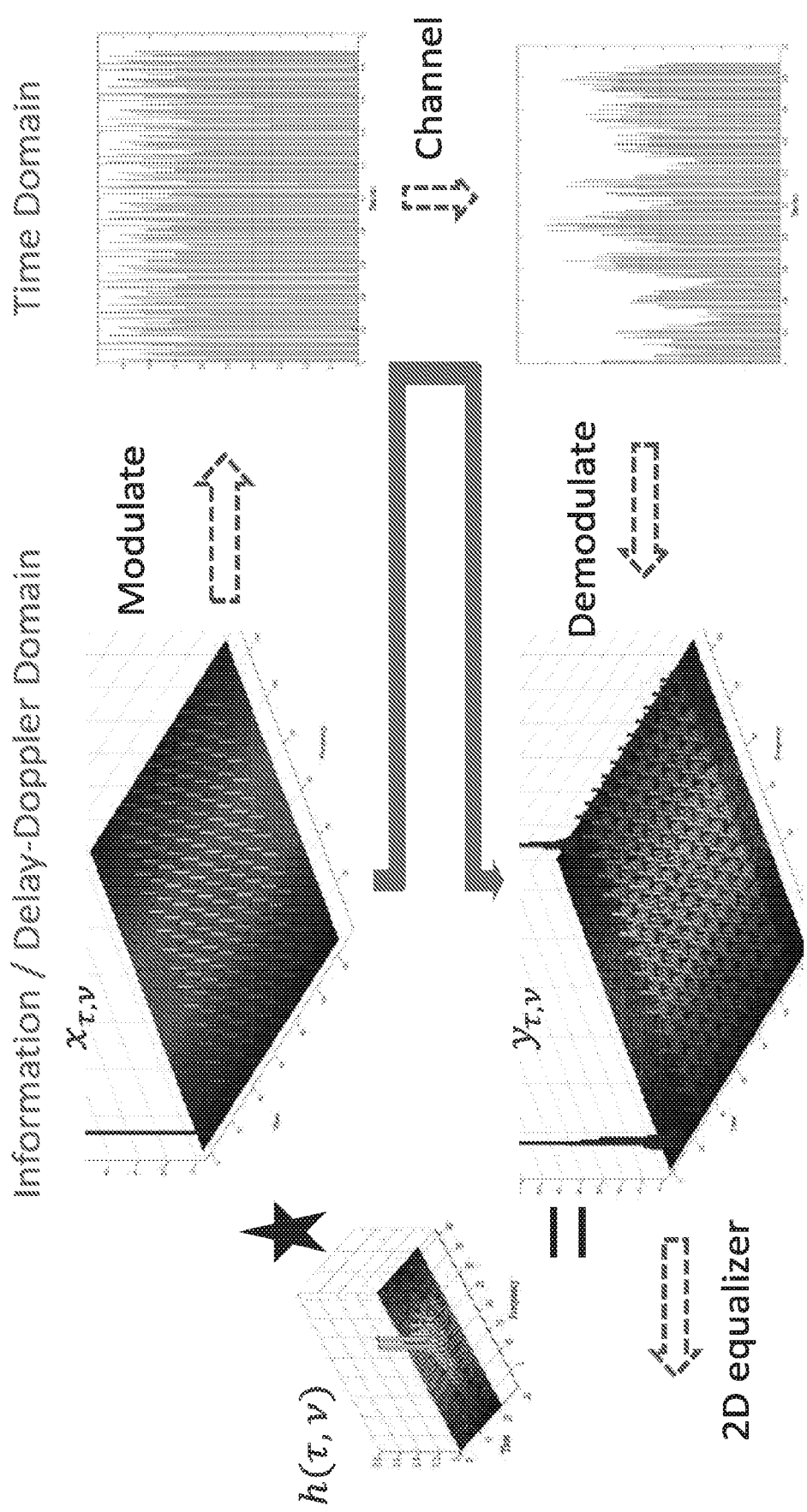
FIG. 10 graphically depicts an example of information data transformed into delay-Doppler domain and back into the data domain.

FIG. 10 shows a graphical illustration of how the payload data symbols xr,v (information QAM symbols) and pilot symbols, originally distributed over various locations on the transmitter's Delay-Doppler domain (plane, frame, grid) also called the Information domain (plane, frame, grid) are, after modulation and transmission through the channel, and demodulation at the receiver, are subsequently received as channel distorted versions of their original selves on the receiver's Delay-Doppler frame (domain, plane, frame, grid). The receiver's delay-Doppler 2D equalizer, using the channel impulse response h(r, v) can clean this up, producing replica data symbols yr,v at the receiver. Here the receiver can use its knowledge pertaining to the Delay-Doppler pilot signal to measure how the pilot signal was dispersed throughout the channel, and use this to determine the channel impulse response h(r, v) that is subsequently used by the Delay-Doppler 2D equalizer.

Some examples of typical wireless frequencies, bandwidths, and time intervals used include:
Time Frequency grid spacing dictates Max delay & Max Doppler prior to aliasing effects
Time Frequency grid span (Size or extent) dictates delay & Max Doppler resolution
Sub-band spacing dictates Max Delay $<(\frac{1}{2}\tau_{max})$
<100[Khz] for 5[us] max delay
Time Interval spacing dictates Max Doppler $<(\frac{1}{2}f_{max})$
<1.67 [ms] for 300 [hz] max Doppler
Time Span dictates Doppler resolution $(1/T_f)$
40 [hz] resolution @ 25 [ms] frame duration
Frequency span dictates delay resolution (1/BW)
100 [ns] @10 [Mhz] BW As is shown in FIG. 10, in some embodiments, the anticipated wireless time delay and anticipated wireless Doppler shift of the channel can be used to help configure parameters of either the 2D OTFS time-frequency frame or the 2D OTFS delay-Doppler frame.

As previously discussed, in some embodiments, the transmitter can be an OFDM backward compatible transmitter, and the receiver can be an OFDM backward compatible receiver. Here the plurality of narrow band subcarriers can be a plurality of narrow-band OFDM subcarriers. In these embodiments, the OFDM backward compatible transmitter can transmit the frequency filtered portions of the 2D OTFS time-frequency frame based wave aggregates, over the plurality of narrow-band OFDM subcarriers, over a plurality of time intervals.

This can be done in various ways. In particular, in some embodiments, it may be useful to employ various types of interleaving techniques. This can be done either within a given OTFS frame (see FIG. 18, which shows some OFDM symbols being transmitted in-between transmitting time portions of an OTFS frame), or outside of the frame (e.g. transit a first complete frame using OTFS methods, and another complete frame, over the same narrow band subcarriers, as an OFDM frame. Thus in this embodiment, there may be at least some legacy OFDM symbols transmitted over at least some narrow-band OFDM subcarriers and/or over at least some time intervals. When compatibility with legacy OFDM operation is desired, it will often be useful to revert back to standard OFDM methods in which the various bursts over all of the subcarriers are sent at the same time (that is, no staggering of bursts according to different time slices will be used).

FIG. 11 gives an example of how the transmitter and receiver can operate over a wireless data channel. At the transmitter, which may be an OFDM backward compatible transmitter, the data symbols are packaged into frames, transformed into the wave aggregate, and selected portions from this wave aggregate are frequency filtered (often using a filter bank, where each narrow band subcarrier, such as a narrow band OFDM subcarrier, may have its own filter), and transmitted over a plurality of narrow-band subcarriers, such as narrow band OTDM subcarriers. These wireless signals then pass through the wireless channel, where they encounter various distortions (e.g. delayed by echo reflections, subject to frequency Doppler shifts). At the receiver, which may be an OFDM backward compatible receiver, an inverse of this process occurs. The received signals may be corrected for various channel distortions at the "raw" stage using a 2D equalizer operating on the time-frequency plane (array), or alternatively (and what is particularly unique about OTFS methods), the 2D equalizer may operate at a later stage at the delay-Doppler plane (grid, array).

For example, at the receiver, after demodulation and optional signal level equalization by an inverse basis set such as $$b^*_{m,n}(k, l) = e^{j2\pi\left(\frac{lm}{M} - \frac{kn}{N}\right)} \tag{6}$$

An inverse of the spreading/scrambling operation $W_a^*(k,l)$ can then be applied to undo the effects of the earlier scrambling/spreading operation $W_a(k,l)$ by:

$$X(k,l) = W_a^*(k,l)\Theta_a(k,l) \quad (7)$$

An inverse of the original 2D symplectic Fourier transform can then be applied to retrieve a form of the original transmitted "payload" symbols such as $x(m,n)$ by:

$$x(m,n) = \Sigma_{l=0}^{N-1} \Sigma_{k=0}^{N-1} X(k,l) b_{m,n}^*(k,l) \quad (8)$$

These data symbols may be further cleaned up by a 2D equalizer operating on the delay-Doppler frame as desired.

Figure 12:
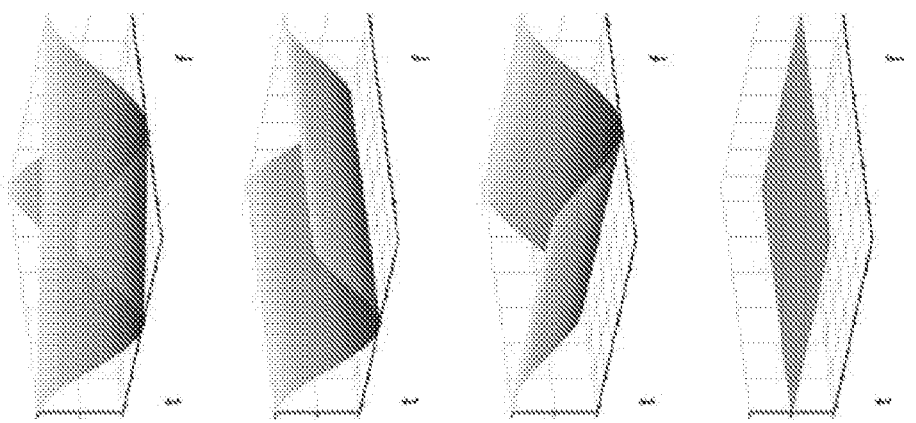
FIG. 12 shows examples of delay-Doppler waveforms and their time-frequency domain counterparts.
Figure 12:
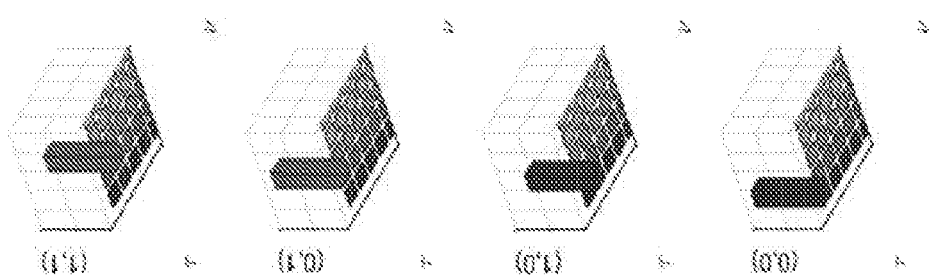

FIG. 12 shows a representation of the relationship between various coordinates on the 2D OTFS delay-Doppler frame (domain, grid, etc.) and various unique 2D basis wave functions on the 2D OTFS time-frequency frame.

The wireless channel could be characterized as:
Time-varying delay impulse response, a, is converted to delay-Doppler impulse response, h
Related through the Fourier Transform of a along the time dimension
h directly represents the geometry of the reflectors in the wireless channel
a is not localized in the time dimension
h is localized around the origin of the delay-doppler plane
Compact channel representation
Much simpler channel estimation and prediction $$\varphi_r(t) = \int a(\tau,t) \cdot \varphi_t(t-\tau) d\tau \quad (9)$$

$$= \int\int h(\tau,\upsilon) e^{j2\pi\upsilon t} \varphi_t(t-\tau) d\tau d\upsilon$$

$$h(\tau,\upsilon) = \int a(\tau,t) e^{-j2\pi\upsilon t} dt$$

Where the term h is the delay Doppler impulse response.

$$\varphi_r(t) = \int\int_{\tau\upsilon} h(\tau,\upsilon) e^{j2\pi\upsilon t} \varphi_t(t-\tau) d\tau d\upsilon \quad (10)$$

↑
Delay-Doppler Impulse Response

Figure 13:
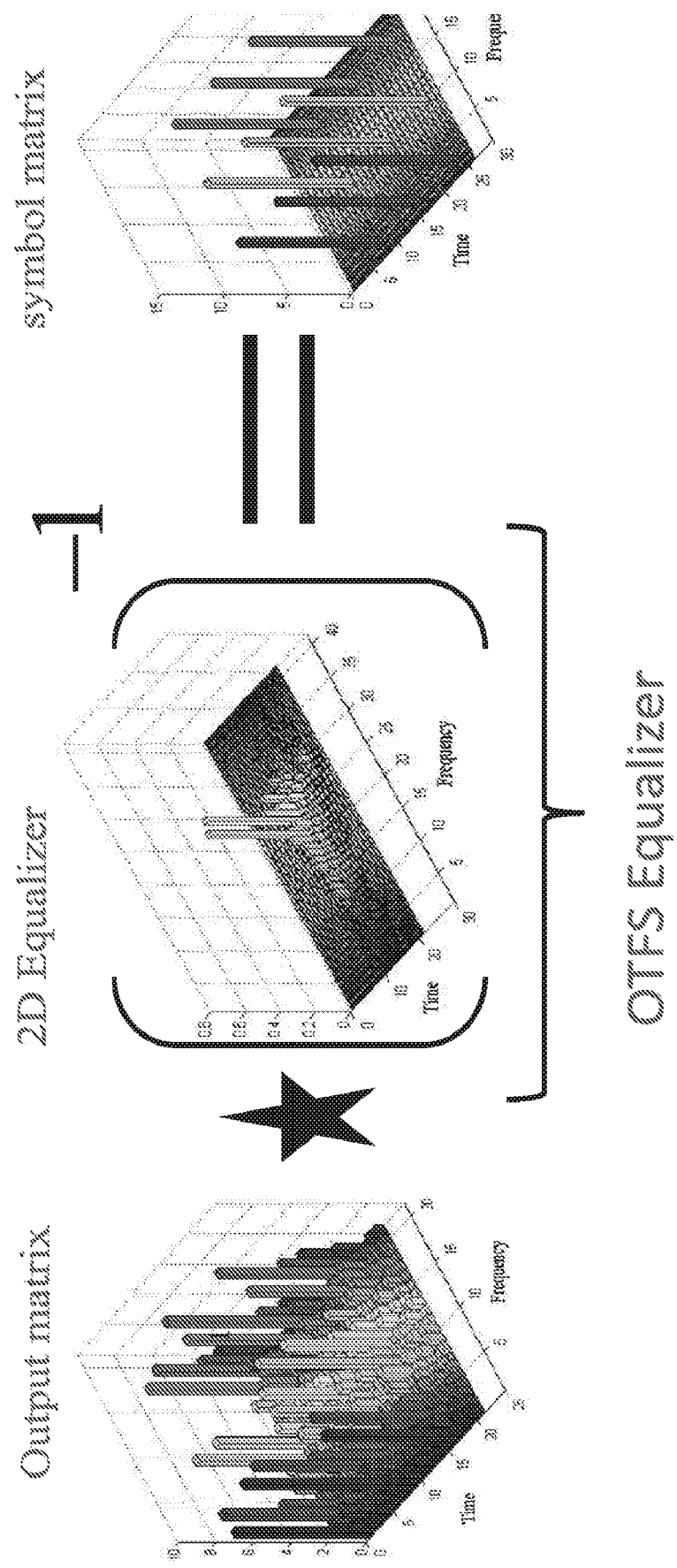
FIG. 13 shows example spectra of signals during OTFS receiver-side processing.

The following properties are associated with the Delay-Doppler impulse response:
Delay-Doppler impulse response is two dimensional
Can cover Multiple reflectors and different distances and velocities
Delay-Doppler impulse response fully characterizes the geometry of the wireless channel
Delay-Doppler impulse response represents all diversity branches that exist in the channel
Delay-Doppler impulse response is stationary, compactly represented and localized FIG. 13 shows in more detail how knowledge of the Delay Doppler Impulse response can, essentially by configuring a 2D equalizer to do an inverse of this Delay Doppler Impulse response, clean up the channel distorted replica of the 2D OTFS delay Doppler frame. In the OTFS Time-Frequency plane, all bits undergo the same distortion. De-blurring the bits with distortion reveals the true transmitted signal In the process of transforming the data symbols on the 2D OTFS delay-Doppler frame can operate. Here each data symbol and frame location is used to modulate a unique 2D basis wave function, eventually creating a 2D OTFS time-frequency frame based wave aggregate".

A mathematical description of the process is provided with reference to the 2D symplectic transform equations below. Here $X(k,l)$ is the "wave aggregate", which essentially corresponds to an OTFS symbol prior to an optional spreading/scrambling operation, and before the OTFS symbol is used to modulate a subcarrier carrier tone. Here the underlying "payload" data symbols are designated as $x(m,n)$, and these are distributed over the 2D OTFS time-frequency frame as previously described. The basis function $b(m,n)$, which can be a two dimensional Fourier basis function, and which in some embodiments can also be a Delay-Doppler covariant basis function, has also been previously described. Note that the portions from this aggregate are controlled by the range of the indexes on the summation sign.

Here the term "symplectic" can, in some embodiments, be used in the strict mathematical sense. Alternatively, however, symplectic may also be used to emphasize that in some embodiments, at least the 2D OTFS time-frequency frame may be continuous and hold waveforms (e.g. be differentiable). In practice, given nearly all of the operations will be done using digital electronics, transmitted by photons, and stored in computer memory cells as bits and bytes, there will often be at least some granularity all of the frames discussed herein. However use of the term "symplectic" is at least useful as a reminder that the granularity (e.g. resolution) of at least some of the various frames may, on some occasions, be substantially higher than the specific M×N frames used in the examples. For example, in some embodiments, at least some of the frames may have a resolution of various multiples of M×N, such as rM×sN, where r and s may be integers greater than 1. This is particularly true on the receiver side, because the receiver has to cope with various types of channel distortions.

The 2D Symplectic Fourier Transform $$X(k,l) = \sum_{m=0}^{M-1} \sum_{n=0}^{N-1} x(m,n) b_{m,n}(k,l) \quad (11)$$

$$b_{m,n}(k,l) = e^{-j2\pi\left(\frac{lm}{M} - \frac{kn}{N}\right)} \quad (12)$$

The 2D Inverse Symplectic Fourier Transform $$x(m,n) = \sum_{l=0}^{M-1} \sum_{k=0}^{N-1} X(k,l) b_{m,n}^*(k,l) \quad (13)$$

$$b_{m,n}^*(k,l) = e^{j2\pi\left(\frac{lm}{L} - \frac{kn}{K}\right)} \quad (14)$$

Figure 15:
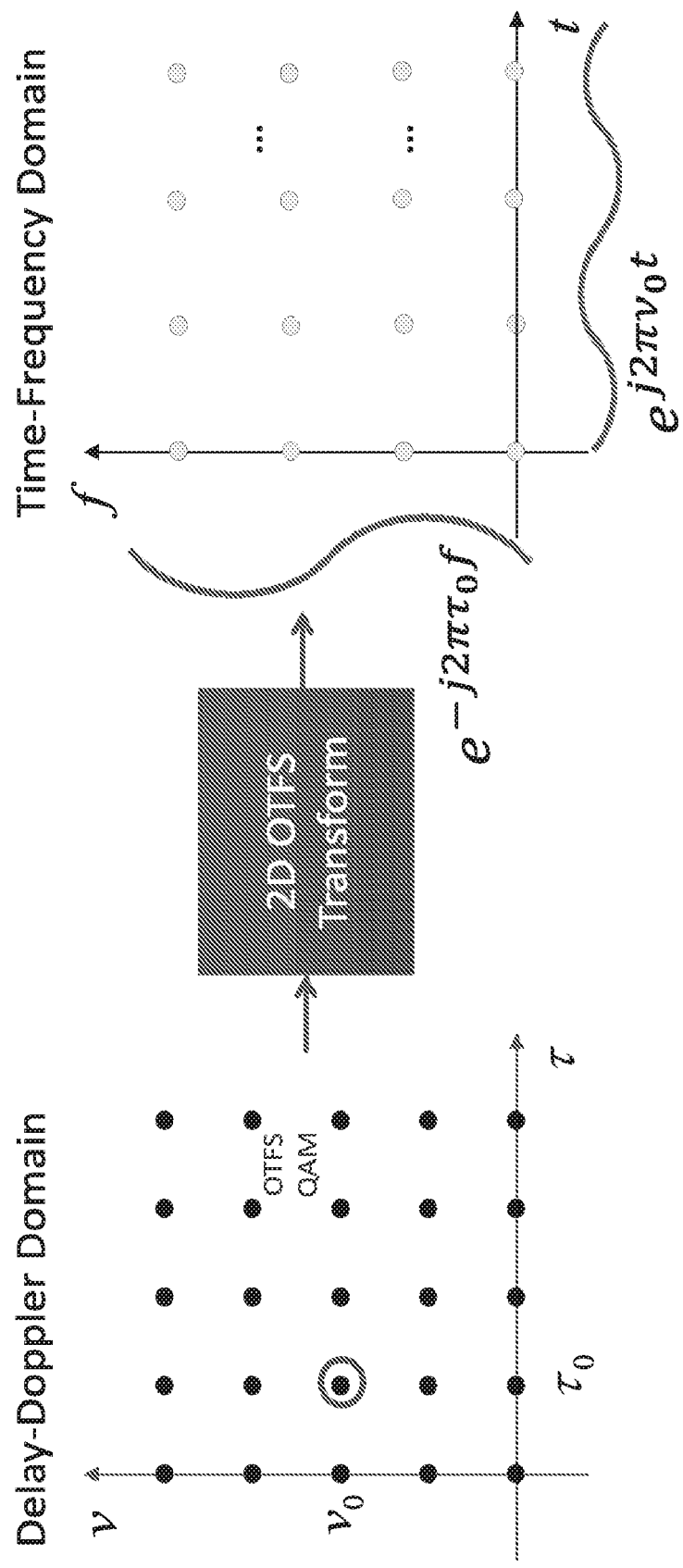
FIG. 15 shows another example of transforming OFTS QAM signal onto a time-frequency grid.

FIG. 15 shows another example of how data symbols (such as QAM symbols) distributed over the 2D OTFS delay-Doppler frame (or domain) are, as a result of the transformation (here termed the 2D OTFS transform) transformed and used to modulate 2D basis wave functions over the 2D OTFS time-frequency frame (or domain).

Figure 16:
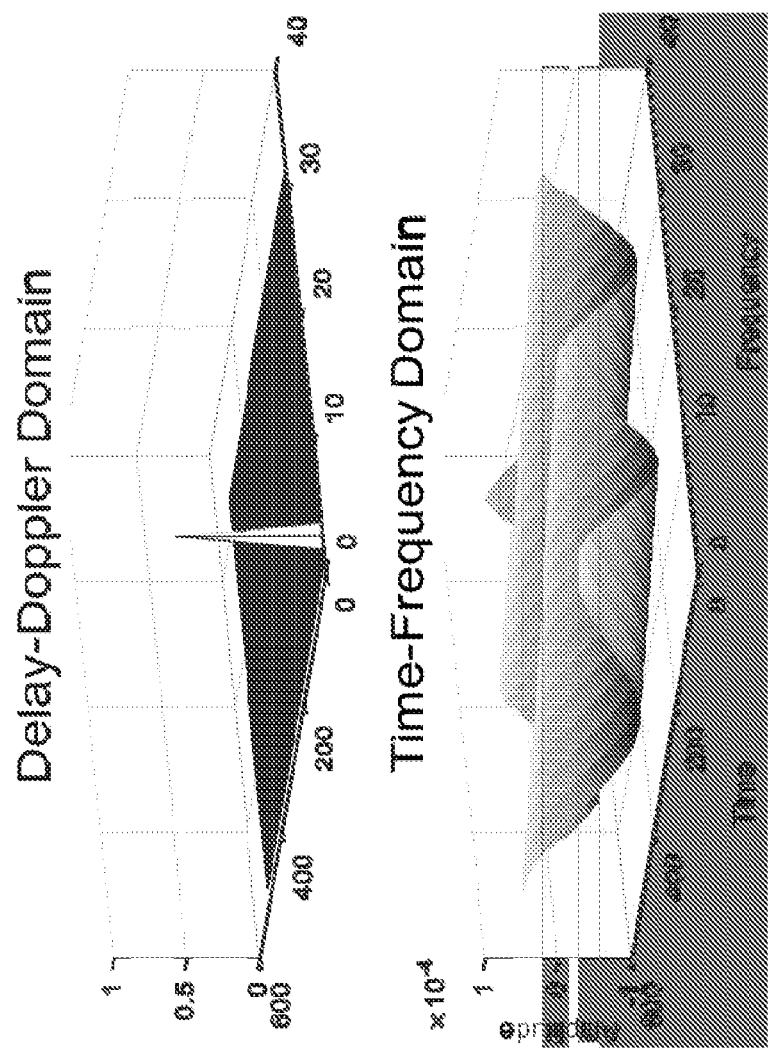
FIG. 16 is a graph showing an example OTFS basis function.

OTFS QAM symbol is represented as a multiplication of two linear phases
Frequency in the time domain is the Doppler parameter of the symbol
Frequency in the frequency domain is the delay parameter of the symbol FIG. 16 shows more details of how the data symbols (in this example, QAM symbols) are transformed from the 2D OTFS delay-Doppler frame (domain) to the 2D OTFS time-frequency frame (domain). QAM symbols are placed in the 2-D Delay-Doppler Domain, QAM symbols are placed in the 2-D Delay-Doppler Domain, Transmitted signal is a superposition of multiple QAM symbols weighting the 2-D basis functions, Transmitted signal is a superposition of multiple QAM symbols weighting the 2-D basis functions, by maintaining orthogonality.

Figure 17:
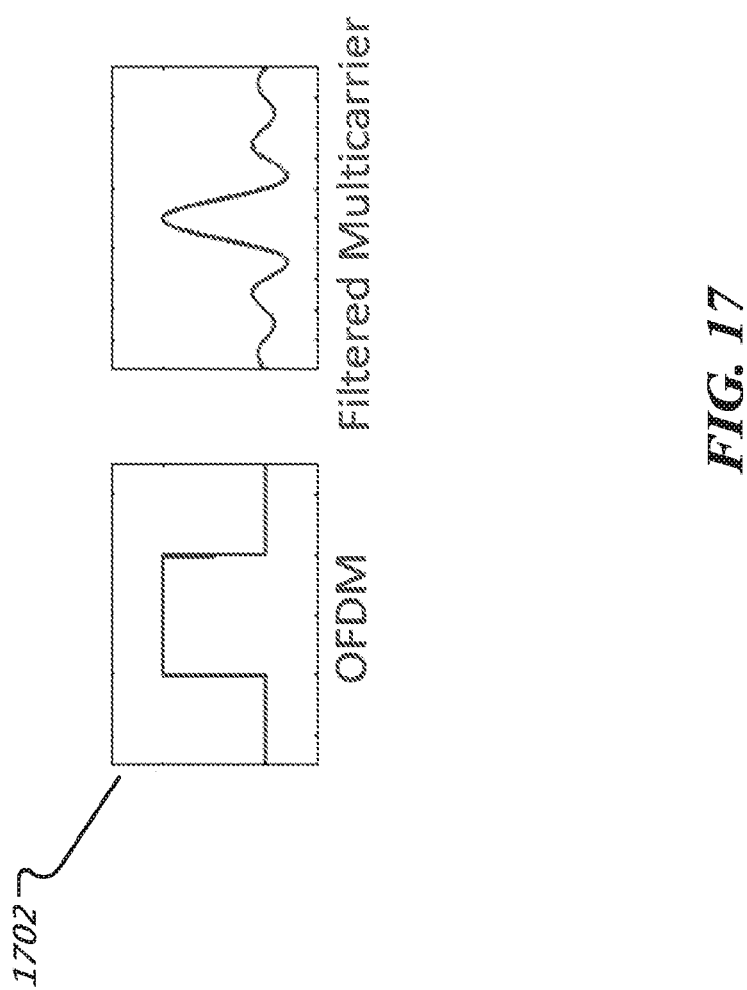
FIG. 17 shows an example of distortions undergone by a transmitted waveform.

FIG. 17 shows another perspective on a mathematical description of how the wireless waveforms may be transmitted by the transmitter, g(t) represents the filter bank impulse response (by which spectrum 1702 is filtered).

Examples of g(t) for OFDM and Filtered Multicarrier $$\varphi t(t-t0) = \Sigma_{l=0}^{M-1} \Sigma_{k=0}^{N-1} Sa(k,l) g(t-t0-kT) e^{-i2\pi l\Delta F(t-t0-kT)} \tag{15}$$

FIG. 17 shows how, in some embodiments, it may be useful to pick the characteristics of the various narrow-band subcarriers to match legacy OFDM methods, such as 4G/LTE legacy OFDM methods. As previously discussed, the g(t) function may be viewed as describing how the transmitter transmits the various waveforms according to various time intervals. For example, if the previously discussed frequency filtering operation is considered to be a filter bank, where each narrow band subcarrier has its own filter, then g can describe the time intervals over which this process operates, as well as how this process operates. g(t) for example, can operate abruptly over its respective time interval, much like the square wave example 1702 shown in FIG. 17, and in some cases much like the prior art OFDM methods. However such square waves may work best when the rate of symbol transmission, per narrow-band subcarrier, is relatively low. When the rate of symbol transmission per narrow-band subcarrier is higher, alternative g(t) functions, such as a sin(x)/x function, may be useful. In the nomenclature used in FIG. 17, the g(t) function is called the "filter bank impulse response". Other schemes may also be used. For example, as previously discussed, instead of following the prior art OFDM convention where all subcarrier bursts are done at the same time, an alternative "staggered" configuration may be employed where, on a subcarrier basis, the different OTFS waveform bursts are each displaced in time from neighboring subcarriers by a time slice interval such as T (burst time)/M (number of subcarriers). Other types of staggering schemes may also be used.

Other schemes may also be used. For example, as previously discussed, instead of following the prior art OFDM convention where all subcarrier bursts are done at the same time, an alternative "staggered" configuration may be employed where, on a subcarrier basis, the different OTFS waveform bursts are each displaced in time from neighboring subcarriers by a time slice interval such as T (burst time)/M (number of subcarriers). Other types of staggering schemes may also be used.

Figure 18:
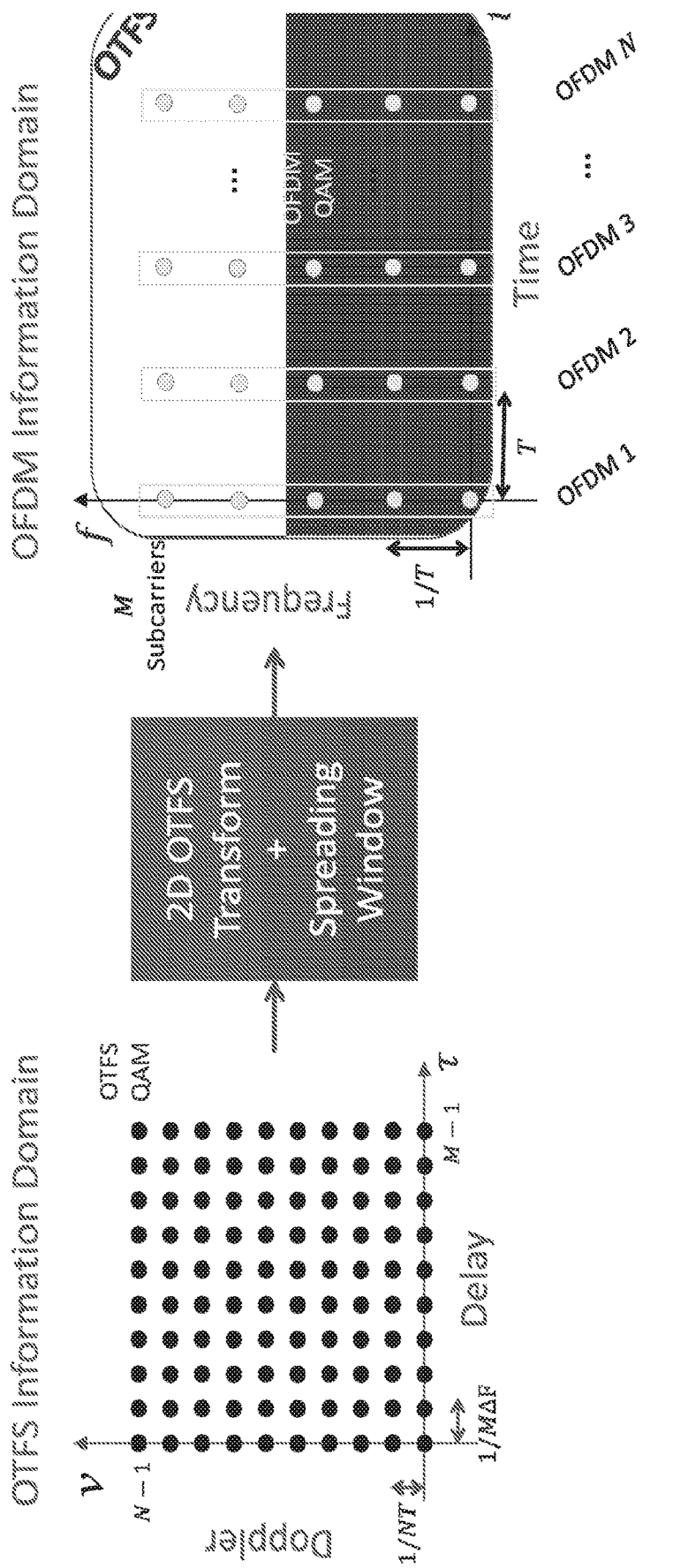
FIG. 18 shows an example of transforming OFTS QAM signal onto a time-frequency grid.

FIG. 18 shows more detail of how the OTFS methods described herein may be used to retain at least some compatibility with legacy OFDM methods, such as legacy 4G/LTE methods. OTFS could be considered a 2D extension of CDMA, FBMC or UMBC techniques. FIG. 18 shows how, in some embodiments, it may be useful to pick at least some of the characteristics of the various narrow-band subcarriers to match legacy OFDM methods, such as 4G/LTE legacy OFDM methods. In this case, the narrow-band subcarriers will be narrow-band OFDM subcarriers, with numbers, frequencies and bandwidths comparable with legacy systems, such as 4G LTE systems. It may also be useful in some embodiments to interleave some legacy OFDM symbols, such as legacy 4G/LTE symbols, in some time intervals during transmission.

FIG. 18 also shows that the characteristics of the method and the various frames can also be altered or configured according to the various wireless channel delay and Doppler effects. For example, in some embodiments, the OTFS delay resolution (e.g. ability to distinguish between various wireless transmission delays over the wireless channel) can vary according to 1/Bandwidth, or according to T(burst time)/M (number of subcarriers). When backward compatibility with legacy OFDM is desired, M (number of narrow-band OFDM subcarriers) may be fixed (e.g. by regulatory considerations). However T (the time duration of each transmitted time interval or signal burst) may be open for modification, and by picking longer time intervals to transmit each portion of the 2D OTFS time-frequency frame, higher time delay resolution may be obtained. That is, although in some embodiments, it may be useful to employ a same burst length time "T" that is the same as legacy OFDM burst time lengths; this is not an absolute requirement. The microprocessor controlled OTFS transmitters and receivers can switch back and forth from whatever burst length time "T" best suits the needs at hand, and then revert back to a legacy time "T" (such as a 4G compatible time "T") as needs dictate.

Put alternatively, if some level of some backward compatibility with legacy OFDM is desired, again the number of subcarriers M may be fixed, but both the duration of each time interval T, and the number of time intervals used to transmit a given frame, may be open for modification (i.e. not be always totally backward compatible). If Doppler frequency shift problems are an issue, the system may be configured to have higher Doppler shift resolution by changing some combination of the number of time intervals N and the duration of teach time interval T used to transmit a given frame. Thus in some embodiments, the anticipated wireless time delay and anticipated wireless Doppler shift of the channel can be used to configure parameters of either the 2D OTFS time-frequency frame or the 2D OTFS delay-Doppler frame.

Legacy OFDM somewhat avoids delay problems by transmitting symbols slowly over the plurality of narrow-band OFDM subcarriers, and is not able to cope well with frequency shifts. If it is desired to increase the amount of data carried using such schemes, then symbols must ultimately be transmitted faster over the plurality of narrow-band OFDM subcarriers, and delay problems confronted by correcting the transmitted symbols for channel induced delay problems. Additionally, frequency shift problems (almost always caused by Doppler effects), must be solved for, rather than simply avoided.

In some embodiments, the methods described herein, at least when run over legacy compatible OFDM narrow-band subcarriers such as 4G/LTE carriers, can be viewed as being capable of transmitting a more complex waveform, and being capable of carrying more information (relative to prior art), over each narrow band subcarrier. This more complex waveform will be distorted during transmission, but the OTFS methods described herein can be used to "clean this up" in a reliable manner. The net result, relative to legacy OFDM methods such as 4G/LTE methods can be both a higher rate of data transmission per unit wavelength and unit time, along with increased resistance to channel distortion effects.

It will be appreciated based on the discussion that OTFS attributes include:

Stationary, Deterministic & non-fading channel interaction

All Symbols experience same channel

2D Impulse response reveals the deterministic channel geometry

Coherent multipath energy assembly exploiting all diversity branches

Invariant and highly tolerant to channel mobility condition

Loose Time & Frequency Synchronization

Misalignment is captured from Channel State Information and compensated by equalizer Energy efficiency:

Higher link margin due to spreading

Reliable, low overhead payload delivery

Supports contention-based access

Furthermore, the described OTFS transmission and reception techniques may further exhibit:

Interleaved variable latency with adjustable frames sizes

Coexistence & Backwards Compatibility

OTFS frames can be interleaved with LTE frames

MIMO scalability

Timely, precise, compact and low overhead CSI acquisition

Spatial multiplexing with almost equal SNR on all streams relying on receiver equalization only without the need for bit loading feedback Cooperative Multipoint—through accurate CSI Distributed interference mitigation Highly suitable for mmW spectrum Insensitive to higher relative Doppler spread and frequency offset Table 1 summarizes some advantages of using the disclosed techniques.

TABLE 1

| | OTFS feature | Benefit | Application |
| --- | --- | --- | --- |
| Modulation | Multi-dimensional generalization of TDMA, CDMA and OFDM | OTFS can dynamically degenerate to existing modulations in real time | Backwards compatibility |
| Architecture | Alignment with OFDM-type transceiver architectures though OTFS "Pre-processing" | Fits efficiently into OFDM transceiver designs | Low barrier to standards adoption |
| 2D Frame Structure | Dynamically adjust time-frequency span | Interleave low/high latency frames Dynamically adjust to channel conditions | Flexibly handle 5G MBB and MTC requirements |
| 2D Time-frequency spreading | Optimal time-frequency spreading | Interference mitigation Processing gain | Network densification Extreme path loss |
| Channel characterization | Deterministic and Stationary | Invariant to multipath/Doppler channels | Highest channel capacity and cell edge coverage achievable |
| Channel State Acquisition | Accurate, Efficient & Timely | Granular control of energy per bit Loose Channel Synchronization | Massive MIMO Energy efficiency for IoT |
| Scalability | Wideband, uniform, robust and stable spatial multiplexing | Uniform scaling of capacity with MIMO and channel bandwidth | 100x-1000x network capacity |
| MAC | Maps to existing LTE MAC | Re-use existing MAC and higher layer platform | Logical evolution from LTE to OTFS |

Figure 20:
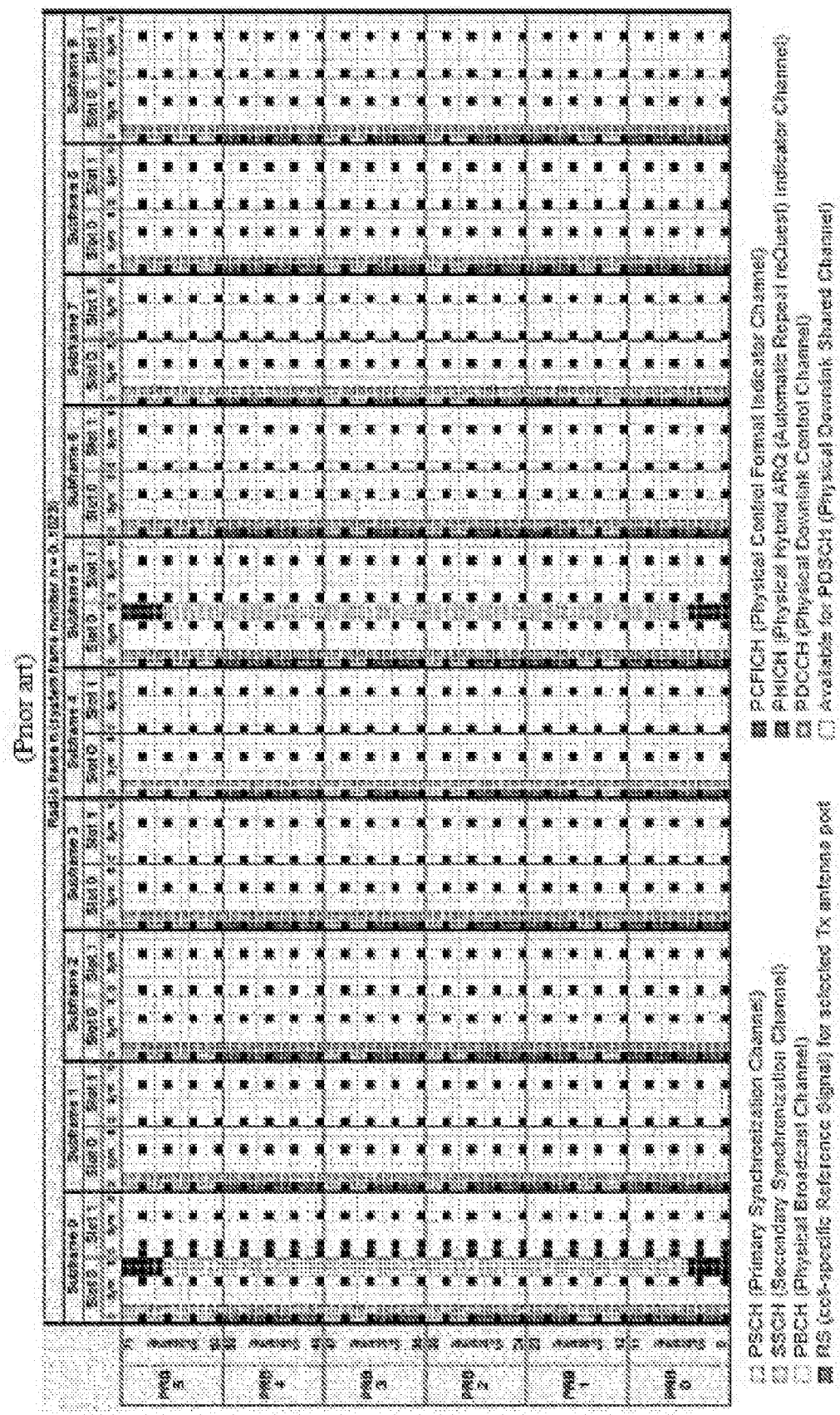
FIG. 20 shows a prior art transmission resource allocation.

FIG. 20 shows an example of a legacy (prior art) 4G/LTE "frame", showing how signals are distributed over the various 4G/LTE narrow-band OFDM subcarriers (vertical axis) over various time intervals (vertical axis). Note the large number of pilot symbols (black squares).

Figure 21:
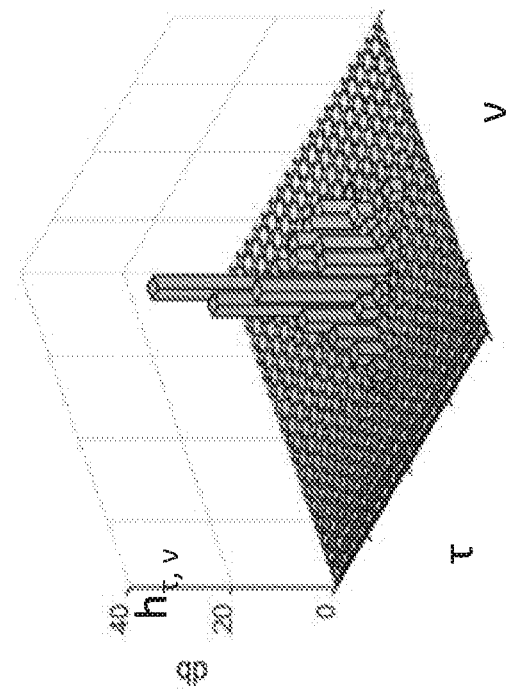
FIG. 21 is a graphical representation of an example of an OFTS convolution operation.
Figure 21:
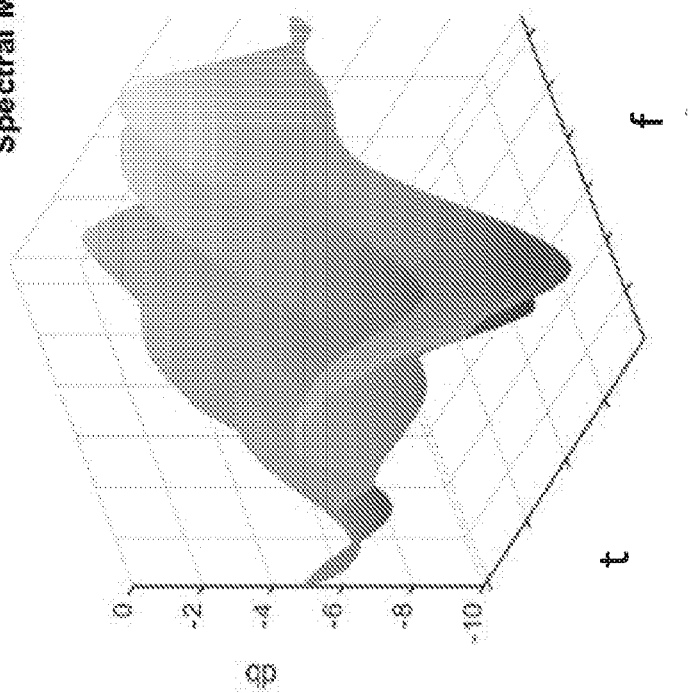

FIG. 21 illustrates one method how prior art (e.g. 4G/LTE) pilot symbols, due to the fact that large numbers of such pilot symbols are used that spanning a large number of OFDM subcarriers over a large number of time intervals) can be used to help provide at least a first order configuration of the 2D equalizer described herein.

FIG. 22 shows an overview comparison between OTFS methods and prior art methods.

Table 2 below provides some symbols and nomenclature used in the present document.

TABLE 2

| Meaning | Designated as | Definition or alternative nomenclature |
| --- | --- | --- |
| Time (physical variable, generally reading on either transmitter or receiver) | t | Real number |
| Signal time delay (physical variable due to actual wireless reflector spacing) | (tau) $\tau$ | Real number |
| Doppler frequency shift (physical variable caused by actual object velocities) | (nu) $\nu$ | Real number |
| Frame, array, domain, plane (2D arrays used for Delay-Doppler & time-frequency) | various | Alternative names for the same thing |
| Index/axis-name of Delay-Doppler/information array: 0 ... M-1 (#frequency subcarriers) | (tau) $\tau$ | aka "m" index# (integer) |
| Index/axis-name of Delay-Doppler/information array: 0 ... N-1 (#signal bursts) | (nu) $\nu$ | aka "n" index# (integer) |
| Axis-name of times on the time-frequency/signal array | t (N #values) | #burst times, aka "k" index# |
| Axis-name of frequencies on the time-frequency/signal array | f (M #values) | #frequency subcarriers, aka "l" index# |

TABLE 2-continued

| Meaning | Designated as | Definition or alternative nomenclature |
|---|---|---|
| Individual Delay-Doppler (information) frame data symbol (e.g. QAM symbol) | $x_{\tau,v}$ | x(m,n), these are payload data symbols |
| Time-varying impulse response representing the channel (neglecting Doppler) | $a(\tau, t)$ | |
| Channel Delay-Doppler impulse response (based on symplectic math derivation) | $h(\tau,v)$ | $h(\tau, v) = \int a(\tau, t)e^{-j2\pi vt}dt$ |
| Specific orthogonal basis function (that is also Delay-Doppler covariant) | $b_{m,n}(k, l)$ | $b_{m,n}(k, l) = e^{-j2\pi\left(\frac{lm}{M} - \frac{kn}{N}\right)}$ |
| General Delay-Doppler covariant basis function (also has orthogonality requirement) | $\phi_{\tau,v}(t)$ | Definition $\phi_{\tau,v}(t - \tau_0) = \phi_{\tau+\tau_0,v}(t) \, e^{j2\pi v_0 t}\phi_{t,v-v_0}(t) = \phi_{\tau,v-v_0}(t)$ |
| 2D OTFS transform (shorthand version, operations described elsewhere) | W, b | W = math reference, b = basis functions |
| Filter bank impulse response, aka xmtr burst time & duration (example - square wave) | g(t) | Times & durations of OTFS signal bursts |
| 2D Symplectic Fourier Transform, this distributes each data symbol across time & frequency, & produces precursor to OTFS symbols (before spreading & modulation) | X(k, l) | $X(k, l) = \sum_{m=0}^{M-1} \sum_{n=0}^{N-1} x(m, n)b_{m,n}(k, l)$ |
| 2D Spreading/scrambling code: limits xmiter power levels & distinguishes xmiters | $W_a(k, l)$ | Can be a chirp or Hadamard operation |
| OTFS spreading window - produces final OTFS symbols (before modulation) | $\theta_a(k, l)$ | $\theta_a(k, l) = W_a(k, l)X(k, l)$ |
| Shorthand reference to transmitter's OTFS modulation methods | Π, Heisenberg | See math or engineering descriptions |
| High level math description of transmitted OTFS waveform as a function of time | S(t) | $S(t) = \int x_{\tau,v}\phi_{\tau,v}(t)d\tau dv$ |
| All transmitted OTFS waveforms as function of time (neglecting pilots); Δf represents the bandwidth of a single OFDM subcarrier | | $T(t - t_0) = \sum_{l=0}^{M-1} \sum_{k=0}^{N-1} \theta_a(k, l)g\,(t - t_0 - kT)e^{-i2\pi l\Delta F\,(t-t_0-kT)}$ |

Table 3 below shows another table containing various definitions and alternative nomenclature for a number of the various concepts described herein.

TABLE 3

| Meaning | Designated as | Definition or alternative nomenclature |
|---|---|---|
| Filter bank impulse response/receive time duration (example - square wave) | g*(t) | Times & durations of OTFS signal bursts |
| Demodulation method used to receive OTFS wireless signals | Π*, Wigner | See math or engineering descriptions |
| Received waveform as a function of time (neglecting Doppler effects) | R(t) | $R(t) = \int(\tau, t)S(t - \tau)d\tau$ |
| Received waveform as a function of time (now including Doppler as "v") | R(t) | $\iint h(\tau, v)e^{j2\pi vt}S(t - \tau)d\tau dv$ |
| Received waveform based on originally transmitted symbols and distortions | R(t) | $\iint \phi_{\tau,v}(t)\{h(\tau, v) * x_{\tau,v}\}d\tau dv$ |
| Shorthand reference to 2D Inverse OTFS transform | W*, b* | See math or engineering descriptions |
| Inverse of previously applied 2D spreading or scrambling code | $W_a^*(k, l)$ | e.g. inverse chirp or Hadamard operation |
| Received OTFS despreading window (undoing 2D spreading/scrambling) | X(k, l) | $X(k, l) = W_a^*(k, l)\theta_a(k, l)$ |
| 2D Inverse Symplectic Fourier Transform (receiver OTFS demodulation step) | x(m,n) | $x(m, n) = \sum_{l=0}^{N-1} \sum_{k=0}^{N-1} X(k, l)b_{m,n}^*(k, l)$ |
| Inverse basis set - used by receiver to demodulate received OTFS waveforms | b* | $b_{m,n}^*(k, l) = e^{j2\pi\left(\frac{lm}{M} - \frac{kn}{N}\right)}$ |
| Received OTFS symbols (channel distorted QAM symbols) | $y_{\tau,v}$ | $y_{\tau,v} = h(\tau, v) * x_{\tau,v}$ |
| 2D equalizer restores version of original data symbols (e.g. QAM symbols) | — | $x'_{\tau,v} = h^*(\tau, v) * y_{\tau,v}$ |

TABLE 3-continued

| Meaning | Designated as | Definition or alternative nomenclature |
|---|---|---|
| Replica data symbols on Receiver's replica Delay-Doppler/Information plane | — | $x'_{\tau,v}$ |
| OTFS/OFDM symbol duration time (time of 1 full signal burst & any guard) | T | Units of time |
| Time to transmit a complete OTFS frame (time to send all N signal bursts) | $T_f$ | N × T |
| OTFS/OFDM bandwidth of entire frame (bandwidth of all M subcarriers) | BW | Units of frequency |
| Bandwidth of a single OTFS (or OFDM subcarrier) | $\Delta f$ | BW/M (Units of frequency) |
| Frequency of OTFS/OFDM subcarrier "l" relative to base subcarrier | l × $\Delta f$ | Units of frequency |
| Time OTFS transmitter first starts | $t_0$ | Units of time |
| Time relative to start that kth successive subcarrier tone or signal burst starts | k × T | Units of time |
| OTFS data symbol before spreading/scrambling and modulating tone burst | X(k, l) | OTFS Despreading Window |
| OTFS data symbol after spreading/scrambling, before modulating tone burst | $\theta_a$(k, l) | OTFS Spreading Window "$D_{dt,df}$" in RAKIB-02300 |
| Underlying OTFS/OFDM tone burst (before modulation by OTFS symbol) | | $g(t - t_0 - kT)e^{-i2\pi l\Delta f(t-t_0-kT)}$ |
| OTFS data symbol waveform burst ($D_{dt,df}$ in RAKIB-02300) | | $T(t - t_0) = \theta_a(k, l) g(t - t_0 - kT)e^{-i2\pi l\Delta F(t-t_0-kT)}$ |
| Pilot symbol waveform burst. P is a non-OTFS symbol sent at reserved k, l values | | $T(t - t_0) = P(k, l)g(t - t_0 - kT)e^{-i2\pi l\Delta F(t-t_0-kT)}$ |

As discussed herein, and as shown in more detail in Table 2 and Table 3, different nomenclatures can be used to describe the axis of the frame and the coordinates of the frame. For example, for the Delay Doppler frame (information frame), the axis can be termed the τ and v axis, where the τ axis can have "m" different integer values, often corresponding to the number of frequency subcarriers used for the signal, and the v axis can have "n" different values often corresponding to the number of different signal bursts used per subcarrier.

These data symbols xr,v or x(m,n) will often be complex numbers. Although the use of QAM symbols is not intended to be limiting, QAM symbols will often be used as specific examples of these data symbols.

Note that the "2D OTFS delay-Doppler frame" is a virtual frame, intended to describe, in a simple and easy to visualize form, the various indices over which the various transformation and data manipulation steps are to be performed. There need not be any actual or "graphic" data frame. Rather the processor will need to order the data symbols as if they were on the 2D OTFS delay-Doppler frame, and process the symbols accordingly. See the various math examples for more detail. Note also that the term "2D" is intended to indicate that the minimum dimension (number of coordinates) of any frame axis is at least 2 units, and this will typically often be significantly higher, such as 50+ units per axis.

When OFDM compatibility is desired, often the dimensions of the frame axis will be chosen to be similar to the dimensions used for corresponding OFDM signal frames. For example, the τ axis can correspond to the number of OFDM subcarriers, and the v axis can correspond to the number of OFDM signal bursts.

The transmitter or transceiver's processor(s) will then typically operate to transform these data symbols on the "2D OTFS delay-Doppler frame" by using each data symbol and frame location to modulate (often by multiplication) a unique 2D basis wave function (such as mutually orthogonal 2D Fourier basis functions), selected from a set of mutually orthogonal 2D basis wave functions operating over a 2D OTFS time-frequency frame. These 2D basis functions, particularly when also chosen to be Delay-Doppler covariant, are often referred to as bm,n(k,l) or $\phi_{\tau v}$ (t).

Examples of this are shown in this document. The 2D OTFS time frequency frame will typically have a "t" axis with N different values (often referred to by the "k" index in the engineering nomenclature), each corresponding to the number of signal bursts per data frame, and a "f" axis with M different values (often referred to by the "l" index in the engineering nomenclature), generally corresponding to the number of subcarriers used per data frame. To avoid confusion, the index of the "t" axis is often called "k", while the index of the "f" axis is often called "l".

This transformation thus spreads each data symbol, in a lossless and invertible manner (if it is not lossless and invertible, then the system would not be of much practical use. In this context, however, lossy transformation methods that have extremely low error rates, such as less than 1 in a million or less than one in a billion, may be adequate, and these very low error rate lossy methods will be considered to be substantially similar to lossless transformation methods), throughout substantially the entire 2D OTFS time-frequency frame. Optionally this transformation may also encompass a further scrambling operation such as a 2D chirp function or other scrambling operation as desired. The net result is to create, over the 2D OTFS time-frequency frame, a very complex jumble here called a 2D OTFS time-frequency frame based "wave aggregate", such as:

$$X(k,l)=\Sigma_{m=0}^{M-1}\Sigma_{n=0}^{N-1}x(m,n)b_{m,n}(k,l) \quad (16)$$

Here X(k,l) can be viewed as an OTFS symbol precursor. That is, X(k,l) is an OTFS symbol prior to any spreading/scrambling process "W", and prior to tone modulation by the transmitter.

Next, an optional spreading or scrambling operation, symbolized by the function Wa (k,l) can be performed. This spreading/scrambling operation has two different purposes. On the one hand, it helps to more evenly distribute the pattern of transmitted signal peaks to avoid overloading the transmitter power amplifier. Alternatively or additionally, the spreading/scrambling function can be used to help the receivers distinguish between different transmitters (i.e. each receiver can be tuned to the spreading/scrambling used by that particular transmitter that it is listening to).

Thus spreading or scrambling produces an OTFS symbol $\theta_a(k,l)$ (at least prior to modulating the underlying tones for transmission) where $$\theta_a(k,l) = W_a(k,l)X(k,l) = W_a(k,l)\Sigma_{m=0}^{M-1}\Sigma_{n=0}^{N-1} x(m,n)b_{m,n}(k,l) \quad (17)$$

A wireless transmitter (see FIG. 11) can then modulate and transmit this 2D OTFS time-frequency frame based "wave aggregate" over the wireless channel by, for example, transmitting frequency filtered portions of the 2D OTFS time-frequency frame based wave aggregate, over a plurality of narrow-band subcarriers, and over a plurality of time intervals.

As will be described, each narrow band subcarrier will typically have a characteristic carrier tone such as e−i2πlbΔf(t-t0-kT). Further, as will be described, the duration of the various signal bursts can be described using a function or equation g(t). This g(t) can be viewed in different ways. It can be viewed as being the filter bank impulse response, or more simply, it can be viewed as expressing the time and duration of a given signal burst on a per-subcarrier basis. Although most of the examples discussed here assume that all signal bursts occur at the same times on all subcarriers (e.g. OFDM style), this need not be the case, and in other embodiments, the start times may be staggered, such as on a per-time slice basis. Here a "time slice" can be a fraction of the length of the burst "T".

For example, in the case where g(t) is a square wave (see FIG. 17), and if all signal bursts occur at the same time on a per sub-channel basis, then per each subcarrier, the start time and duration of a given signal burst can be:

$$g(t-t_0-kT) \quad (18)$$

Where t0 is again the time that transmissions originally started, "t" is time, "k" is the "burst time" index on the t axis of the time-frequency signal array, and (because in this example, all subcarrier bursts start at the same time, there is no "l" parameter). "T" here represents the time duration of a given burst (and any guard interval), where all bursts are assumed to be of the same time duration "T". If we were going to drop some level of OFDM compatibility (still use OFDM subcarrier spacing, but give up on having the exact same timing per subcarrier), and instead stagger the different bursts to start at different times per subcarrier, then g may have an additional "l" parameter such as:

$$g\left(t - t_0 - kT - l\frac{T}{M}\right)$$

where each burst might be offset by a somewhat different time slice value that M would be a small fraction of the Time duration of a given burst, such as T (burst duration)/M (number of subcarriers) or other scheme. In such time slice staggered schemes, as needed to preserve orthogonality between the different OFDM subcarriers, cyclic prefixes of varying time duration (e.g. cyclic prefixes that might vary in time according to the "l" parameter) may optionally be used, and/or there may be some guard times between bursts, or occasional guard subcarriers.

So in one example, as a result of this modulation and transmission, the transmitter will output a time varying signal described either as S(t) or simply "T" where:

$$T(t-t_0) = \Sigma_{l=0}^{M-1}\Sigma_{k=0}^{N-1}\theta_a(k,l)g(t-t_0-kT)e^{-i2\pi l\Delta F(t-t_0-kT)} \quad (19)$$

Here t0 is the time that the frame started transmitting, k and l are the indexes on the time-frequency signal array.

Each individual OTFS waveform burst can be viewed as being the signal sent in a single bust of time duration "T" on subcarrier with index "l" at burst time slot index "k", where the subcarriers have a frequency bandwidth "Δf" starting from a base frequency (not shown). Here the shapes of the waveforms are not OFDM waveforms, but as desired, we can use an OFDM compatible range of subcarriers and burst timings. Since the transmitters and receivers are based on programmable processors, this scheme can easily be altered—burst time staggering can be turned on and off, standard OFDM QAM symbols be used in place of the OTFS symbols 8a(k,l), as desired, and so on.

Here the term "staggering" is used to describe a finer time granularity stepping process in which the various OTFS bursts have a transmitting start time that differs, on a time slice basis, between different subcarriers. This the definition of "staggering" as being: "to arrange otherwise than at the same time", or "to arrange so that the entering edge of an upper object is either in advance of or behind that of a lower object" is being used here.

Thus the system can easily be made backward compatible with existing OFDM methods. Additionally, the system can, for example, be programmed to listen for conventional OFDM transmissions before transmitting, and/or exploit empty locations in OFDM frames or gaps between frames, and thus intelligently avoid interfering with legacy OFDM applications, such as legacy 4G/LTE transmissions.

Note that in this scheme, a given OTFS symbol waveform burst (carrying one OFTS symbol) can be as follows:

$$T(t-t_0) = \theta_a(k,l)g(t-t_0-kT)e^{-i2\pi l\Delta F(t-t_0-kT)} \quad (20)$$

Thus on a per narrow-band subcarrier and per time interval basis, the rather complex transmitted waveform shown above may occasionally be referred to as either an "OTFS data symbol" (actually it is carrying an OTFS data symbol) or more properly an OTFS symbol waveform burst.

Note however that this "OTFS data symbol" is not at all the same thing as standard "data symbol". For example, each "OTFS data symbol" actually contains, in a highly scrambled form, information that is, in part, derived from all of that frame's data symbols. Note also that each OTFS data symbol is transmitted over a definite time interval, and which is why it may be viewed and described as being a type of "burst".

In this regard, note that there is a difference in terminology between the present OTFS data symbols, and prior art OFDM symbols. Prior art OFDM methods generally send signal bursts across all of their subcarriers at the same time. Thus, for example, in an OFDM channel with 52 subcarriers, the signal bursts across all 52 subcarriers will occur simultaneously. As a result, in OFDM nomenclature, an "OFDM symbol" is considered to consist of the information that is carried in all subcarriers (e.g. here all 52 subcarriers) across one OFDM signal burst duration.

By contrast, in OTFS methods, although in some embodiments, the signal bursts in all OTFS subcarriers may also occur simultaneously, as previously discussed, this need not always be the case. For example, in earlier versions of OTFS, such as the methods described in U.S. Pat. Nos. 8,979,378; 8,547,988, and 9,083,595, the entire contents of which are incorporated herein by reference, different OTFS bursts at a given frequency were often described as cyclically varying in time, or somewhat staggered in time, with respect to OTFS bursts at a neighboring frequency.

For example, if a total burst length is considered to be a time spreading interval, this time spreading interval would be divided into different time slices, such as N time slices, and each OTFS burst on a different frequency, for a given cyclic set of frequencies, would also be transmitted starting at its own specific time slice offset. So the net effect is to stagger the different OTFS bursts somewhat in time on a per frequency (or subcarrier) basis.

However this was not always required, and in continuation U.S. Pat. No. 9,083,483, the contents of which are incorporated herein by reference, this requirement that different OTFS bursts be staggered in different time slices was relaxed somewhat.

Although in the present disclosure, most of the discussion will be based on the assumption that as per OFDM methods, signal bursts on each OTFS subcarrier will often also proceed simultaneously (e.g. not staggering by different time slices), this is not an absolute requirement, and is not intended to be limiting. It is quite possible, for example, for even an OFDM backward compatible OTFS system to be able to operate by programming its processor to stagger its OTFS signal bursts per subcarrier according to different time slices (e.g. not starting and stopping all OTFS signal bursts per subcarrier at the same time, but instead staggering them). Then, when compatibility with OFDM signals is desired, the backward compatible OTFS system can instruct its processor to stop staggering the signal bursts according to time slices, but instead revert back to OFDM methods where all subcarrier bursts are then starting and stopping at the same time.

There may be some advantages to being able to stop and start such time staggering under processor control, since staggering methods may make it easier for the receiver analyze the effect of different time delays on the received signal, and thus correct for these impairments. See U.S. Pat. No. 9,083,595 for further discussion.

Note also the significant differences between the waveform structure as transmitted of the "OTFS data symbols", and the waveform structures of the simpler OFDM data symbols. The prior art OFDM data symbols might, for example, be transmitted as QAM symbol that modulates a tone (carrier wave) over one OFDM subcarrier and time interval. Each OFDM data carrying symbol is thus carried by a relatively simple waveform. By contrast, an individual OTFS data carrying symbol, when viewed on a per-subcarrier and time interval basis, being a portion of a relatively complex aggregate, may in some embodiments be transmitted as a more complex or more delicate (with respect to channel distortions) waveform.

Being more complex, each OTFS data carrying symbol in isolation might potentially be less robust to channel distortions than an equivalent OFDM data symbol. But in sum, once all or significantly all of the OTFS data carrying symbols are received, due to the superior ability of OTFS methods to correct for such channel distortions (e.g. time and frequency shifts), the net result is that after correction (e.g. 2D equalization), and descrambling, typically more data ends up being transmitted per unit time, unit bandwidth, and unit power.

As previously described, in some embodiments, a specific class of complex waveforms may be used to help further mitigate the effect of time delays and frequency shifts. In particular, use of mutually orthogonal 2D basis wave functions are selected to satisfy Delay-Doppler covariance conditions that $\phi_{\tau,\nu}(t-\tau_0)=\phi_{\tau+\tau_0,\nu}(t)$ and $e^{j2\pi\nu_0 t}\phi_{\tau,\nu-\nu_0}(t)=\phi_{\tau,\nu-\nu_0}(t)$ may be useful. For example, as will be discussed, use of waveforms such as $$b_{m,n}(k,l) = e^{-j2\pi\left(\frac{lm}{M}-\frac{kn}{N}\right)}$$

may be useful. Note that use of such Delay-Doppler covariant waveforms, although potentially helpful in some situations, is not intended to be limiting.

Mathematically, the "uniqueness" or "mutually orthogonal 2D basis" of the 2D basis wave function can be expressed mathematically by the requirement that over the 2D OTFS time—

$$\sum_{k=0}^{M-1}\sum_{l=0}^{N-1} b_{k,l}(m,n)b_{q,r}^*(m,n) = \begin{cases} 1:[q=k, r=l] \\ 0:[q \neq k \mid r \neq l] \end{cases} \quad (21)$$

Some (but not all) embodiments, the transmit signals "S" (or "S(t)") can utilize orthogonal basis functions where the time delay or Doppler shift of the basis function produces another basis function associated with that time shifted delay or Doppler shift parameter. Here, a set of suitable orthogonal basis functions are $\phi_{\tau,\nu}(t)$ chosen to satisfy a particular Delay-Doppler covariance condition, are shown.

However more generally, any basis function that is an invertible transform may be used. One example of invertible transforms is the orthogonal basis functions. More specifically, 2D Fourier basis functions, including may be used. An example of such basis function are: Orthogonal basis functions, $\phi_{\tau,\nu}(t)$, that satisfy the following Delay-Doppler covariance condition $$\phi_{\tau,\nu}(t-\tau_0)=\phi_{\tau+\tau_0,\nu}(t) \quad (22)$$

$$e^{j2\pi\nu_0 t}\phi_{\tau,\nu}(t)=\phi_{\tau,\nu-\nu_0}(t) \quad (23)$$

Time delay or Doppler shift of a basis function yields another basis function associated with the shifted delay or Doppler parameter $$b_{m,n}(k,l) = e^{-j2\pi\left(\frac{lm}{M}-\frac{kn}{N}\right)}. \quad (24)$$

Such basis functions are useful because these can help reveal the channel immediately. One way of viewing this is that some basis functions help the transmitter to produce "shaped" signals that themselves vary in time and frequency enough to some extent help the system better analyze the effect of the various echo reflection caused time delays and frequency shifts in the channel.

Such basis functions ease receiver processor computational loads, and help to use the channel impulse response h to determine the relationship between the input and the output.

Note however, that we have not discussed the scrambling/spreading operation W here.

As discussed herein, transmitted signal S(t) can be constructed by using QAM data symbols (e.g. xr,v, or x(m,n)) distributed on the Delay-Doppler information plane according to the Delay-Doppler plane coordinates τ and v, (alternatively called index "m" and "n") to modulate the orthogonal and Delay-Doppler covariant orthogonal basis functions ¢r,v(t) over the entire information plane, producing the previously discussed 2D OTFS time-frequency frame based wave aggregate.

Again, as previously discussed, remember that in this disclosure, "τ" and "v" are often used in the math discussion as a commonly used scheme by which to digitize that channel's time delay and Doppler frequency characteristics according to a finite resolution such that τ is digitizing the time delay aspects of the channel into bins, each bin with a first and second bin dimension, with a first bin dimension of 1/BW, and v is digitizing the frequency shift aspects of the channel according to a second bin dimension of 1/Tf, where BW=the total bandwidth of a given OTFS frame, and Tf=the time to transmit a given OTFS frame.

Thus for example, OTFS frames with greater bandwidths BW will be able to distinguish time delays more accurately, while OTFS frames with longer time durations will be able to distinguish Doppler frequency shifts with higher accuracy.

Further Discussion of Transmission:

Since, as previously discussed, $\theta_a(k,l)=W_a(k,l)X(k,l)$, then the various wireless waves emitted by the transmitter can be expressed as $$T(t-t_0)=\Sigma_{l=0}^{M-1}\Sigma_{k=0}^{N-1}W_a(k,l)X(k,l)g(t-t_0-kT)e^{-i2\pi l\Delta F(t-t_0-kT)} \quad (25)$$

Here, as previously discussed, the "g" function of the above expression can be viewed as illustrating one scheme in which the transmitter controls the various subcarrier "bursts", that is the sequence of filtered portions and time intervals in which portions of the wave aggregate are transmitted.

The exponential "e" portion describes the underlying tone of the various narrow band subcarriers, and the Wa(k,l)X(k,l) portion describes how that particular portion of the 2D OTFS time-frequency frame based wave aggregate (after spreading/scrambling) modulates the underlying tone of the various narrow band subcarriers. The double summation shows how this particular scheme operates over the entire 2D OTFS time-frequency frame. As will be discussed, however, other schemes, such as various types of frame or legacy interspersing or interleaving schemes, and optionally also different partitioning methods, may also be used.

As previously discussed, in some particularly economically important embodiments, the system may be configured to operate in an OFDM backward compatible mode and transmit legacy compatible 4G/LTE symbols. Here at least one of the OFDM transmitter or the OFDM receiver can be configured (by the system processor) to at sometimes operate in a backward compatible mode according to any of OFDM and 4G/LTE methods, or other legacy OFDM method, while at other times operate over the same OFDM subcarriers using non-backward compatible OTFS methods.

Although, as will be discussed shortly, the OTFS methods disclosed herein can function without using any legacy OFDM pilot symbols or other legacy OFDM channel compensation methods, because 4G/LTE is so popular, cellular carriers have obtained a massive amount of information pertaining to channel state locations throughout the world using prior art OFDM pilot methods.

FIG. 20 shows an example of a legacy (prior art) 4G/LTE "frame", showing how signals are distributed over the various 4G/LTE narrow-band OFDM subcarriers (vertical axis) over various time intervals (vertical axis). Note the large number of pilot symbols (black squares). Note also that each pilot symbol is confined to its own narrow-band OFDM subcarrier, over one time interval. These can be viewed as being a type of time-frequency pilot symbols.

Two basic types of pilot symbols are possible under OTFS. One type of pilot symbols, although transmitted according to the same timing, frequency ranges, and general spectral shapes as the OTFS data symbols, will nonetheless not be subject to the general OTFS data symbol requirements that the pilot symbols be smeared or distributed over all transmitted symbols, and over a plurality of time and frequency combinations, at the transmitter. These can be viewed as time-frequency frame OTFS pilot symbols, or time-frequency OTFS pilot symbols.

These time-frequency OTFS pilot symbols (or waveforms when transmitted), might, in an alternative nomenclature could be called "OTFS associated pilot symbols". These pilot symbols are generally restricted according to specific k and l values on the Time-Frequency or signal plane or array. These can be used, for example, for a time-frequency 2D equalizer that operates on the time-frequency domain.

A different type of pilot symbol is possible in which at least some of the pilot symbols are handled by the system in the same way that the system handles data symbols. These can be called delay-Doppler pilot symbols. Here the delay-Doppler pilot symbols are restricted according to specific τ and v values on the Delay-Doppler or information frame or array. These pilot symbols are smeared or distributed, by the transmitter, over a plurality of times and frequencies on the Time-Frequency or signal plane or array in the same manner as the OTFS data symbols.

Because of this smearing, some of these later OTFS pilot symbols occupy the same k and l values as some of the OTFS data symbols on the time frequency frame. In this embodiment, the delay-Doppler pilot symbols could alternatively be called "OTFS encoded pilot symbols", or "OTFS modulated pilot symbols". This later embodiment is shown in FIG. 9. These types of pilot symbols can be used, for example, for an alternative type of 2D equalizer that operates at the level of the Delay-Doppler domain or information plane.

Both types of pilot signals are potentially useful, and indeed both types of pilot symbols can be used for different types (e.g. time-Frequency 2D equalizer, Delay-Doppler 2D equalizer) of equalization methods. The OTFS associated pilot symbols (time-frequency frame pilot symbols) can be used by an early stage receiver 2D equalizer, operating on the time-frequency domain or plane, to "clean up" the raw OTFS signals at the receiver version of the Time-Frequency or signal domain, plane, or array. By contrast, the OTFS encoded pilot symbols (delay-Doppler pilot symbols) can be used by a later stage receiver 2D equalizer to clean up the received signals at the receiver version of the Delay-Doppler or information plane as well.

By contrast, prior art OFDM methods do not teach anything corresponding to OTFS encoded pilot symbols (delay-Doppler pilot symbols). Prior art OFDM methods only taught the equivalent of time-frequency pilot symbols. Such time-frequency pilot symbols are shown in FIG. 20.

FIG. 21 illustrates one method how prior art (e.g. 4G/LTE) time-frequency pilot symbols from FIG. 20 can also be useful for OTFS purposes even in advance of any actual OTFS transmissions.

Due to the popularity of 4G/LTE, 4G/LTE pilot symbols have been sent to and from hundreds of millions of devices from hundreds of thousands of cellular base stations throughout the world. If this legacy pilot data was harnessed, a worldwide map of how, over the large number of 4G/LTE subcarriers, and on a 24 hour basis, wireless data channels suffer from at least various types of time delay impairments is available.

In some embodiments, this legacy 4G/LTE pilot symbol data can be used to help provide at least a first order configuration for at least one type of OTFS 2D equalizer, such as a time-frequency 2D equalizer. This information may also be capable of being manipulated so that it is useful for a Delay-Doppler or information plane 2D equalizer as well. For example, each pilot symbol, at its respective frequency and time, tends to be attenuated according to the time and frequency characteristics of the data channel. This effect is shown in FIG. 21.

FIG. 21 (left) shows an example of how legacy 4G/LTE pilot symbols (see FIG. 20) can be used to produce an attenuation map, as a function of time, frequency, and location (not shown) of the 4G/LTE spectrum.

According to some embodiments, this legacy data may also be used to provide information useful for producing the channel delay-Doppler impulse response $h(\tau,v)$ or other type of convolution mask which in turn is useful for both types of receiver 2D equalizers to further clean up channel distorted signals.

Note however that in some embodiments, some types of receiver 2D equalizers described herein need not use such legacy OFDM pilot symbol methods, but instead may use non-legacy OTFS encoded pilot symbols", or "OTFS modulated pilot symbols", (e.g. delay-Doppler pilot symbols) and operate only on the Delay-Doppler Domain (such as in a delay-Doppler 2D equalizer).

Thus in some embodiments, the system can make use of 4G/LTE type OFDM subcarriers and symbol time localized 4G/LTE legacy pilot symbols. For example, an OFDM receiver can receive this plurality of legacy 4G/LTE pilot symbols as channel distorted legacy 4G/LTE pilot symbols. These channel distorted 4G/LTE pilot symbols can then be used for various purposes, such as to configure at least one type of receiver 2D equalizer, or even determine channel parameters that in turn can be used to help determine the parameters of the 2D OTFS delay-Doppler frame and the 2D OTFS time-frequency frame.

Latency Considerations

Depending on user needs, some types of data, such as telephone conversations, need to be transmitted with minimum latency, while other types of data, such as video broadcast data, have a tolerance for more latency, but may be more affected by efficiency of data transmission. In this later case, longer latency may be less of a problem, but artifacts due to video compression may be a bigger issue. So different types of data have different latency/efficiency tradeoff needs.

Here, the system can cope with these different latency and efficiency needs, as well as other needs, by packaging the data into different types (e.g. different M×N) sizes of 2D OTFS delay-Doppler frames (and corresponding Time-Frequency frames). Here again, it may be useful to interleave or intersperse frames during transmission, such as to interrupt video frame time intervals with more latency sensitive audio frames of data.

Here, in some embodiments, the at least one (transmitter or transceiver) processor can distribute this plurality of data symbols over a plurality of different sized frames by using different sized 2D delay-Doppler frames, thereby creating a plurality of different sized 2D OTFS time-frequency frame based wave aggregates. The transmitter can further transmit frequency filtered portions of the resulting different sized 2D OTFS time-frequency frame based wave aggregates, in any of a time or frequency interspersed or interleaved manner, either within the different sized frames or outside (e.g. between) the different sized frames.

The receiver can then sort this out. That is, at the receiving end, the processor on the wireless receiver can be configured to distinguish, on a different sized frame basis, between the various channel distorted replicas of these frequency filtered portions of the different sized 2D OTFS time-frequency frame based wave aggregates. The receiver (or transceiver) processor(s) can then be configured to extract the plurality of replica data symbols from the appropriate channel deconvoluted different sized 2D delay-Doppler frames.

Here, as previously discussed, these methods are useful because at least some of the different sized 2D delay-Doppler frames and corresponding different sized 2D OTFS time-frequency frame based wave aggregates may be chosen for at least one of reduced latency, increased rate of data symbol transmission, increased tolerance to channel Doppler shifts and increased tolerance to channel multi-path delay effects.

Pilot Symbol Methods

As previously discussed, the OTFS methods discussed herein may be further used to configure at least one type of Delay-Doppler domain 2D equalizer, using as OTFS encoded pilot symbols, by using OTFS pilot symbols distributed over the 2D OTFS delay-Doppler frame.

FIG. 9 shows an example of how data symbols (short spikes), an OTFS encoded (delay-Doppler) pilot symbol (large spike) and a series of clear regions or zero symbols (used in conjunction with the OTFS encoded pilot region) can be distributed over the 2D OTFS delay-Doppler frame, here called the "OTFS information domain" or the "Delay-Doppler frame." There as before, the coordinates are called $\tau$ and v. The data symbols will often be represented by a complex number such as a QAM symbol.

FIG. 13 shows an image showing how the various QAM symbols on the original 2D OTFS delay-Doppler frame, after the various transformation, transmission, channel distortion, reception, and inverse transformation end up being smeared, due to channel distortions (here called the Delay-Doppler Impulse Response), over multiple bins in the channel distorted replica of the 2D OTFS delay-Doppler frame. Here knowledge of the Delay-Doppler Impulse response can be used to configure a delay-Doppler 2D equalizer to clean up this smeared signal, thus producing a clearer channel deconvoluted 2D OTFS delay-Doppler frame (not shown).

FIG. 11 shows an alternative version of FIG. 13, showing how the channel convoluted signals yr,v can be viewed mathematically as being the transmitted OTFS QAM symbols xr,v convoluted by the Delay-Doppler response h(r, v). Thus the received symbols (channel convoluted QAM symbols) can be viewed as being the original QAM information symbols, as modulated by the orthogonal basis and Delay-Doppler covariant functions are ¢r,v(t), and as convoluted by the Delay-Doppler impulse response h(r, v).

According to this technique, the OTFS encoded pilot symbols may be used to configure a Delay-Doppler 2D equalizer as follows. Here the at least one transmitter or transceiver processor can be used to distribute at least one pilot symbol on at least one defined pilot symbol location, (usually along with the plurality of data symbols), over the 2D delay-Doppler frame. The transmitter can then further transform these data symbols and the at least one pilot symbol on or from the 2D delay-Doppler frame. This creates a 2D OTFS time-frequency frame based wave aggregate in a manner that also spreads this at least one pilot symbol, in a lossless manner, throughout substantially all of the 2D OTFS time-frequency frame based wave aggregate.

Again, during transit from the wireless transmitter to the wireless receiver, the transmitted frequency filtered portions of the 2D OTFS time-frequency frame based wave aggregate are channel distorted according to the delay and Doppler characteristics of the channel. But here, the receiver (receiver or transceiver processor) at least knows in advance (has knowledge) of where the pilot symbol is located, and what the pilot symbol should look like. The receiver can then use it's at least one processor, and the knowledge pertaining to this at least one pilot symbol and at least one defined pilot symbol location, and information obtained from observing the channel distortions on this at least one pilot symbol, to configure its Delay-Doppler 2D equalizer. This information may also be useful for configuring the receiver's time-Frequency plane 2D equalizer as well.

FIG. 13 shows in more detail how knowledge of the channel Delay Doppler Impulse response can, essentially by configuring a Delay-Doppler or information plane 2D equalizer to do an inverse of this channel Delay Doppler Impulse response, clean up the channel distorted replica of the 2D OTFS delay Doppler frame, thus producing replica data symbols (symbol matrix) that are very high fidelity replicas of the original data symbols.

Distinguishing Between OTFS 2D Equalizer and Prior Art OFDM Equalization Methods Note that although prior art OFDM pilot symbols can be used to configure at least a time-Frequency plane operating 2D equalizer, there is no requirement that such prior art OFDM pilot symbols, or other OFDM channel impairment compensation methods such as OFDM cyclic prefixes, be used in this process. Thus in some embodiments, at least one type of receiver Delay-Doppler 2D equalizer is capable of operation without use of OFDM cyclic prefixes or use of OFDM subcarrier or symbol time localized pilot symbols.

FIG. 12 shows a representation the relationship between various coordinates on the 2D OTFS delay-Doppler frame and various unique 2D basis wave functions on the 2D OTFS time-frequency frame. These basis functions will then be modulated by the value of the data symbols (which are typically complex numbers) at their particular coordinates on the 2D OTFS delay-Doppler frame. FIG. 7 shows another look at the very high level mathematical perspective of one embodiment of the OTFS modulation and demodulation methods, previously shown in FIG. 1J. Here again, the T and v coordinates are the coordinates of the information plane or 2D OTFS delay-Doppler frame on which various data symbols (usually a complex number) are distributed prior to transmission. Data on this frame are then transformed, often over a 2D basis (b) such as a 2D Fourier transform basis, and optionally scrambled by a scrambling operation (W), onto the 2D OTFS time-frequency frame (t,f). Here the entire complex process is essentially shown in mathematical shorthand, where the various complex operations described elsewhere herein are referred to merely as OTFS transforms, Heisenberg transforms, and the inverse of these transforms.

An alternative, but still very high level, definition of a Heisenberg transformation given herein. Again, a "Heisenberg" transformation is one alternative way of describing, in mathematical shorthand notation, some of the specific methods of transmitting the 2D OTFS time-frequency based wave aggregate, and described elsewhere in this disclosure. The corresponding Wigner transform is one way of describing, in mathematical shorthand notation, the inverse of this process, as implemented at the receiver.

Put alternatively, the "Heisenberg" transformation is "math-type" shorthand way of describing some specific processes by which the transmitter can select various portions of the wave aggregate to transmit over various time slices, and the "Wigner" (here essentially the receiver counterpart of this process) is a "math-type" shorthand way of describing some processes by which the receiver receives these various portions of the wave aggregate over various time slices, and reconstitutes the 2D OTFS time-frequency frame. The engineering equivalents of the "Heisenberg" and "Wigner" operations are described in general terms elsewhere herein.

Describing this process from a more engineering standpoint, samples of the 2D OTFS time-frequency frame wave forms (wave aggregate) can be run though a filter bank (here the term "running through a filter bank" is used as an informal way of saying that the system circuitry will select certain frequency bands—much of this will often be done digitally) and transmitted over a series of narrow-band subcarriers over a series of time intervals as described in more detail elsewhere in this disclosure. In this particular embodiment, this process is being described in an alternative mathematical terminology called the Heisenberg transform. The various resulting waveforms pass through the channel, where they are then demodulated, (here described mathematically as a Wigner transform), taken to a replica 2D OTFS time-frequency frame, and from there an inverse of the original transform results in channel distorted replica of the original data symbols appearing on the channel distorted replica of the 2D OTFS delay-Doppler frame.

These data symbols may then optionally be further cleaned up using a 2D equalizer, such as a delay-Doppler 2D equalizer.

Figure 14:
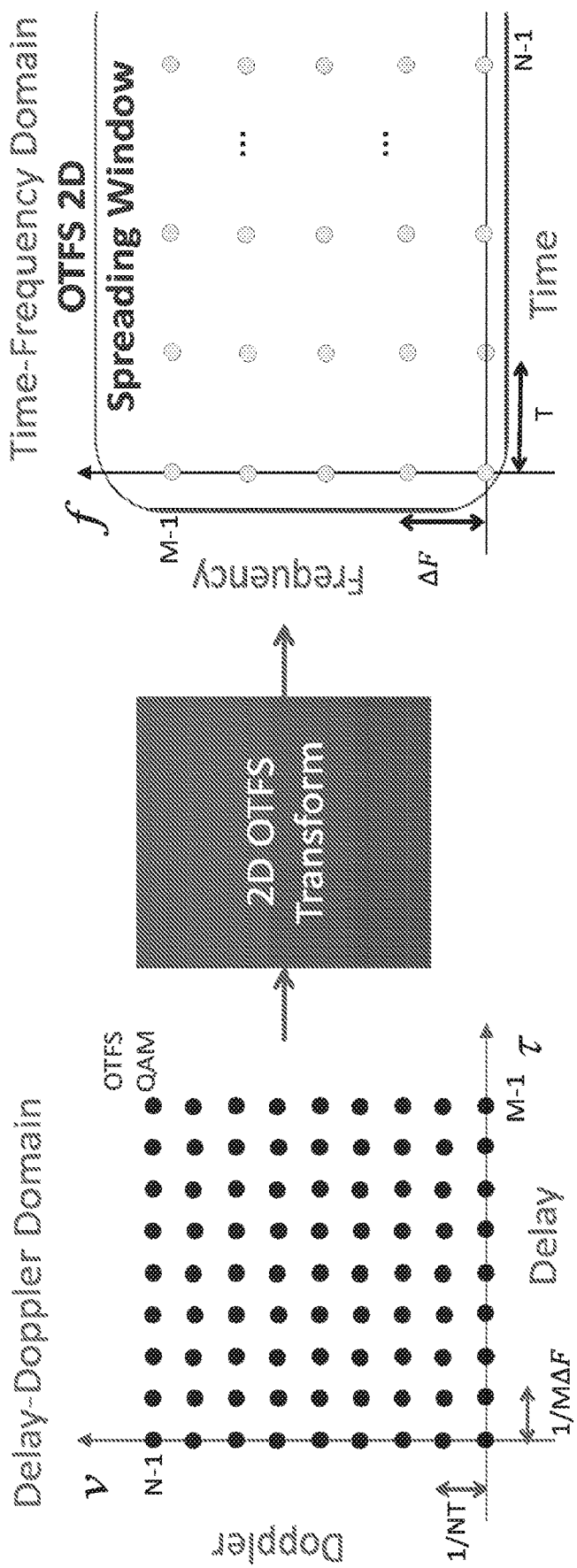
FIG. 14 shows an example of transforming OFTS QAM signal onto a time-frequency grid.

FIG. 14 shows a pictorial example of the process of "transforming the data symbols on the 2D OTFS delay-Doppler frame by using each data symbol and frame location to modulate a unique 2D basis wave function, selected from a set of mutually orthogonal 2D basis wave functions operating over a 2D OTFS time-frequency frame, the transformation also spreading each data symbol, in a lossless and invertible manner, throughout substantially all of the 2D OTFS time-frequency frame, the transformation thereby creating a 2D OTFS time-frequency frame based wave aggregate".

Here the various data symbols (here QAM symbols) have been distributed over the 2D OTFS delay-Doppler frame. 2D OTFS transformation has spreading each data symbol, in a lossless and invertible manner, throughout substantially all of the 2D OTFS time-frequency frame, the transformation thereby creating a 2D OTFS time-frequency frame based wave aggregate. In some embodiments, the symplectic transform (equations 7, 8, 9 and 10) may be used, FIG. 15 shows another example of how data symbols (such as QAM symbols) distributed over the 2D OTFS delay-Doppler frame (or domain) are, as a result of the transformation (here termed the 2D OTFS transform) transformed and used to modulate 2 D basis wave functions, in particular Delay-Doppler covariant orthogonal basis functions over the 2D OTFS time-frequency frame (or domain). Examples where the 2D basis wave functions are Fourier basis functions are given.

FIG. 16 shows more details of how the data symbols (in this example, QAM symbols) are transformed from the 2D OTFS delay-Doppler frame (domain) to the 2D OTFS time-frequency frame (domain). Here each data symbol (each QAM symbol), which can be a complex number, modulates its particular unique 2D basis function by multiplication. When this process is done for all data symbols (and any optional pilot symbols and null symbols) on the 2D OTFS delay-Doppler frame, the resulting superposition of multiple QAM symbols weighting (or modulating) the various 2D basis functions are created. This superposition is here termed a "wave aggregate".

Note that this process spreads the symbols across time and frequency, yet still maintains the 2D orthogonality of the various basis functions. This is important because in order to be useful, the process must be lossless and invertible (e.g. the receiver must be able to unscramble all of this with a very low error rate).

Figure 19:
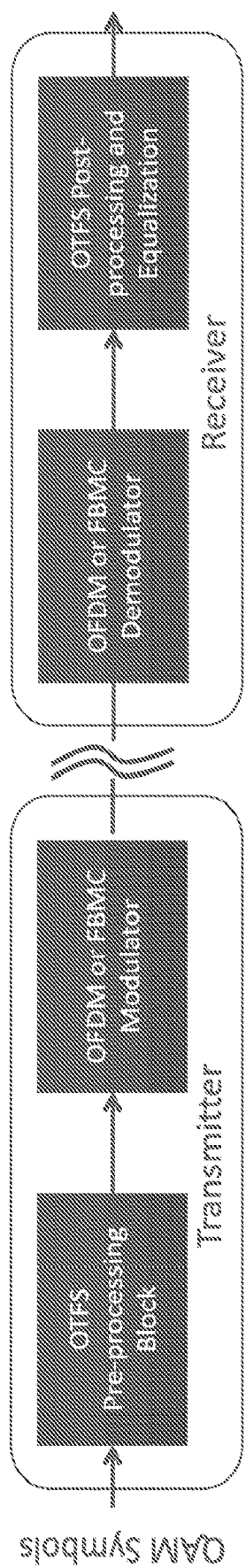
FIG. 19 is a block diagram representation of a back-to-back OTFS transmitter/receiver system.

FIG. 19 shows more detail of how the OTFS methods described herein may be used to retain at least some compatibility with legacy OFDM methods, such as legacy 4G/LTE methods.

Assuming that the system will retain the same type M narrow band subcarriers with similar frequencies and bandwidths (and optionally also underlying tones) as legacy OFDM systems, then at both the transmitter and receiver side, a substantial amount of legacy type OFDM circuitry may be retained. Indeed, when desired, this legacy type OFDM circuitry may be used to transmit legacy OFDM symbols whenever desired. Assuming suitable choice of M subcarriers, subcarrier frequencies, and subcarrier bandwidths, such legacy OFDM symbols could be received by legacy OFDM receivers as desired. Alternatively the systems described herein could also be configured to receive legacy OFDM symbols from legacy OFDM transmitters.

In this scheme, the OTFS methods described herein can be viewed as providing a unique type of pre-processor for this legacy type OFDM circuitry. When it is desired to transmit OTFS type schemes, this "OTFS pre-processing block" can create the more complex OTFS waveforms (waveform packets) that can then be transmitted over M narrow band subcarriers at the same frequencies and bandwidths as legacy OFDM systems (if desired), or at alternate frequencies and bandwidths also as desired. From this perspective, the OTFS methods described herein may be viewed as being a "next generation" version of OFDM.

Although this disclosure has focused primarily on the 2D OTFS time-frequency frame based wave aggregate embodiments, these methods are not intended to be limiting. In other embodiments, use of previously described OTFS methods, such as the methods previously disclosed in U.S. patent application Ser. Nos. 13/927,091; 13/927,086; 13/927,095; 13/927,089; 13/927,092; 13/927,087; 13/927,088; 13/927,091; 14/583,911; and/or provisional applications 62/129,930, 61/664,020, and 62/027,231 may also be used for some of the OTFS modulation methods disclosed herein. This is why the entire contents of U.S. patent applications 62/027,231, 62/129,930, 13/927,091; 13/927/086; 13/927,095; 13/927,089; 13/927,092; 13/927,087; 13/927,088; 13/927,091; 14/583,911 and 61/664,020 are incorporated herein in their entirety.

These methods were reviewed earlier in this disclosure. Although in these earlier methods, generally the timing of the various OTFS signal bursts on each subcarrier were not identical (instead the timing would vary on a per time slice basis between subcarriers), otherwise subcarriers with frequencies and bandwidths compatible with legacy OFDM systems, such as 4G/LTE systems may be used. Thus some degree of backwards compatibility with legacy OFDM and 4G/LTE systems can also be obtained when desired, and the system processors may be directed to transition back and forth between legacy OFDM and OTFS methods as desired.

In such alternative embodiments, instead of using each data symbol and frame location to modulate a unique, location specific, 2D basis wave function selected from a set of mutually orthogonal 2D basis wave functions operating over a 2D OTFS time-frequency frame, these earlier OTFS methods or other types of OTFS methods of transforming the data symbols on the 2D OTFS delay-Doppler frame may be used.

Here again, however this alternative transformation should also spread each data symbol, in a lossless and invertible manner, throughout substantially all of the 2D OTFS time-frequency frame, and the alternative transformation should still create a 2D OTFS time-frequency frame based wave aggregate.

Figure 23:
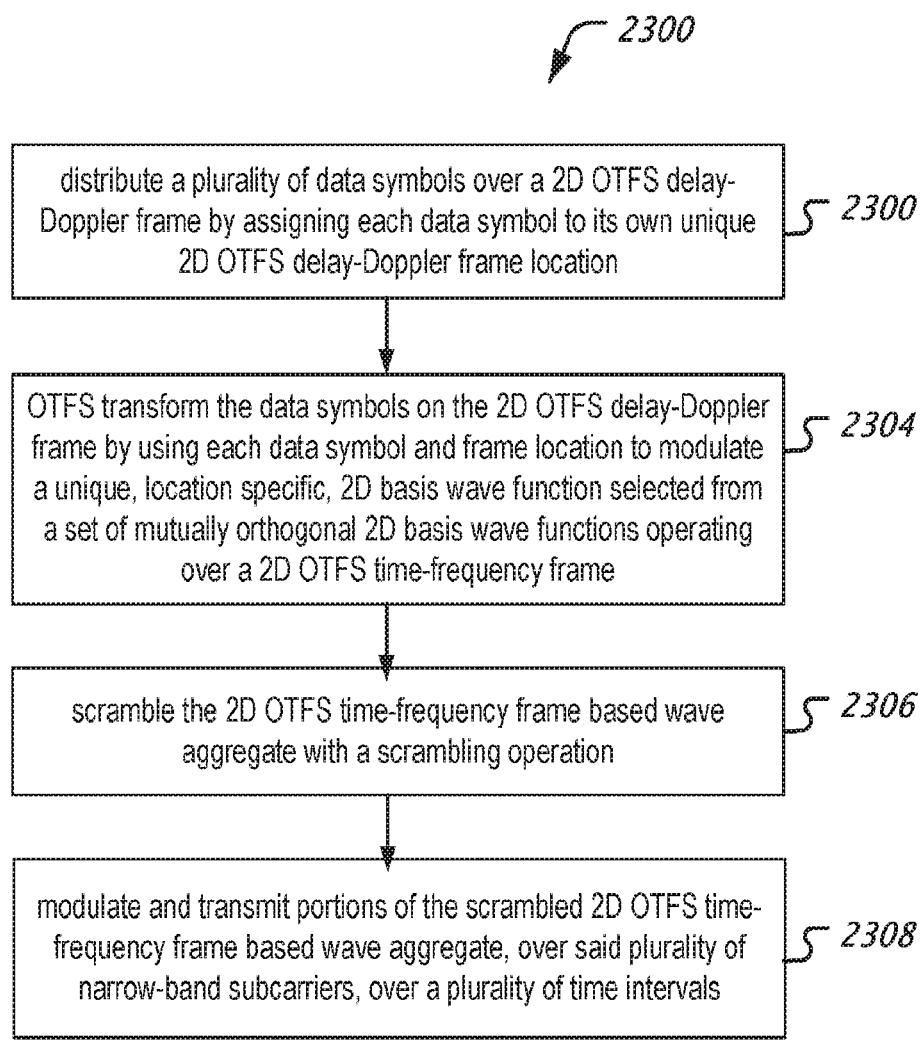
FIG. 23 is a flowchart representation of an example wireless data transmission method.

FIG. 23 is a flowchart representation of a method 2300 of wireless signal transmission.

The method may be implemented by a transmitter to transmit a plurality of data symbols on a per frame basis over an impaired wireless channel comprising a plurality of narrow-band subcarriers.

The method 2300 includes, at 2302, for each frame, using at least one processor to distribute the plurality of data symbols over a 2D OTFS delay-Doppler frame by assigning each data symbol to its own unique 2D OTFS delay-Doppler frame location.

The method 2300 includes, at 2304, transforming the data symbols on the 2D OTFS delay-Doppler frame by using each data symbol and frame location to modulate a unique, location specific, 2D basis wave function selected from a set of mutually orthogonal 2D basis wave functions operating over a 2D OTFS time-frequency frame, the transformation also spreading each data symbol, in a lossless and invertible manner, throughout substantially all of the 2D OTFS time-frequency frame, the transformation thereby creating a 2D OTFS time-frequency frame based wave aggregate.

The method 2300 includes, at 2306, further scrambling the 2D OTFS time-frequency frame based wave aggregate with a scrambling operation.

The method 2300 includes, at 2308, using a wireless transmitter to modulate and transmit portions of the scrambled 2D OTFS time-frequency frame based wave aggregate, over the plurality of narrow-band subcarriers, over a plurality of time intervals. The granularity and extent of the portions, the plurality of narrow-band subcarriers, and the time intervals are chosen so that the sum of the transmitted portions accurately characterize the scrambled 2D OTFS time-frequency frame based wave aggregate. the impaired wireless channel distorts the transmitted portions into channel distorted portions.

In some embodiments, the scrambling operation is a null operation, or wherein the scrambling operation is selected to perform at least one of managing peak transmitter power and allowing receivers to distinguish between different transmitters.

In some embodiments, wherein the mutually orthogonal 2D basis wave functions are 2D Fourier or Fourier-like basis functions.

In some embodiments, any of the OTFS transform and the inverse of the OTFS transform are Fourier-like transforms and inverse Fourier-like transforms including transforms selected from the group consisting of symplectic Fourier transforms, symplectic discrete Fourier transforms, symplectic finite Fourier transforms, inverse symplectic Fourier transforms, inverse symplectic discrete Fourier transforms, inverse symplectic finite Fourier transforms, fast Fourier transforms, inverse fast Fourier transforms, wavelet transforms, inverse wavelet transforms, discrete wavelet transforms, and inverse discrete wavelet transforms.

In some embodiments, at least for the transmitter, the 2D OTFS time-frequency frame has a rectangular grid structure and parameters in which the plurality of time intervals is N time intervals, and the plurality of narrow band subcarriers is M subcarriers, each time interval has duration T, and each narrow band subcarrier has frequency bandwidth $\Delta f$.

In some embodiments, wherein at least for the transmitter, the 2D OTFS delay-Doppler frame comprises N*M locations, and the OTFS transform distributes N*M data symbols over the 2D OTFS time-frequency frame. In some embodiments, the method 2300 may further include at least for the transmitter, further using any of anticipated wireless time delay and anticipated wireless Doppler shift characteristics of the impaired wireless channel to configure parameters of at least the 2D OTFS delay-Doppler frame.

In some embodiments, the method 2300 may be implemented by a transmitter that is OFDM backward compatible. In some embodiments, the OFDM backward compatible transmitter transmits the portions of the 2D OTFS time-frequency frame based wave aggregates, over the plurality of narrow-band OFDM subcarriers, over the plurality of time intervals, in a manner that is either:

A. compatible with interspersed legacy OFDM symbols originating from other transmitters that are carried over at least some of the plurality of narrow-band OFDM subcarriers and/or over at least some of the time intervals; and/or B. compatible with interspersed legacy OFDM symbols originating from the OFDM backward compatible transmitter that are carried over at least some of the plurality of narrow-band OFDM subcarriers and/or over at least some of the time intervals.

In some embodiments, the legacy OFDM symbols comprise 4G/LTE symbols, and at least one of the OFDM backward compatible transmitter or the OFDM backward compatible receiver are configured to operate according to any of OTFS and 4G/LTE methods, or other legacy OFDM method.

In some embodiments, the method 2300 further includes—the 4G/LTE symbols are transmitted along with a plurality of OFDM subcarrier and symbol time localized 4G/LTE legacy pilot symbols, further using the OFDM backward compatible receiver to receive the plurality of legacy 4G/LTE pilot symbols as channel distorted legacy 4G/LTE pilot symbols, and using the channel distorted 4G/LTE pilot symbols to at least partially configure either a delay-Doppler 2D equalizer or a time-frequency 2D equalizer, In some embodiments, the at least one processor distributes the plurality of data symbols over a plurality of different sized frames by using different sized 2D delay-Doppler frames, thereby creating a plurality of different sized 2D OTFS time-frequency frame based wave aggregates. The method 2300 may include further transmitting portions of the different sized 2D OTFS time-frequency frame based wave aggregates, in any of a time or frequency interspersed manner, either within the different sized frames or outside of the different sized frames.

In some embodiments, at least some of the different sized 2D delay-Doppler frames and corresponding different sized 2D OTFS time-frequency frame based wave aggregates are chosen for at least one of reduced latency, increased rate of data symbol transmission, increased tolerance to channel Doppler shifts and increased tolerance to channel multi-path delay effects.

In some embodiments, at least some of the plurality of data symbols comprise delay-Doppler pilot symbols, further using the at least one processor to distribute at least one delay-Doppler pilot symbol on at least one defined delay-Doppler pilot symbol location, along with the plurality of data symbols, over the 2D delay-Doppler frame. The method 2300 may include further transforming the data symbols and the at least one delay-Doppler pilot symbol on the 2D delay-Doppler frame, thereby creating a 2D OTFS time-frequency frame based wave aggregate in a manner that also spreads the at least one delay-Doppler pilot symbol, in a lossless manner, throughout substantially all of the 2D OTFS time-frequency frame based wave aggregate, wherein during transit from the wireless transmitter to the wireless receiver, the transmitted portions of the 2D OTFS time-frequency frame based wave aggregate are channel distorted according to delay and Doppler characteristics of the channel.

In some embodiments, the delay Doppler 2D equalizer is capable of operation without use of OFDM cyclic prefixes or use of OFDM subcarrier or symbol time localized pilot symbols.

In some embodiments, at least some of the different sized 2D delay-Doppler frames and corresponding different sized 2D OTFS time-frequency frame based wave aggregates are chosen for at least one of reduced latency, increased rate of data symbol transmission, increased tolerance to channel Doppler shifts and increased tolerance to channel multi-path delay effects.

In some embodiments, at least some of the plurality of data symbols comprise delay-Doppler pilot symbols, further using the at least one processor to distribute at least one delay-Doppler pilot symbol on at least one defined delay-Doppler pilot symbol location, along with the plurality of data symbols, over the 2D delay-Doppler frame. In these embodiments, the method 2300 may include further transforming the data symbols and the at least one delay-Doppler pilot symbol on the 2D delay-Doppler frame, thereby creating a 2D OTFS time-frequency frame based wave aggregate in a manner that also spreads the at least one delay-Doppler pilot symbol, in a lossless manner, throughout substantially all of the 2D OTFS time-frequency frame based wave aggregate. During transit from the wireless transmitter to the wireless receiver, the transmitted portions of the 2D OTFS time-frequency frame based wave aggregate are channel distorted according to delay and Doppler characteristics of the channel.

As previously described, in some embodiments, the delay Doppler 2D equalizer is capable of operation without use of OFDM cyclic prefixes or use of OFDM subcarrier or symbol time localized pilot symbols.

In some embodiments, at least the OTFS time-frequency frame has a non-rectangular grid structure, and the non-rectangular grid structure in turn controls any of start times, time durations, frequencies, frequencies over time, bandwidths, or bandwidths over time of any of the portions, the plurality of time intervals and the plurality of narrow band subcarriers.

In some embodiments, in the method 2300, on a per narrow band subcarrier basis, the plurality of time intervals have non-identical start times, such that the transmitter starting time at one subcarrier is not the same as the transmitter starting time at a different subcarrier.

In some embodiments, the method 2300 may include further using the at least one processor to distribute at least one time-frequency pilot symbol on at least one defined pilot symbol time-frequency location, along with the plurality of data symbols, over at least one defined time and frequency location and portion of a 2D time-frequency frame that is not occupied with the scrambled 2D OTFS time-frequency frame based wave aggregate.

During transit from the wireless transmitter to the wireless receiver, the transmitted at least one time-frequency pilot symbol is also channel distorted according to the delay and Doppler characteristics of the channel.

In some embodiments, the method 2300 may include using the high resolution version of the receiver's 2D OTFS time-frequency frame to either distinguish between multiple users; or further using the high resolution version of the receiver's 2D OTFS time-frequency frame with at least one 2D equalizer to further correct for the channel distortions.

Figure 24:
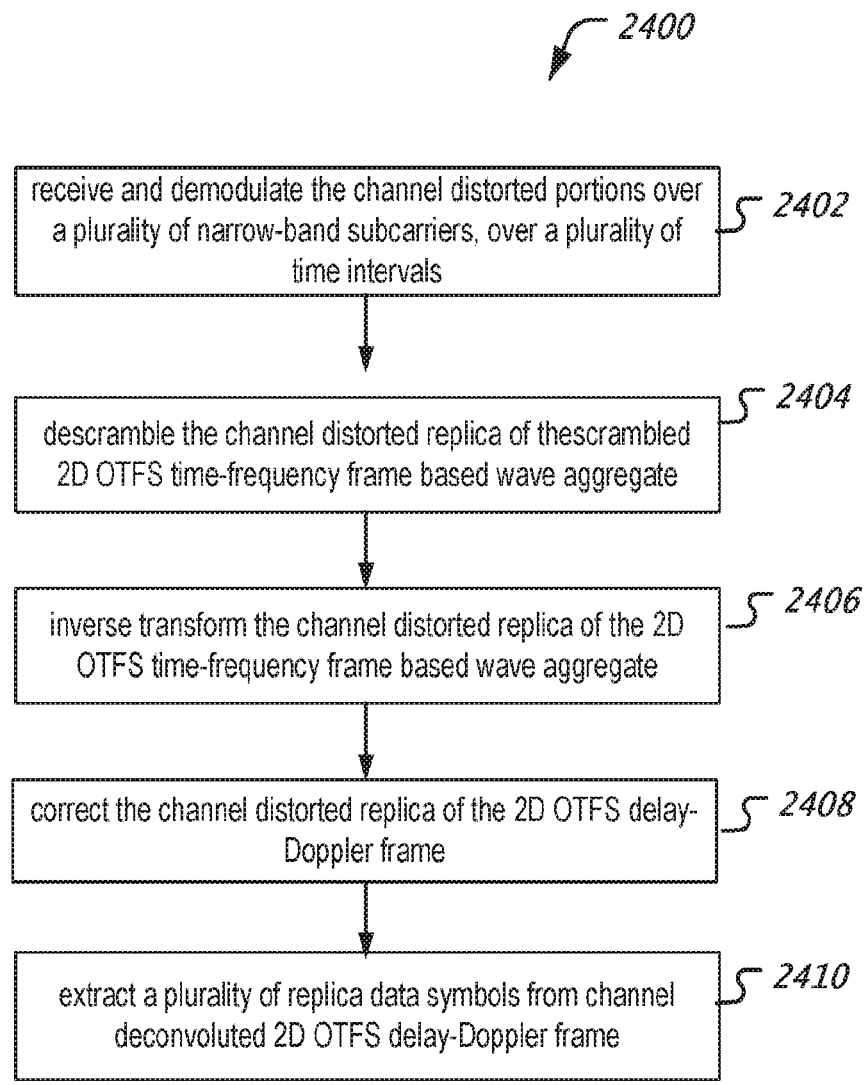
FIG. 24 is a flowchart representation of an example wireless data reception method.

FIG. 24 shows a flowchart of an example method 2400 of wireless signal reception. The method 2400 may be implemented by a wireless receiver apparatus for receiving signal generated by the various embodiments of the method 2300 described above. Prior to reaching the receiver, a modulated wireless signal may have gone channel distortions as described in the present document.

The method 2400 may include, at 2402, receiving and demodulating the channel distorted portions over the plurality of narrow-band subcarriers, over a plurality of time intervals, thereby recovering a channel distorted replica of the scrambled 2D OTFS time-frequency frame based wave aggregate.

The method 2400 may perform, at 2404, an inverse of a scrambling operation to descramble the channel distorted replica of the scrambled 2D OTFS time-frequency frame based wave aggregate, thereby creating a descrambled channel distorted replica of the 2D OTFS time-frequency based wave aggregate.

The method 2400 may perform, at 2406, an inverse of the OTFS transform to inverse transform the channel distorted replica of the 2D OTFS time-frequency frame based wave aggregate, thereby producing, once substantially all of the portions have been received, a channel distorted replica of the 2D OTFS delay-Doppler frame.

The method 2400 may perform, at 2408, using a delay-Doppler 2D equalizer, correction of the channel distorted replica of the 2D OTFS delay-Doppler frame, thereby producing a channel deconvoluted 2D OTFS delay-Doppler frame.

The method 2400 may perform, at 2410, extraction of a plurality of replica data symbols from the channel deconvoluted 2D OTFS delay-Doppler frame.

In some embodiments, the receiver may be backward compatible with OFDM transmissions (e.g., 4G/LTE). In such embodiments, the method 2400 may include further using the OFDM backward compatible receiver to receive the plurality of legacy 4G/LTE pilot symbols as channel distorted legacy 4G/LTE pilot symbols, and using the channel distorted 4G/LTE pilot symbols to at least partially configure either a delay-Doppler 2D equalizer or a time-frequency 2D equalizer.

In some embodiments, the method 2400 may include further using the wireless receiver to distinguish, on a different sized frame basis, between channel distorted replicas of the different sized 2D OTFS time-frequency frame based wave aggregates, and to extract the plurality of replica data symbols from appropriate channel deconvoluted different sized 2D delay-Doppler frames. At least some of the different sized 2D delay-Doppler frames and corresponding different sized 2D OTFS time-frequency frame based wave aggregates are chosen for at least one of reduced latency, increased rate of data symbol transmission, increased tolerance to channel Doppler shifts and increased tolerance to channel multi-path delay effects.

In some embodiments, at the receiver, using the at least one processor, knowledge pertaining to the at least one delay-Doppler pilot symbol and at least one defined pilot symbol location, and the channel distortions, may be used to recover a 2D impulse response of the channel, and use the 2D impulse response to configure the delay-Doppler 2D equalizer.

In some embodiments, the method 2400 may be implemented by a receiver that comprises both a time-frequency 2D equalizer that operates on the contents of the time-frequency frame, and a delay-Doppler 2D equalizer that operates at the contents of the delay-Doppler frame. In such embodiments, at the receiver, using the at least one processor, knowledge pertaining to the at least one time-frequency pilot symbol and at least one defined pilot symbol time-frequency location, and the channel distortions, to configure at least the time-frequency 2D equalizer.

In some embodiments, the receiver comprises a plurality of receiver sub-sections, each receiver subsection configured with fractionally different time and frequency offsets, the at least one processor configured to use the receiver subsections to sample the channel distorted replica of the scrambled 2D OTFS time-frequency frame based wave aggregate according to the fractionally different time and frequency offsets, and to combine the samples in a manner that produces a high resolution channel distorted replica of the scrambled 2D OTFS time-frequency frame based wave aggregate over a high resolution version of the receiver's 2D OTFS time-frequency frame.

In some embodiments, the method 2400 may include using the high resolution version of the receiver's 2D OTFS time-frequency frame to either distinguish between multiple users.

In some embodiments, the method 2400 may include further using the high resolution version of the receiver's 2D OTFS time-frequency frame with at least one 2D equalizer to further correct for the channel distortions.

Figure 25:
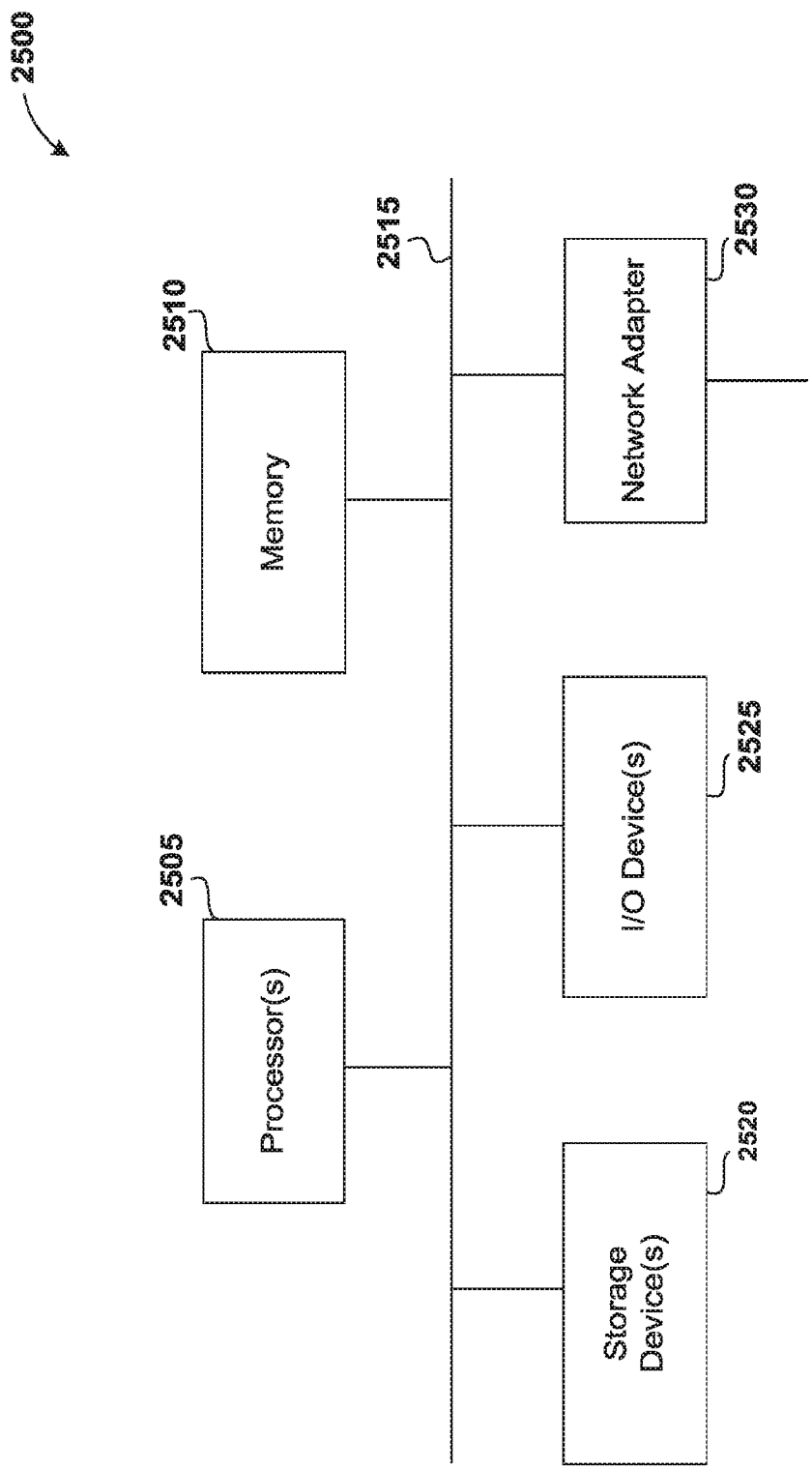
FIG. 25 is a block diagram representation of a wireless communications apparatus.

FIG. 25 is a block diagram depiction of an apparatus 2500. The apparatus 2500 may be used to implement the transmitter or the receiver functionalities described herein. The apparatus may include one or more processors 2505, one or more memories 2510, zero or more additional storage devices 2520, zero or more input-output devices 2525 and one or more network adapters 2530, all of which may be communicatively coupled with each other through communication path(s) 2515, which generally representing central and/or dedicated data paths. Processors 2505 may be, for example, digital signal processors, application specific integrated circuits, (ASICs), general purpose central processing units and the like. Suitable memories may be used for storing data and/o instructions and no assumptions are made about sizes, fabrication technologies, i/o speed, volatility of storage, etc. The storage devices 2520 may include hard drivers, magnetic and or optical removable or permanently attached storage memories and such. No additional storage device may be used in some embodiments. I/O devices 2525 may include, in various embodiments, human interaction devices such as touchscreen devices, keyboards, trackballs, spoken input capture devices, gesture capture devices, display and audio outputs, etc. Network adapters may 2530 included wired or wireless adapters such as those that comply with well-known industry standards such as USB, LTE, fiber, copper wire, and so on. It is understood that the device 2500 is shown as an example and is not meant to be an exhaustive "bill of material" of a device that can embody the disclosed technology.

It will be appreciated that various techniques are disclosed for transmitting and receiving data using OTFS modulation techniques.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of transmitting, on a per-frame basis, a plurality of data symbols over an impaired wireless channel comprising a plurality of narrow-band subcarriers, the method comprising:

for each frame, distributing the plurality of data symbols over a two-dimensional (2D) orthogonal time frequency space (OTFS) delay-Doppler frame by assigning each data symbol to its own unique 2D OTFS delay-Doppler frame location, wherein the 2D OTFS delay-Doppler frame comprises a 2D delay-Doppler grid, and wherein the 2D OTFS delay-Doppler frame location is a 2D delay-Doppler grid coordinate;

OTFS transforming, using an OTFS transform operation, the plurality of data symbols on the 2D OTFS delay-Doppler frame by using each data symbol and frame location to modulate a unique, location specific, 2D basis wave function selected from a set of mutually orthogonal 2D basis wave functions operating over a 2D OTFS time-frequency frame, wherein the OTFS transforming spreads each data symbol, in a lossless and invertible manner, throughout the 2D OTFS time-frequency frame, and wherein the OTFS transforming creates a 2D OTFS time-frequency frame based wave aggregate;

scrambling the 2D OTFS time-frequency frame based wave aggregate with a scrambling operation to generate a scrambled 2D OTFS time-frequency frame based wave aggregate; and modulating and transmitting portions of the scrambled 2D OTFS time-frequency frame based wave aggregate, over the plurality of narrow-band subcarriers, over a plurality of time intervals, wherein a granularity and extent of the portions, the plurality of narrow-band subcarriers, and the plurality of time intervals are chosen so that the sum of the transmitted portions characterizes the scrambled 2D OTFS time-frequency frame based wave aggregate, and wherein the impaired wireless channel distorts the transmitted portions into channel distorted portions.

2. The method of claim 1, wherein the scrambling operation is a null operation, or wherein the scrambling operation is selected to perform at least one of managing peak transmitter power and allowing receivers to distinguish between different transmitters.

3. The method of claim 1, wherein the set of mutually orthogonal 2D basis wave functions are 2D Fourier or Fourier-like basis functions.

4. The method of claim 1, wherein the OTFS transform is a symplectic Fourier transform, a symplectic discrete Fourier transform, a symplectic finite Fourier transform, a fast Fourier transform, a wavelet transform, or a discrete wavelet transform.

5. The method of claim 1, wherein the 2D OTFS time-frequency frame comprises a rectangular time-frequency grid and parameters, wherein the rectangular time-frequency grid comprises the plurality of time intervals that include N time intervals and the plurality of narrow band subcarriers that include M subcarriers, wherein N and M are integers greater than one, wherein each time interval has a duration T, and wherein each narrow band subcarrier has a frequency bandwidth $\Delta f$.

6. The method of claim 5, wherein the 2D OTFS delay-Doppler frame comprises N*M locations, and wherein the OTFS transform distributes N*M data symbols over the 2D OTFS time-frequency frame.

7. The method of claim 5, further comprising:
configuring parameters of the 2D OTFS delay-Doppler frame using anticipated wireless time delay characteristics or anticipated wireless Doppler shift characteristics of the impaired wireless channel.

8. A method of receiving, on a per-frame basis, a plurality of data symbols over an impaired wireless channel comprising a plurality of narrow-band subcarriers, wherein the plurality of data symbols corresponds to transmitted portions of a waveform, wherein the impaired wireless channel distorts the transmitted portions into channel distorted portions, the method comprising:
receiving and demodulating the channel distorted portions over the plurality of narrow-band subcarriers, over a plurality of time intervals, to recover a channel distorted replica of a scrambled two-dimensional (2D) orthogonal time frequency space (OTFS) time-frequency frame based wave aggregate;
using an inverse of a scrambling operation to descramble the channel distorted replica of the scrambled 2D OTFS time-frequency frame based wave aggregate, wherein the inverse of the scrambling operation creates a descrambled channel distorted replica of the 2D OTFS time-frequency based wave aggregate;
inverse OTFS transforming, using an inverse of an OTFS transform operation, the channel distorted replica of the 2D OTFS time-frequency frame based wave aggregate, to produce, once the channel distorted portions have been received, a channel distorted replica of a 2D OTFS delay-Doppler frame;
correcting, using a delay-Doppler 2D equalizer, the channel distorted replica of the 2D OTFS delay-Doppler frame, to produce a channel deconvoluted 2D OTFS delay-Doppler frame; and
extracting a plurality of replica data symbols from the channel deconvoluted 2D OTFS delay-Doppler frame.

9. The method of claim 8, wherein the scrambling operation is a null operation, or wherein the scrambling operation is selected to perform at least one of managing peak transmitter power and allowing the channel distorted portions of the plurality of data symbols received to be distinguished as being received from different transmitters.

10. The method of claim 8, wherein the inverse of the OTFS transform is an inverse symplectic Fourier transform, an inverse symplectic discrete Fourier transform, an inverse symplectic finite Fourier transform, an inverse fast Fourier transform, an inverse wavelet transform, or an inverse discrete wavelet transform.

11. The method of claim 8, wherein at least some of the plurality of data symbols comprise delay-Doppler pilot symbols, the method further comprising:
distributing at least one delay-Doppler pilot symbol on at least one defined delay-Doppler pilot symbol location, along with the plurality of data symbols, over the 2D OTFS delay-Doppler frame;
recovering a 2D impulse response of the impaired wireless channel using knowledge pertaining to the at least one delay-Doppler pilot symbol and the at least one defined delay-Doppler pilot symbol location, and channel distortions; and
configuring the delay-Doppler 2D equalizer using the recovered 2D impulse response.

12. The method of claim 11, wherein the delay-Doppler 2D equalizer is operating without use of OFDM cyclic prefixes or use of OFDM subcarrier or symbol time localized pilot symbols.

13. The method of claim 8, wherein the 2D OTFS time-frequency based wave aggregate is based on an OTFS time-frequency frame, wherein at least the 2D OTFS time-frequency frame has a non-rectangular grid structure, and wherein the non-rectangular grid structure in turn controls one or more of start times, time durations, frequencies, frequencies over time, bandwidths, bandwidths over time of any of the portions, the plurality of time intervals, and the plurality of narrow-band subcarriers.

14. An apparatus for receiving, on a per-frame basis, a plurality of data symbols over an impaired wireless channel comprising a plurality of narrow-band subcarriers, the plurality of data symbols corresponding to transmitted portions of a waveform, the impaired wireless channel distorting the transmitted portions into channel distorted portions, the apparatus comprising:
a processor; and
a memory comprising processor executable code, the processor executable code when executed by the processor causes the processor to implement:
receiving and demodulating the channel distorted portions over the plurality of narrow-band subcarriers, over a plurality of time intervals, to recover a channel distorted replica of a scrambled two-dimensional (2D) orthogonal time frequency space (OTFS) time-frequency frame based wave aggregate;
using an inverse of a scrambling operation to descramble the channel distorted replica of the scrambled 2D OTFS time-frequency frame based wave aggregate, wherein the inverse of the scrambling operation creates a descrambled channel distorted replica of the 2D OTFS time-frequency based wave aggregate;
inverse OTFS transforming, using an inverse of an OTFS transform operation, the channel distorted replica of the 2D OTFS time-frequency frame based wave aggregate, to produce, once the channel distorted portions have been received, a channel distorted replica of a 2D OTFS delay-Doppler frame;
correcting, using a delay-Doppler 2D equalizer, the channel distorted replica of the 2D OTFS delay- Doppler frame to produce a channel deconvoluted 2D OTFS delay-Doppler frame; and extracting a plurality of replica data symbols from the channel deconvoluted 2D OTFS delay-Doppler frame.

15. The apparatus of claim 14, further comprising:
an OFDM backward compatible receiver.

16. The apparatus of claim 15, wherein 4G/LTE symbols are transmitted along with a plurality of OFDM subcarriers and symbol time localized legacy 4G/LTE pilot symbols, and wherein the processor executable code causes the OFDM backward compatible receiver to implement:

receiving the legacy 4G/LTE pilot symbols as channel distorted legacy 4G/LTE pilot symbols, and using the channel distorted 4G/LTE pilot symbols to at least partially configure either a delay-Doppler 2D equalizer or a time-frequency 2D equalizer.

17. The apparatus of claim 14, further comprising:
a time-frequency 2D equalizer configured to operate on the contents of the 2D OTFS time-frequency frame; and a delay-Doppler 2D equalizer configured to operate on the contents of the 2D OTFS delay-Doppler frame.

18. The apparatus of claim 14, further comprising:
a plurality of receiver subsections,
wherein each receiver subsection is configured with fractionally different time offsets and fractionally different frequency offsets, and wherein the processor executable code further causes the plurality of receiver subsections to implement:

sampling the channel distorted replica of the scrambled 2D OTFS time-frequency frame based wave aggregate according to the fractionally different time and frequency offsets; and combining the channel distorted replica samples in a manner that produces a high resolution channel distorted replica of the scrambled 2D OTFS time-frequency frame based wave aggregate over a high resolution version of the 2D OTFS time-frequency frame.

19. The apparatus of claim 18, wherein the processor executable code further causes the processor to further implement:

using the high resolution version of the 2D OTFS time-frequency frame to distinguish between multiple users; or using the high resolution version of the 2D OTFS time-frequency frame with at least one 2D equalizer to further correct for channel distortions.

20. The apparatus of claim 14, wherein the inverse of the OTFS transform is an inverse symplectic Fourier transform, an inverse symplectic discrete Fourier transform, an inverse symplectic finite Fourier transform, an inverse fast Fourier transform, an inverse wavelet transform, or an inverse discrete wavelet transforms.

* * * * *